United States Patent
Nabar et al.

(10) Patent No.: US 12,275,336 B2
(45) Date of Patent: Apr. 15, 2025

(54) COMPONENT FOR VEHICLE INTERIOR

(71) Applicant: Yanfeng International Automotive Technology Co. Ltd., Novi, MI (US)

(72) Inventors: Tamanna Nabar, Grand Rapids, MI (US); Kurt Seibold, Farmington Hills, MI (US); David John McCarthy, Milford, MI (US); Danny Brian Larsen, Holland, MI (US); Edgar Edmundo Reyes Calderon, Northville, MI (US)

(73) Assignee: Yanfeng International Automotive Technology Co. Ltd., Novi, MI (US)

( * ) Notice: Subject to any disclaimer, the term of this patent is extended or adjusted under 35 U.S.C. 154(b) by 0 days.

(21) Appl. No.: 18/632,690

(22) Filed: Apr. 11, 2024

(65) Prior Publication Data
US 2024/0253535 A1     Aug. 1, 2024

Related U.S. Application Data

(63) Continuation of application No. PCT/US2023/023031, filed on May 20, 2023.
(Continued)

(51) Int. Cl.
*B60N 2/20*     (2006.01)
*B60N 2/64*     (2006.01)
(Continued)

(52) U.S. Cl.
CPC ............... *B60N 2/206* (2013.01); *B60N 2/64* (2013.01); *B60N 2/753* (2018.02); *B60N 2/763* (2018.02); *B60N 2/806* (2018.02); *B60Q 3/225* (2017.02)

(58) Field of Classification Search
CPC ........ B60N 2/206; B60N 2/753; B60N 2/806; B60N 2/763; B60N 2/64; B60Q 3/225
(Continued)

(56) References Cited

U.S. PATENT DOCUMENTS

| | | |
|---|---|---|
| 2,149,598 A | 3/1939 | Christian et al. |
| 4,160,887 A | 7/1979 | Van Buren, Jr. |

(Continued)

FOREIGN PATENT DOCUMENTS

| | | |
|---|---|---|
| CN | 201872711 U | 6/2011 |
| CN | 202656899 U | 1/2013 |

(Continued)

OTHER PUBLICATIONS

International Search Report and Written Opinion received for PCT Application Serial No. PCT/US2023/023031 dated Sep. 26, 2023, 25 pages.
(Continued)

*Primary Examiner* — Anthony D Barfield
(74) *Attorney, Agent, or Firm* — Amin, Turocy & Watson LLP

(57) ABSTRACT

A seat assembly/system providing a seat and a console for a vehicle interior may comprise a base, a back assembly movable between a seat position and a console position and a cushion assembly movable between a seat position and a console position. The seat system may provide at least one functional module operable when the console is provided. The seat may be provided with the back assembly in the seat position and the cushion assembly in the seat position; the console may be provided with the back assembly in the console position and/or the cushion assembly in the console position. The seat system may comprise a control system, a control element, a switch and/or a sensor. The functional module may move a head restraint to a retracted position.
(Continued)

The seat system may comprise a belt mechanism to position a belt for passage through the back assembly.

20 Claims, 34 Drawing Sheets

Related U.S. Application Data

(60) Provisional application No. 63/344,223, filed on May 20, 2022.

(51) Int. Cl.
*B60N 2/75* (2018.01)
*B60N 2/806* (2018.01)
*B60Q 3/225* (2017.01)

(58) Field of Classification Search
USPC .......................................................... 297/61
See application file for complete search history.

(56) References Cited

U.S. PATENT DOCUMENTS

| | | | |
|---|---|---|---|
| 5,348,373 A | 9/1994 | Stiennon | |
| 5,390,976 A | 2/1995 | Doughty et al. | |
| 5,524,962 A | 6/1996 | Fulgenzi et al. | |
| 5,720,514 A * | 2/1998 | Carlsen | B60N 2/757 |
| | | | 297/188.1 X |
| 5,816,650 A | 10/1998 | Lucas, Jr. | |
| 5,848,820 A | 12/1998 | Hecht et al. | |
| 5,918,940 A * | 7/1999 | Wakamatsu | B60N 2/20 |
| | | | 297/378.12 |
| 6,059,358 A | 5/2000 | Demick et al. | |
| 6,135,549 A | 10/2000 | Demick et al. | |
| 6,192,565 B1 | 2/2001 | Tame | |
| 6,386,629 B1 | 5/2002 | Severinski et al. | |
| 6,425,619 B2 | 7/2002 | Ney | |
| 6,726,283 B2 * | 4/2004 | Schambre | B60N 2/206 |
| | | | 297/410 X |
| 6,869,121 B2 | 3/2005 | Kayumi et al. | |
| 7,014,241 B2 | 3/2006 | Toyota et al. | |
| 7,059,681 B2 * | 6/2006 | Kubo | B60N 2/835 |
| | | | 297/378.12 |
| 7,210,734 B1 | 5/2007 | Yetukuri et al. | |
| 7,517,014 B2 | 4/2009 | Schroeder et al. | |
| 7,523,985 B2 | 4/2009 | Bhatia et al. | |
| 7,845,724 B2 | 12/2010 | Scheinberg | |
| 7,967,375 B2 | 6/2011 | Yu et al. | |
| 8,182,037 B2 | 5/2012 | Jeong et al. | |
| 8,449,012 B2 | 5/2013 | Seibold et al. | |
| 8,573,670 B2 | 11/2013 | Zekavica et al. | |
| 8,820,790 B2 | 9/2014 | Wenz et al. | |
| 9,233,627 B2 | 1/2016 | Michalak et al. | |
| 9,308,849 B2 | 4/2016 | Basters et al. | |
| 10,071,662 B2 | 9/2018 | Choi et al. | |
| 10,160,392 B2 | 12/2018 | Line et al. | |
| 10,730,444 B2 | 8/2020 | Welch | |
| 10,933,777 B2 | 3/2021 | Mizuno et al. | |
| 11,390,219 B2 | 7/2022 | Harmon et al. | |
| 11,541,784 B2 | 1/2023 | Powell et al. | |
| 2007/0085363 A1 | 4/2007 | Sturt et al. | |
| 2008/0157579 A1 | 7/2008 | Yajima et al. | |
| 2009/0058149 A1 * | 3/2009 | Lindsay | B60N 2/20 |
| | | | 297/61 X |
| 2010/0244502 A1 * | 9/2010 | Andersson | B60N 2/79 |
| | | | 297/118 |
| 2016/0297383 A1 | 10/2016 | Pike et al. | |
| 2017/0210256 A1 | 7/2017 | Kondrad et al. | |
| 2018/0265010 A1 | 9/2018 | Line et al. | |
| 2019/0232839 A1 | 8/2019 | Welch | |
| 2021/0024013 A1 | 1/2021 | Quesnel et al. | |
| 2021/0078458 A1 | 3/2021 | Powell et al. | |

FOREIGN PATENT DOCUMENTS

| | | |
|---|---|---|
| CN | 203753074 U | 8/2014 |
| CN | 105459857 A | 4/2016 |
| CN | 205239438 U | 5/2016 |
| FR | 2 918 936 A3 | 1/2009 |
| GB | 2 318 285 B | 9/2000 |
| JP | 2007-106292 A | 4/2007 |
| WO | 1997019727 A1 | 6/1997 |

OTHER PUBLICATIONS

Clavey, "The Rear Seat of the Lincoln Continental is a Fabulous Place to Be", Jul. 15, 2019, Retrieved on Aug. 22, 2023, Retrieved from internet: <https://fordauthority.com/2019/07/rear-seat-lincoln-continental-fabulous-place/>.

* cited by examiner

HEAD RESTRAINT POSITION MODULE

COMPARTMENT LATCH MODULE

CONSOLE/CUPHOLDER LIGHTING MODULE

COMPARTMENT LIGHTING/LIGHT MODULE

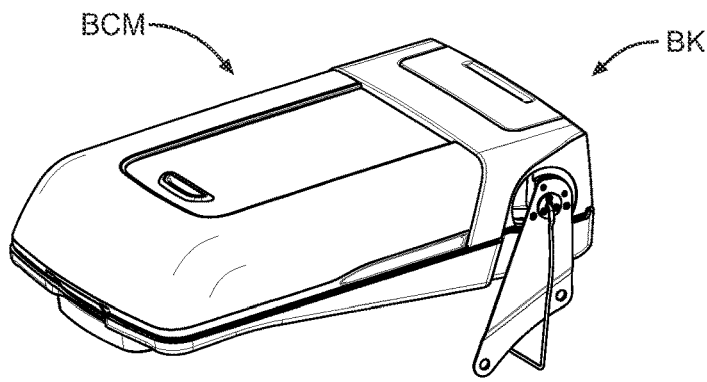
FIG. 23A
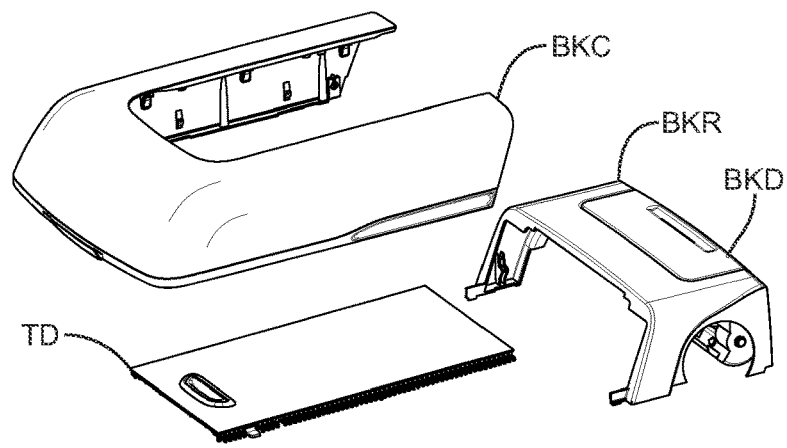
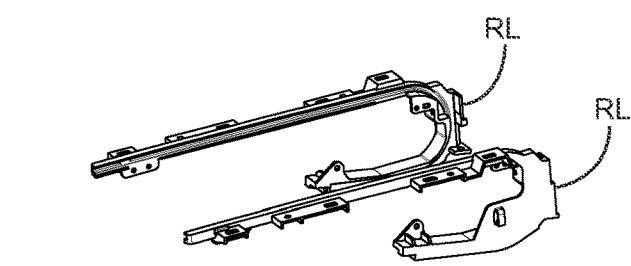
FIG. 23B
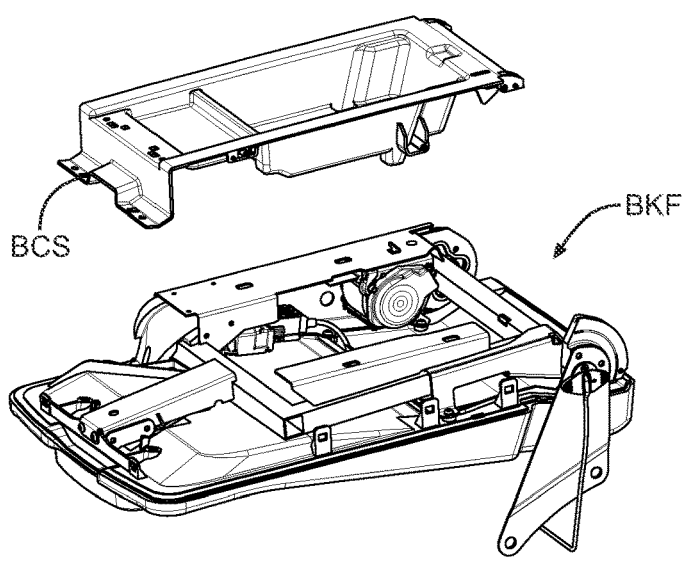

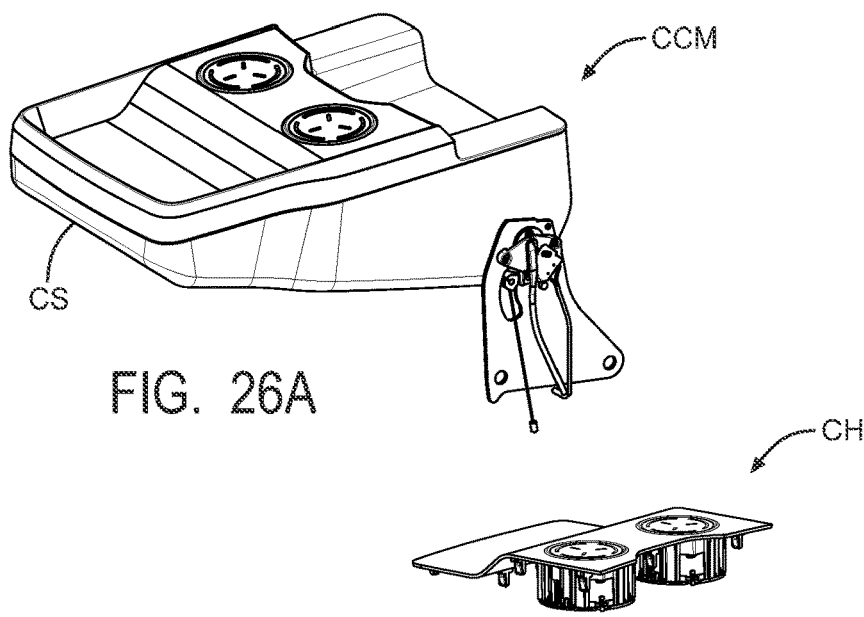
FIG. 26A
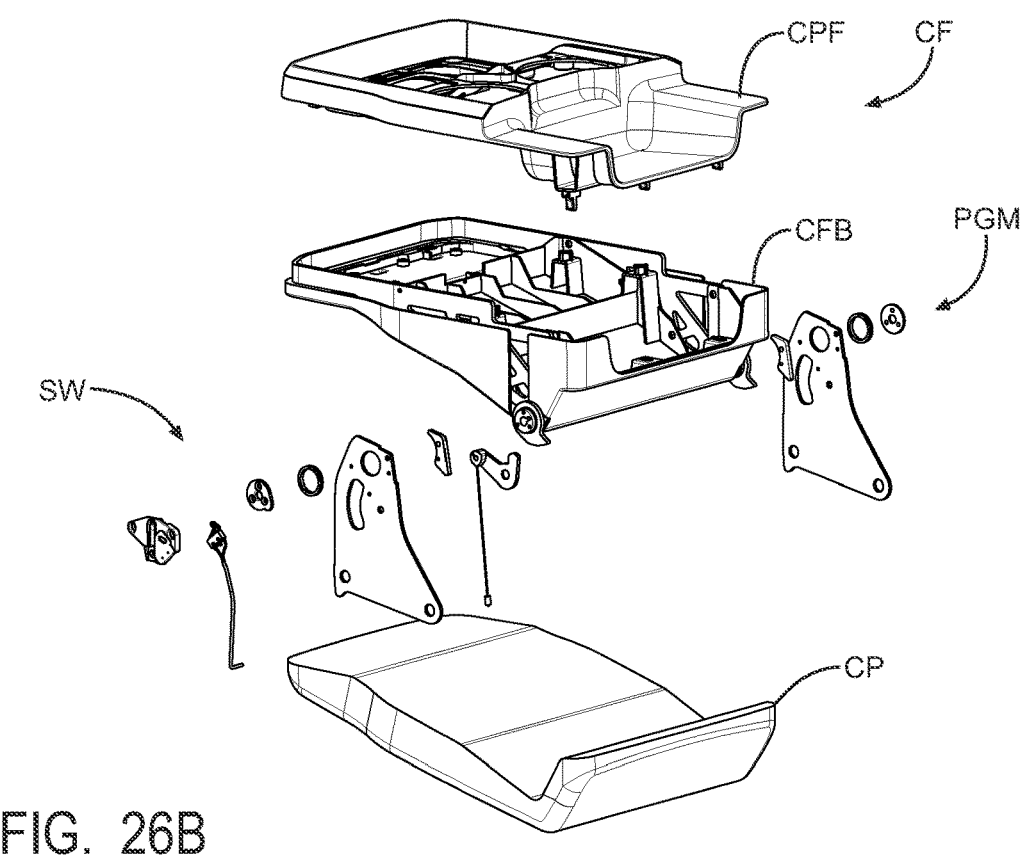
FIG. 26B
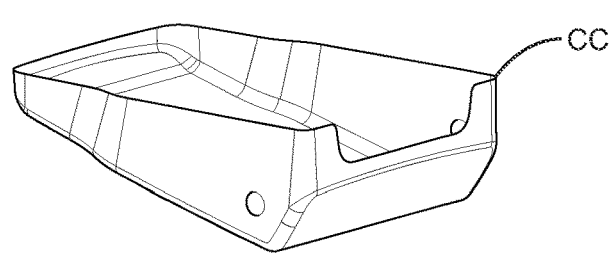

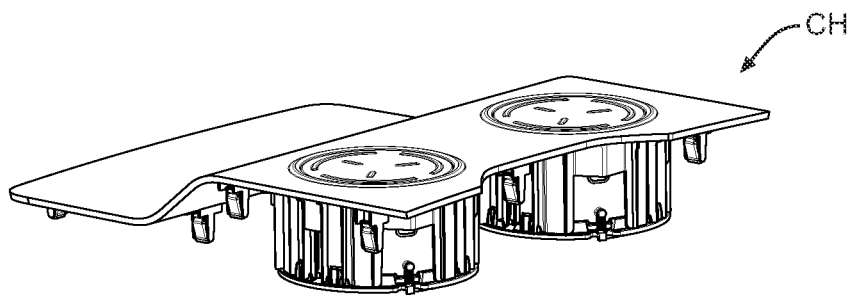
FIG. 27A
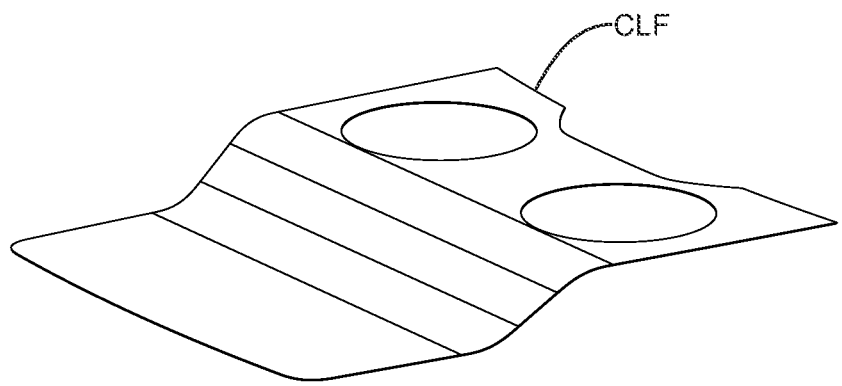
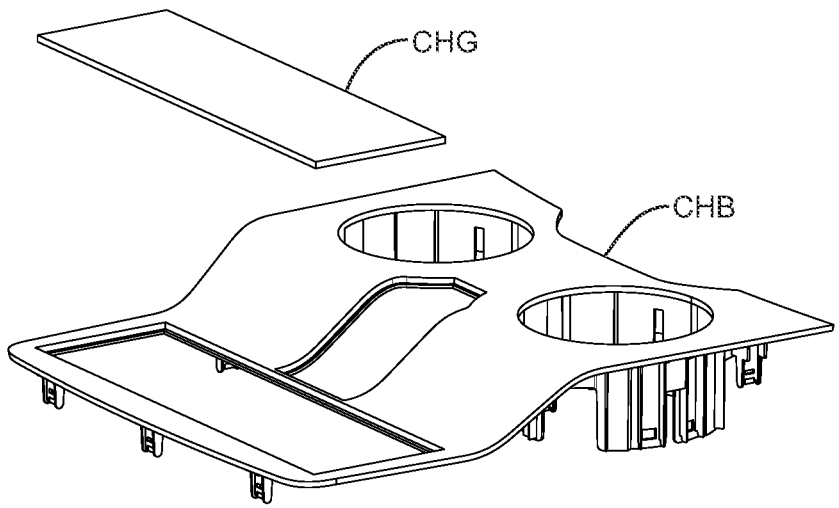
FIG. 27B
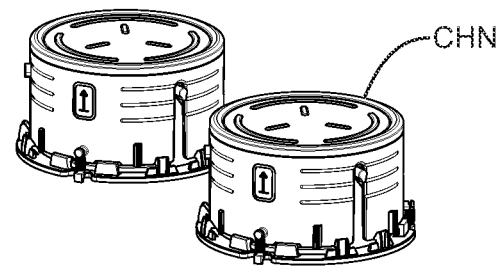

COMPONENT FOR VEHICLE INTERIOR

CROSS-REFERENCE TO RELATED APPLICATIONS

The present application is a continuation of PCT/International Patent Application No. PCT/US23/23031 titled "COMPONENT FOR VEHICLE INTERIOR" filed May 20, 2023, which claims the benefit of U.S. Provisional Patent Application No. 63/344,223 titled "COMPONENT FOR VEHICLE INTERIOR" filed May 20, 2022.

The present application claims priority to and incorporates by reference in full the following patent applications: (1) U.S. Provisional Patent Application No. 63/344,223 titled "COMPONENT FOR VEHICLE INTERIOR" filed May 20, 2022; (2) PCT/International Patent Application No. PCT/US23/23031 titled "COMPONENT FOR VEHICLE INTERIOR" filed May 20, 2023.

FIELD

The present invention relates to a component/seat for a vehicle interior.

BACKGROUND

It is known to provide seats for occupants in a vehicle interior. It is known to provide seats and consoles that can be repositioned in a vehicle interior.

It would be advantageous to provide an improved seat system for a vehicle that can be configured as a seat and as a console.

It would be advantageous to provide an improved seat system for a vehicle comprising a base and a seat back assembly and a seat cushion assembly that can be configured as a seat and as a console.

It would be advantageous to provide an improved seat system for a vehicle comprising a base and a seat back assembly and a seat cushion assembly that can be configured as a seat and as a console by movement of the seat back assembly to a console position and/or the seat cushion assembly to a console position.

It would be advantageous to provide an improved seat system for a vehicle comprising a base and a seat back assembly and a seat cushion assembly that can be configured as a seat and as a console by movement of the seat back assembly to a console position and/or the seat cushion assembly to a console position in in which the console was configured to provide for a set of functional modules for occupants of the vehicle.

SUMMARY

The present invention relates to a seat assembly configured to provide a seat and a console for an interior of a vehicle comprising (a) a base, (b) a back assembly movable relative to the base between a seat position and a console position, (c) a cushion assembly movable relative to the base between a seat position and a console position, and (d) a functional module configured to be operable when the console is provided. The seat may be provided when the back assembly is in the seat position and the cushion assembly is in the seat position. The console may be provided when the back assembly is in the console position and/or the cushion assembly is in the console position. The back assembly may comprise a head restraint. The head restraint may be configured for movement from a deployed position to a retracted position. The head restraint may comprise a latch mechanism; the latch mechanism may be configured to retain the head restraint in the deployed position; the latch mechanism may be released to allow movement of the head restraint toward the retracted position. The functional module may be configured to move the head restraint to the retracted position. The head restraint (a) may be configured to be moved by an actuator, (b) may be coupled to the actuator by a cable, and (c) may be operated by movement of the back assembly.

The present invention relates to a seat assembly configured to provide a seat and a console for an interior of a vehicle comprising (a) a base, (b) a back assembly movable relative to the base between a seat position and a console position, (c) a cushion assembly movable relative to the base between a seat position and a console position, (d) a functional module configured to be operable when the console is provided, and (e) a belt mechanism comprising a guide and a positioner to position the belt for passage through the back assembly. The seat may be provided when the back assembly is in the seat position and the cushion assembly is in the seat position. The console may be provided when the back assembly is in the console position and/or the cushion assembly is in the console position. The positioner may comprise a wedge and/or a conical shape. The guide may comprise a conical shape. The belt mechanism may be configured to position the belt for connection through the back assembly to the base. The guide may be configured to position the belt for passage from a retractor within the back assembly to an outlet in the back assembly.

The present invention relates to a seat assembly configured to provide a seat and a console for an interior of a vehicle comprising (a) a base, (b) a back assembly movable relative to the base between a seat position and a console position, (c) a cushion assembly movable relative to the base between a seat position and a console position, (d) a functional module configured to be operable when the console is provided, and (e) a seat system comprising at least one of a cushion assembly mechanism and a recliner mechanism for the back assembly. The seat may be provided when the back assembly is in the seat position and the cushion assembly is in the seat position. The console may be provided when the back assembly is in the console position and/or the cushion assembly is in the console position. The cushion assembly mechanism may be configured to provide a signal to a control system. The cushion assembly mechanism may be configured to provide the console position of the cushion assembly. The cushion assembly may comprise a switch system actuated by position. The seat assembly may comprise a lighting module for a compartment in the base; the lighting module may be configured to provide light into the compartment. The cushion assembly may be configured to move between a cushion position and an inverted position; the cushion assembly may be configured to be cantilevered from the base when in the inverted position.

The present invention relates to a seat assembly configured to provide a seat and a console for an interior of a vehicle comprising (a) a base, (b) a back assembly movable relative to the base between a seat position and a console position, (c) a cushion assembly movable relative to the base between a seat position and a console position, (d) a functional module configured to be operable when the console is provided, and (e) a seat system comprising at least one of a cushion assembly mechanism and a recliner mechanism for the back assembly. The seat may be provided when the back assembly is in the seat position and the cushion assembly is in the seat position. The console may be provided when the back assembly is in the console position and/or the cushion assembly is in the console position. The recliner mechanism may comprise a latch to retain the back assembly in the seat position and to retain the back assembly in the console position. The latch may be operated by a button. The recliner mechanism may comprise an operator control; the operator control may comprise (a) a control element and/or (b) a latch for the recliner mechanism to prevent movement of the back assembly from the console position toward the seat position. The recliner mechanism may comprise a control module; the control module may be configured to provide a signal to a control system; the control module may be configured to provide a signal to a functional module. The seat system may comprise a seat switch mechanism and/or a limit switch. The seat switch mechanism may comprise a sensor configured (a) to detect the position of the back assembly relative to the base, (b) to detect the rotation of the back assembly relative to the base.

The present invention relates to a seat assembly configured to provide a seat and a console for an interior of a vehicle comprising (a) a base, (b) a back assembly movable relative to the base between a seat position and a console position, (c) a cushion assembly movable relative to the base between a seat position and a console position, (d) a functional module configured to be operable when the console is provided, and (e) a control element. The seat may be provided when the back assembly is in the seat position and the cushion assembly is in the seat position. The console may be provided when the back assembly is in the console position and/or the cushion assembly is in the console position. The control element may be configured (a) to shut off power to the functional module when the back assembly is in the seat position and/or (b) to shut off power to the functional module when the cushion assembly is in the seat position. The seat assembly may comprise a seat switch mechanism; the seat switch mechanism may comprise a sensor configured to detect the position of the back assembly relative to the base. The seat assembly may comprise a lighting module for a compartment in the base; the lighting module may be configured to provide light into the compartment when activated by the control element. The functional module may comprise a power station; the power station may be configured for charging a device.

The present invention relates to a seat assembly configured to provide a seat and a console for an interior of a vehicle comprising (a) a base; (b) a back assembly movable relative to the base between a seat position and a console position; (c) a cushion assembly movable relative to the base between a seat position and a console position; and (d) a functional module configured to be operable when the console is provided. The seat may be provided when the back assembly is in the seat position and the cushion assembly is in the seat position. The console may be provided when the back assembly is in the console position and/or the cushion assembly is in the console position. The functional module may be configured to provide utilities for the console. The console may be configured to provide at least one storage compartment; the at least one storage compartment may be provided (a) in the base; (b) in the back assembly; or (c) in the cushion assembly. The seat assembly may comprise a control element. The control element may comprise a sensor and/or switch. The switch may comprise a limit switch. The control element may comprise an operator control. The operator control may comprise a switch. The control element may be actuated by movement of the back assembly relative to the base. The control element may comprise a control mechanism for the back assembly. The control element may comprise a control mechanism for the cushion assembly. The control element may comprise a control mechanism comprising a switch. The console may comprise a compartment provided in the base. The console may comprise the functional module. The functional module may comprise at least one functional module. The functional module may comprise at least one functional module connected to a control system. The functional module may comprise at least one functional module for the back assembly. The functional module may comprise at least one functional module for the cushion assembly. The seat position of the back assembly may comprise a generally upright position; the console position of the back assembly may comprise a generally horizontal position. The seat position of the cushion assembly may comprise a generally horizontal position; the console position of the cushion assembly may comprise a generally horizontal position. The console position of the cushion assembly may comprise a generally inverted position relative to the seat position of the cushion assembly. The seat assembly may comprise a control system; the control system may be configured (a) to be operated by a control element; (b) to actuate the functional module; (c) to operate the functional module; (d) to connect to a network and/or to vehicle systems. The seat assembly may comprise a switch mechanism; the switch mechanism may comprise (a) the control element and/or (b) a seat switch. The seat assembly may comprise a cushion assembly mechanism; the cushion assembly mechanism may comprise a control element. The seat assembly may comprise a seat assembly mechanism; the seat assembly mechanism may comprise a recliner mechanism and/or a control element. The seat assembly may comprise a seat assembly mechanism; the seat assembly mechanism may comprise a latch for the seat assembly; the latch may be configured to retain the seat assembly in the seat position. The latch may be configured to retain the seat assembly in the console position. The latch may be configured to secure a bin in the base when the seat assembly is retained in the console position. The latch may be actuated by an operator control. The latch may comprise a mechanical latch and/or an electronic latch. The functional module may comprise illumination for a bin in the base; illumination for the bin in the base (a) may comprise lighting in the bin; (b) may comprise LED lighting; (c) may comprise a lighting module; and/or (d) may be actuated by a control element. The seat assembly in the console position may be configured to provide a compartment; the compartment may comprise a bin and a cover. The cover may comprise at least one of (a) a door; (b) a tambour door; (c) a pivoting door; (d) a display panel. The seat assembly may comprise a display panel. The seat assembly in the console position may be configured to provide the functional module. The functional module may comprise at least one of a head restraint position module; a latch module for a bin providing a compartment in the base; a display system module; a power/charging module; a mobile device connect module; a lighting module for a compartment in the base; a lighting module for a cup holder in the console; a ventilation HVAC module. The cushion assembly in the console position may be configured to provide the functional module; the functional module of the cushion assembly may comprise at least one functional module. The functional module may comprise a power charging module. The functional module may comprise a power station; the power station may be configured for (a) charging a device and/or (b) wireless charging of a device. The functional module may be configured for interconnection of a device. The device may comprise at least one of (a)

a mobile device; (b) a smart phone device; (c) a personal device for a vehicle occupant. The functional module may comprise a mobile device connect module. The functional module may comprise at least one of (a) illumination; (b) an illuminated cup holder; (c) an illumination module. The cushion assembly in the console position may be configured to provide a platform. The platform may comprise at least one of (a) the functional module; (b) a tray; (c) a compartment; (d) a cup holder; (e) a cup holder movable to an extended position; (f) a cup holder comprising an illuminated cup holder; (g) a cup holder comprising a power-connected cup holder. The platform may comprise a device compartment and/or a device holder. The platform may comprise a display panel. The functional module may comprise a display module. The display module may comprise at least one of (a) a mini-display; (b) a display panel for the console; (c) a display panel for the back assembly in the console position. The display module may comprise a display panel for the back assembly. The display module may comprise a display panel for the cushion assembly in the console position. The functional module may comprise an operator control module. The operator control module may comprise a control panel; the control panel may be provided (a) on the base; (b) on the console; (c) in a bin; (d) on the seat assembly; or (e) on the cushion assembly. The operator control module may comprise a control panel comprising a control element. The operator control module may comprise a control panel comprising an operator control. The control element may be configured (a) to turn off power to the console and/or (b) to turn on power to the console. The back assembly may comprise a head restraint; the head restraint may be configured for movement from a deployed position to a retracted position. The functional module may be configured to move the head restraint to the retracted position. The head restraint (a) may be configured to be moved by an actuator; (b) may be coupled to the actuator by a cable; and (c) may be operated by movement of the back assembly. The head restraint may comprise a latch mechanism; the latch mechanism may be configured to retain the head restraint in the deployed position; the latch mechanism may be released to allow movement of the head restraint toward the retracted position. The seat assembly may comprise a belt mechanism; the back assembly may comprise the belt mechanism; the belt mechanism may be configured to position a belt for connection through the back assembly to the base; the belt may comprise a seat belt. The belt mechanism may comprise a guide and a positioner to position the belt for passage through the back assembly; the positioner may comprise a wedge and/or a conical shape; the guide may comprise a conical shape. The base may comprise a bin accessible by movement of the back assembly from the console position toward the seat position. The base may comprise (a) a bin accessible at a door in the base; (b) a bin accessible at a door at a front of the base; and/or (c) a bin accessible at a door at a rear of the base. The base may comprise a bin accessible at a sliding door or a hinged door. The base may comprise a bin; the bin may comprise a compartment configured to translate from within the base to outside of the base. The base may comprise a bin comprising a lighting module actuated by a control element. The seat assembly may comprise a seat system; the seat system may comprise at least one of a cushion assembly mechanism and a recliner mechanism for the back assembly. The cushion assembly mechanism may be configured to provide a signal to a control system. The cushion assembly mechanism may be configured to provide a signal to a functional module. The recliner mechanism may comprise an operator control; the operator control may comprise (a) a control element; and/or (b) a latch for the recliner mechanism to prevent movement of the back assembly from the console position toward the seat position. The recliner mechanism may comprise a latch to retain the back assembly in the seat position and to retain the back assembly in the console position; the latch may be operated by a button. The recliner mechanism may comprise a control module; the control module may be configured to provide a signal to a control system; the control module may be configured to provide a signal to a functional module. The seat system may comprise a seat switch mechanism. The seat switch mechanism may comprise a limit switch. The seat switch mechanism may comprise a sensor configured (a) to detect the position of the back assembly relative to the base; (b) to detect the rotation of the back assembly relative to the base. The seat system may comprise the functional module, a control element, and a control system. The seat system may comprise a control system configured to operate the functional module. The functional module may comprise at least one of a head restraint position module; a latch module for a bin providing a compartment in the base; a display system module; a power/charging module; a mobile device connect module; a lighting module for a compartment in the base; a lighting module for a cup holder in the console; a ventilation HVAC module. The power/charging module may be in the cushion assembly. The power/charging module may be in the back assembly. The mobile device connect module may be in the cushion assembly. The mobile device connect module may be in the back assembly. The control element may be configured (a) to shut off power to the functional module when the back assembly is in the seat position; and/or (b) to shut off power to the functional module when the cushion assembly is in the seat position. The control element may be configured (a) to provide power to the functional module when the back assembly is in the seat position; and/or (b) to provide power to the functional module when the cushion assembly is in the seat position. The functional module may be (a) operable when power is provided and (b) inoperable when power is shut off.

The present invention relates to a seat for a vehicle comprising (a) a base; (b) a back assembly coupled to the base; and (c) a cushion assembly coupled to the base. The back assembly may be configured to move between a back position and a dumped position. The cushion assembly may be configured to move between a cushion position and an inverted position. The cushion assembly may be configured to be cantilevered from the base when in the inverted position. When in the dumped position, the back assembly may be configured to block movement of the cushion assembly from the inverted position to the cushion position. The cushion assembly may be configured to support the back assembly when the cushion assembly is in the inverted position and the back assembly is in the dumped position. The cushion assembly may comprise a depression; the back assembly may be configured to nest in the depression when the cushion assembly is in the inverted position and the back assembly is in the dumped position. The cushion assembly may be configured to provide a stop for the back assembly. The base may comprise a sidewall; the sidewall may comprise at least one of (a) a support for the cushion assembly in the cushion position; (b) a stop of movement for the cushion assembly in the inverted position. The back assembly may be configured to move from the back position to the dumped position when the cushion assembly is in (a) the cushion position and (b) the inverted position. The back assembly may comprise a head restraint; the head restraint may be configured to move between a raised position and a lowered position; the back assembly may comprise a latch mechanism configured to move the head restraint from the raised position to the lowered position as the back assembly moves from the back position to the dumped position; the latch mechanism may comprise a drum, a cable and a latch; the drum may be configured to pull on the cable to release the latch. The back assembly may comprise a head restraint; the cushion assembly may comprise a depression; the head restraint may be configured to nest in the depression when the cushion assembly is in the inverted position and the back assembly is in the dumped position. The back assembly may be configured to move between the back position and a reclined position; the cushion assembly may be configured to rotate away from the back assembly when the back assembly is in the back position and the reclined position; the back assembly may comprise a recliner mechanism configured to secure the back assembly in the back position and the reclined position; the recliner mechanism may be configured to move the back assembly (a) between the back position and the reclined position and (b) between the back position and the dumped position. The back assembly may comprise a console module; when the back assembly is in the dumped position, the console module may be configured to provide at least one of (a) a cup holder; (b) an armrest; (c) a storage compartment; (d) a work surface. The back assembly may comprise a console module; the console module may comprise a storage compartment; the console module may comprise a cover for the storage compartment; the cover may comprise at least one of (a) a door; (b) a tambour door; (c) a set of doors. The back assembly may comprise an item holder configured to face a floor of the vehicle when the back assembly is in the back position; the item holder may be configured to provide access for stowage and access of an item when the back assembly is in the dumped position. When in the inverted position, the cushion assembly may be configured to provide at least one of (a) a cup holder and/or (b) a device holder and/or (c) a compartment and/or (d) a work surface. The cushion assembly may comprise (a) a cupholder configured to move between a stowed position and a use position when the cushion assembly is in the inverted position and/or (b) a display configured to move between a hidden position and an exposed position when the cushion assembly is in the inverted position. The cushion assembly may comprise a storage compartment accessible when the cushion assembly is in the inverted position; the cushion assembly may comprise a cover for the storage compartment; the cover may comprise at least one of (a) a door; (b) a tambour door; (c) a set of doors. The base may comprise a bin; when in the cushion position, the cushion assembly may be configured to cover the bin; when in the inverted position, the cushion assembly may be configured to provide access to the bin. The base may comprise a cover for the bin; the cover may comprise at least one of (a) a door; (b) a tambour door; (c) a lid. The seat may comprise a light source configured to illuminate the bin; the light source may be configured to illuminate the bin in response to movement of the cover from a closed position to an open position. The base may comprise a tray configured to slide between a stowed position and a use position. The base may comprise a drawer configured to move between a stowed position and a use position; the drawer may be configured to slide or rotate between the stowed position and the use position. The base may comprise (a) a storage compartment accessible from a rear side of the base; and/or (b) an air vent configured to direct airflow away from a rear side of the base. The seat may comprise a belt buckle; the back assembly may comprise a belt retractor.

The present invention relates to a seat system configured to provide a seat and a console for an interior of a vehicle comprising (a) a base; (b) a back assembly movable relative to the base between a seat position and a console position; (c) a cushion assembly movable relative to the base between a seat position and a console position; (d) a control element configured for the back assembly and/or the cushion assembly; and (e) a functional module configured to be operable when the console is provided. The seat may be provided when the back assembly is in the seat position and the cushion assembly is in the seat position. The console may be provided when the back assembly is in the console position and/or the cushion assembly is in the console position. The control element may comprise at least one of a switch; a limit switch; a sensor; a position sensor; a rotation sensor; a proximity detector. The control element may be configured to be actuated by movement of the back assembly and/or the cushion assembly.

The present invention relates to a seat for a vehicle comprising a base, a back assembly coupled to the base, and a cushion assembly coupled to the base. The back assembly may be configured to move between a back position and a dumped position. The cushion assembly may be configured to move between a cushion position and an inverted position. The cushion assembly may be configured to support the back assembly when the cushion assembly is in the inverted position and the back assembly is in the dumped position. The cushion assembly may comprise a depression; the back assembly may be configured to nest in the depression when the cushion assembly is in the inverted position and the back assembly is in the dumped position. The cushion assembly may be configured to provide a stop for the back assembly. The base may comprise a sidewall; the sidewall may comprise at least one of (a) a support for the cushion assembly in the cushion position; (b) a stop of movement for the cushion assembly in the inverted position. The cushion assembly may be configured to be cantilevered from the base when in the inverted position. When in the dumped position, the back assembly may be configured to block movement of the cushion assembly from the inverted position to the cushion position. The back assembly may be configured to move from the back position to the dumped position when the cushion assembly is in (a) the cushion position and (b) the inverted position. The back assembly may comprise a head restraint. The head restraint may be configured to move between a raised position and a lowered position. The back assembly may comprise a latch mechanism configured to move the head restraint from the raised position to the lowered position as the back assembly moves from the back position to the dumped position. The latch mechanism may comprise a drum, a cable and a latch. The drum may be configured to pull on the cable to release the latch. The cushion assembly may comprise a depression; the head restraint may be configured to nest in the depression when the cushion assembly is in the inverted position and the back assembly is in the dumped position. The back assembly may be configured to move between the back position and a reclined position. The cushion assembly may be configured to rotate away from the back assembly when the back assembly is in the back position and the reclined position. The back assembly may comprise a recliner mechanism configured to secure the back assembly in the back position and the reclined position. The recliner mechanism may be configured to move the back assembly (a) between the back position and the reclined position and (b) between the back position and the dumped position. The back assembly may comprise a console module. When the back assembly is in the dumped position, the console module may be configured to provide at least one of (a) a cup holder; (b) an armrest; (c) a storage compartment; (d) a work surface. The console module may comprise a storage compartment. The console module may comprise a cover for the storage compartment. The cover may comprise at least one of (a) a door; (b) a tambour door; (c) a set of doors. The back assembly may comprise an item holder configured to face a floor of the vehicle when the back assembly is in the back position; the item holder may be configured to provide access for stowage and access of an item when the back assembly is in the dumped position. When in the inverted position, the cushion assembly may be configured to provide at least one of (a) a cup holder and/or (b) a device holder and/or (c) a compartment and/or (d) a work surface. The cushion assembly may comprise a cupholder configured to move between a stowed position and a use position when the cushion assembly is in the inverted position. The cushion assembly may comprise a display configured to move between a hidden position and an exposed position when the cushion assembly is in the inverted position. The cushion assembly may comprise a storage compartment accessible when the cushion assembly is in the inverted position. The cushion assembly may comprise a cover for the storage compartment. The cover may comprise at least one of (a) a door; (b) a tambour door; (c) a set of doors. The base may comprise a bin. When in the cushion position, the cushion assembly may be configured to cover the bin. When in the inverted position, the cushion assembly may be configured to provide access to the bin. The base may comprise a cover for the bin. The cover may comprise at least one of (a) a door; (b) a tambour door; (c) a lid. The seat may comprise a light source configured to illuminate the bin. The light source may be configured to illuminate the bin in response to movement of the cover from a closed position to an open position. The base may comprise a tray configured to slide between a stowed position and a use position. The base may comprise a drawer configured to move between a stowed position and a use position. The drawer may be configured to slide between the stowed position and the use position. The drawer may be configured to rotate between the stowed position and the use position. The base may comprise a storage compartment accessible from a rear side of the base. The base may comprise an air vent configured to direct airflow away from a rear side of the base. The seat may comprise a belt buckle; the back assembly may comprise a belt retractor.

FIGURES

FIG. 23A is a schematic perspective view of a subassembly of a seat system for a vehicle interior according to an exemplary embodiment.

FIG. 23B is a schematic exploded perspective view of a subassembly of a seat system for a vehicle interior according to an exemplary embodiment.

FIG. 26A is a schematic perspective view of a subassembly of a seat system for a vehicle interior according to an exemplary embodiment.

FIG. 26B is a schematic exploded perspective view of a subassembly of a seat system for a vehicle interior according to an exemplary embodiment.

FIG. 27A is a schematic perspective view of a subassembly of a seat system for a vehicle interior according to an exemplary embodiment.

FIG. 27B is a schematic exploded perspective view of a subassembly of a seat system for a vehicle interior according to an exemplary embodiment.

DESCRIPTION

Figure 1A:
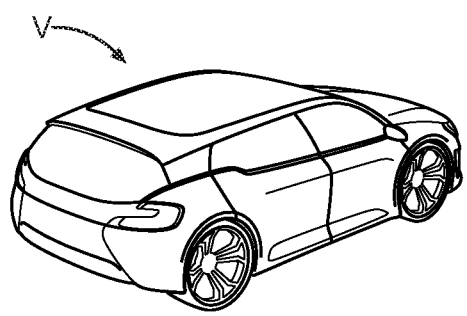
FIG. 1A is a schematic perspective view of a vehicle according to an exemplary embodiment.
Figure 1B:
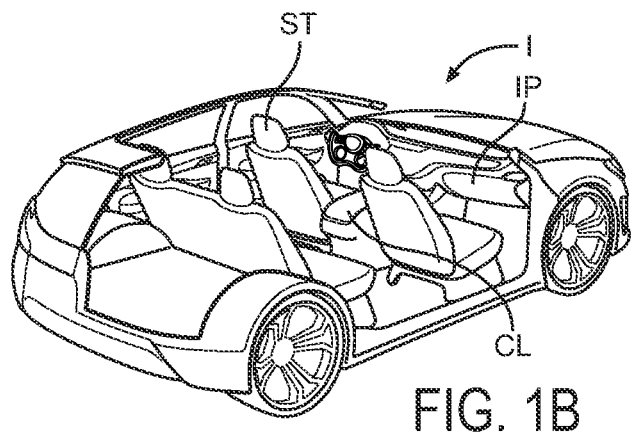
FIG. 1B is a schematic partial perspective view of a vehicle interior according to an exemplary embodiment.
Figure 2A:
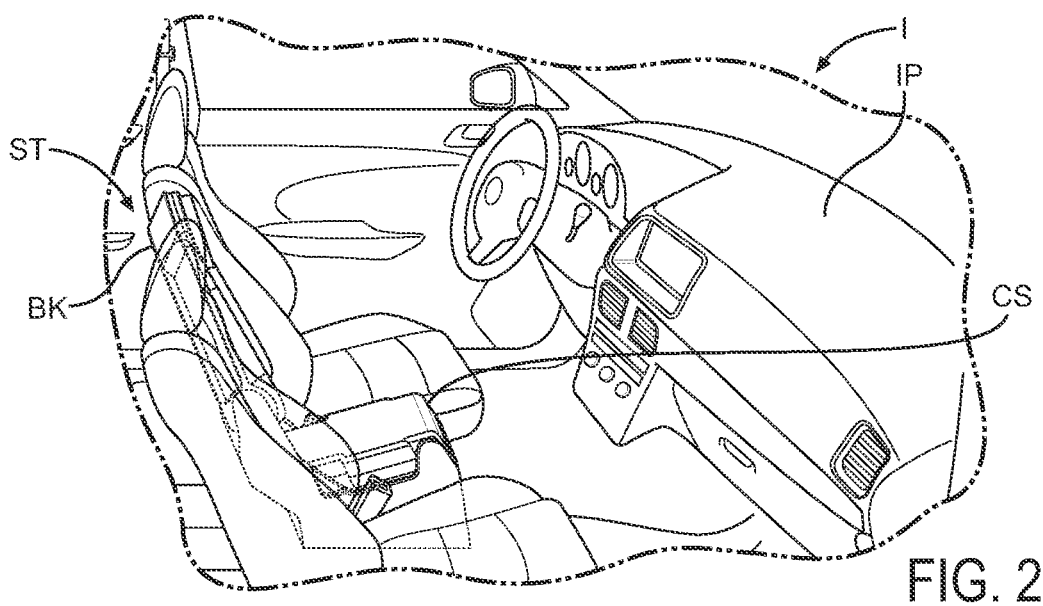
FIGS. 2A and 2B are schematic partial perspective views of a vehicle interior according to an exemplary embodiment.
Figure 2B:
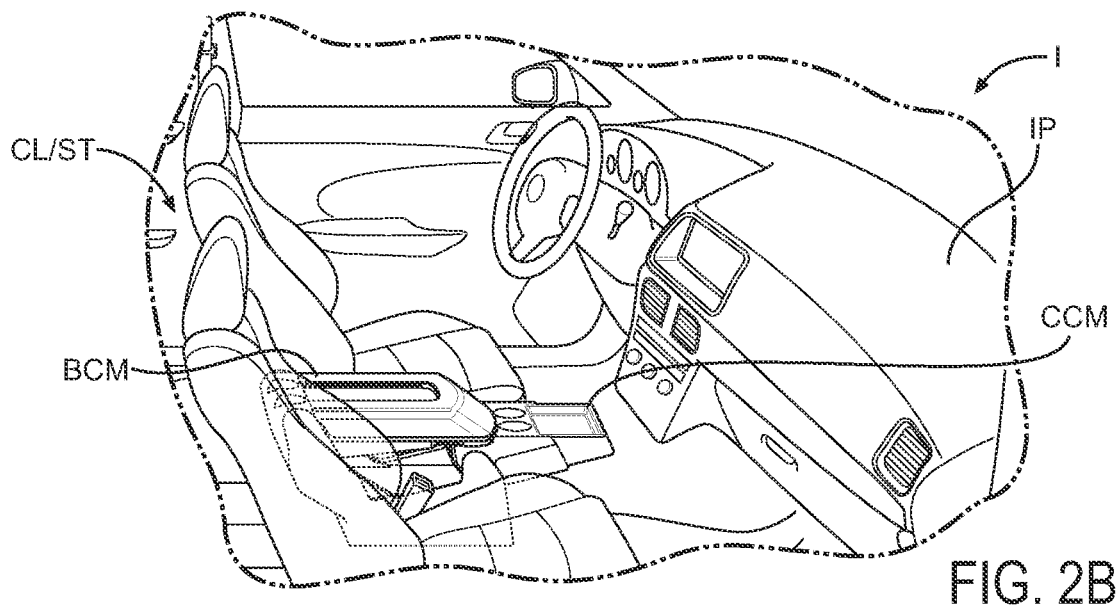
Figure 46A:
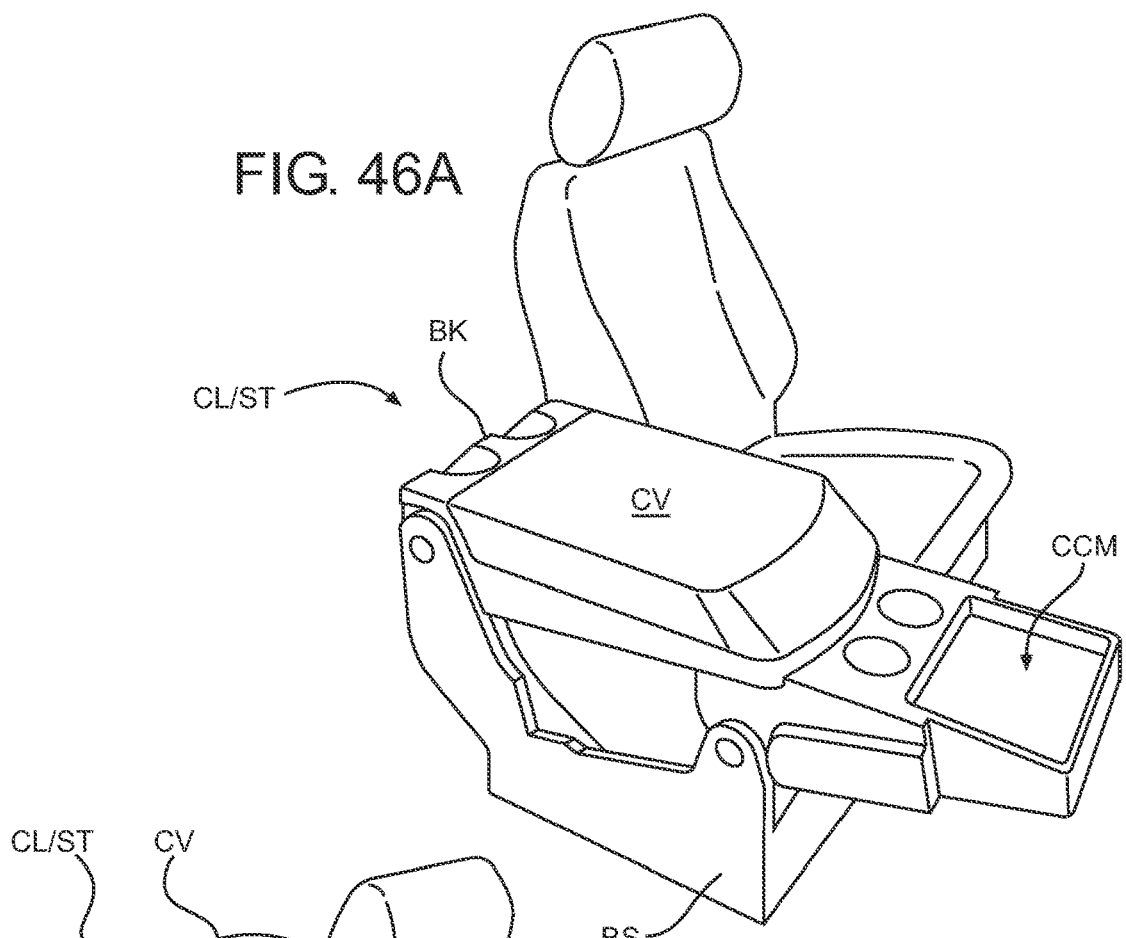
FIGS. 46A and 46B are schematic perspective views of a seat system for a vehicle interior according to an exemplary embodiment.
Figure 46B:
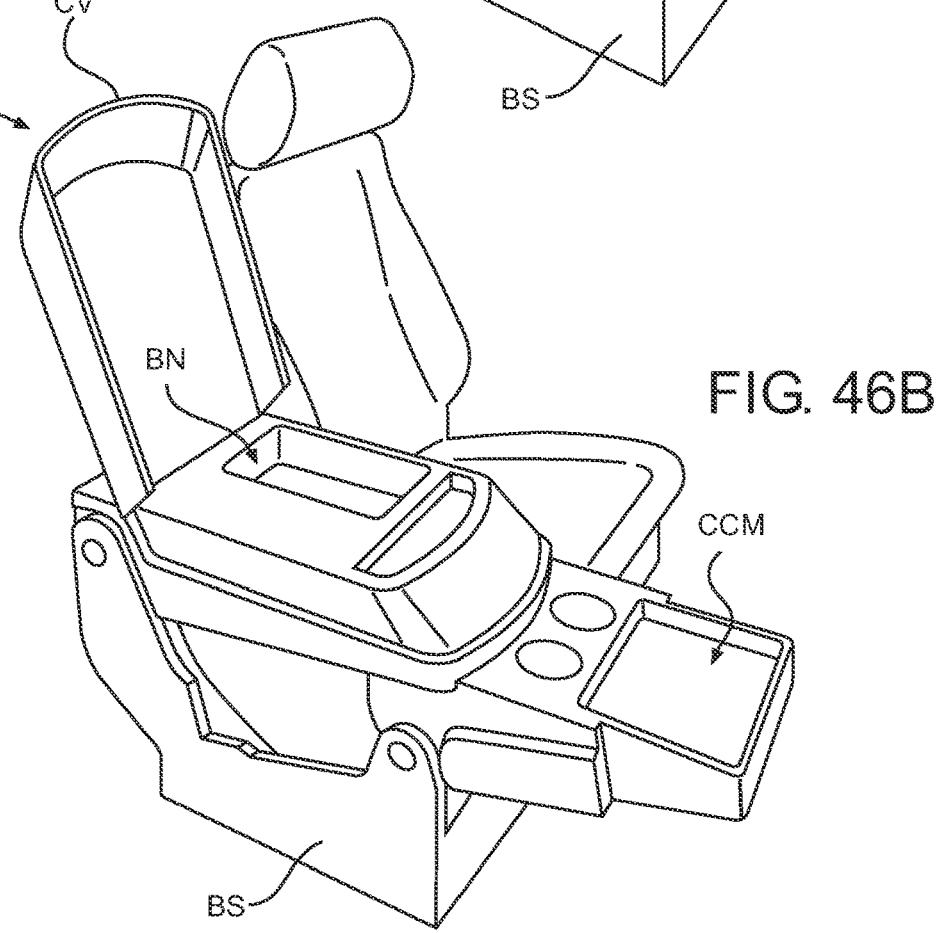

Referring to FIGS. 1A and 1B, a vehicle V is shown with and interior I comprising components including a set of seats ST and an instrument panel IP and a console CL; as indicated schematically, a seat may be configured to fit in a row of seat within the vehicle interior. See also FIGS. 46A-46B.

As indicated schematically according to an exemplary embodiment shown in FIGS. 1B, 2A-2B and 3A-3D, a seat shown as seat assembly ST may comprise a seat back assembly BK and a seat cushion assembly CS on a base BS; seat assembly ST be configured to function as a seat for vehicle occupants with back assembly BK providing a seat back and cushion assembly CS providing a seat cushion and/or to be re-deployed to provide a console CL for the vehicle interior with back assembly BK moved/rotated to provide a console section BCM and with cushion assembly moved/rotated to provide a console section CCM. See also FIGS. 8A-8D, 9A-9F and 10A-10F.

Figure 3A:
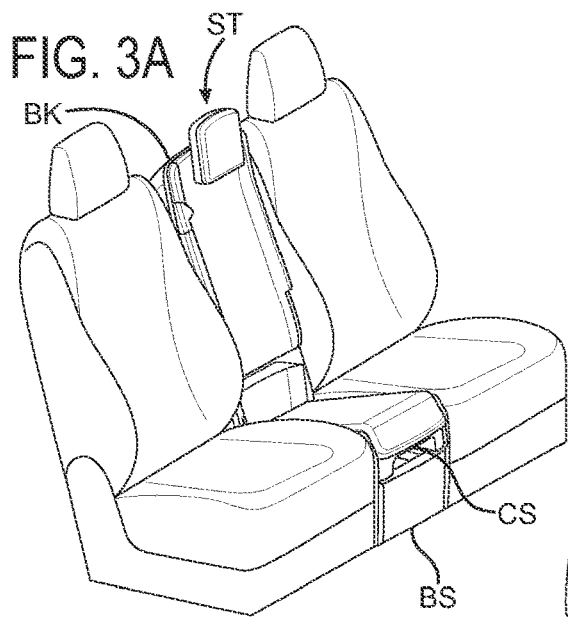
FIGS. 3A through 3D are schematic perspective views of a seat system for a vehicle interior according to an exemplary embodiment.
Figure 3B:
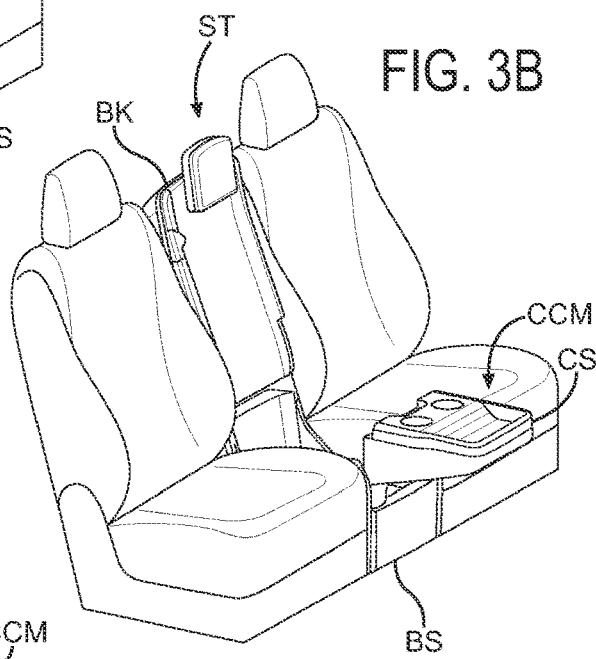
Figure 3C:
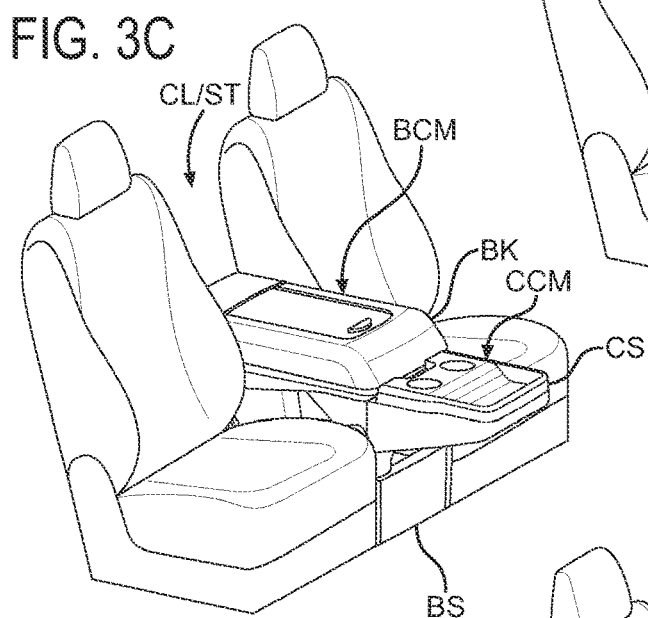
Figure 3D:
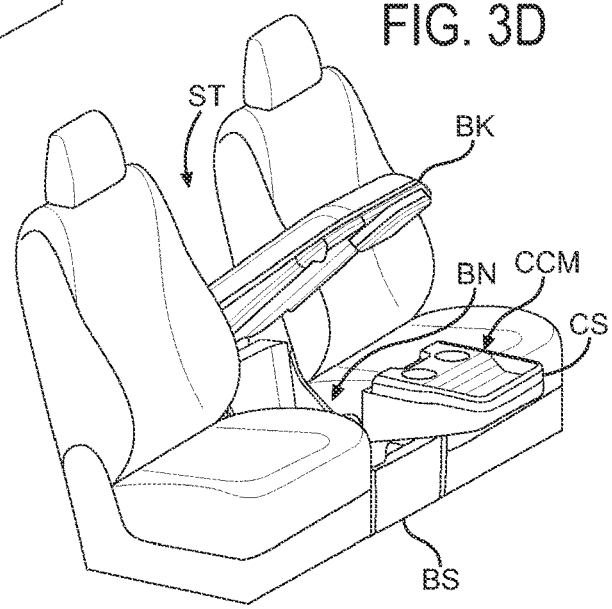
Figure 4A:
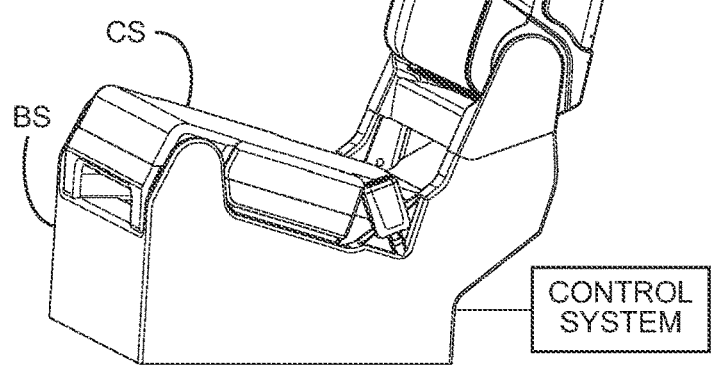
FIGS. 4A through 4C are schematic perspective views of a seat system for a vehicle interior according to an exemplary embodiment.
Figure 4B:
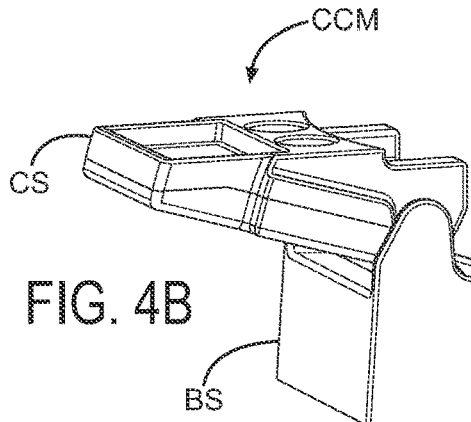
Figure 4C:
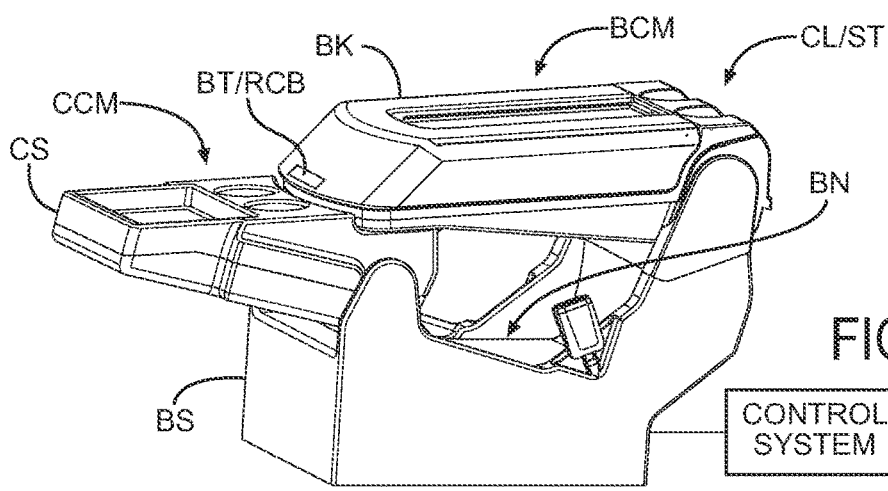
Figure 5:
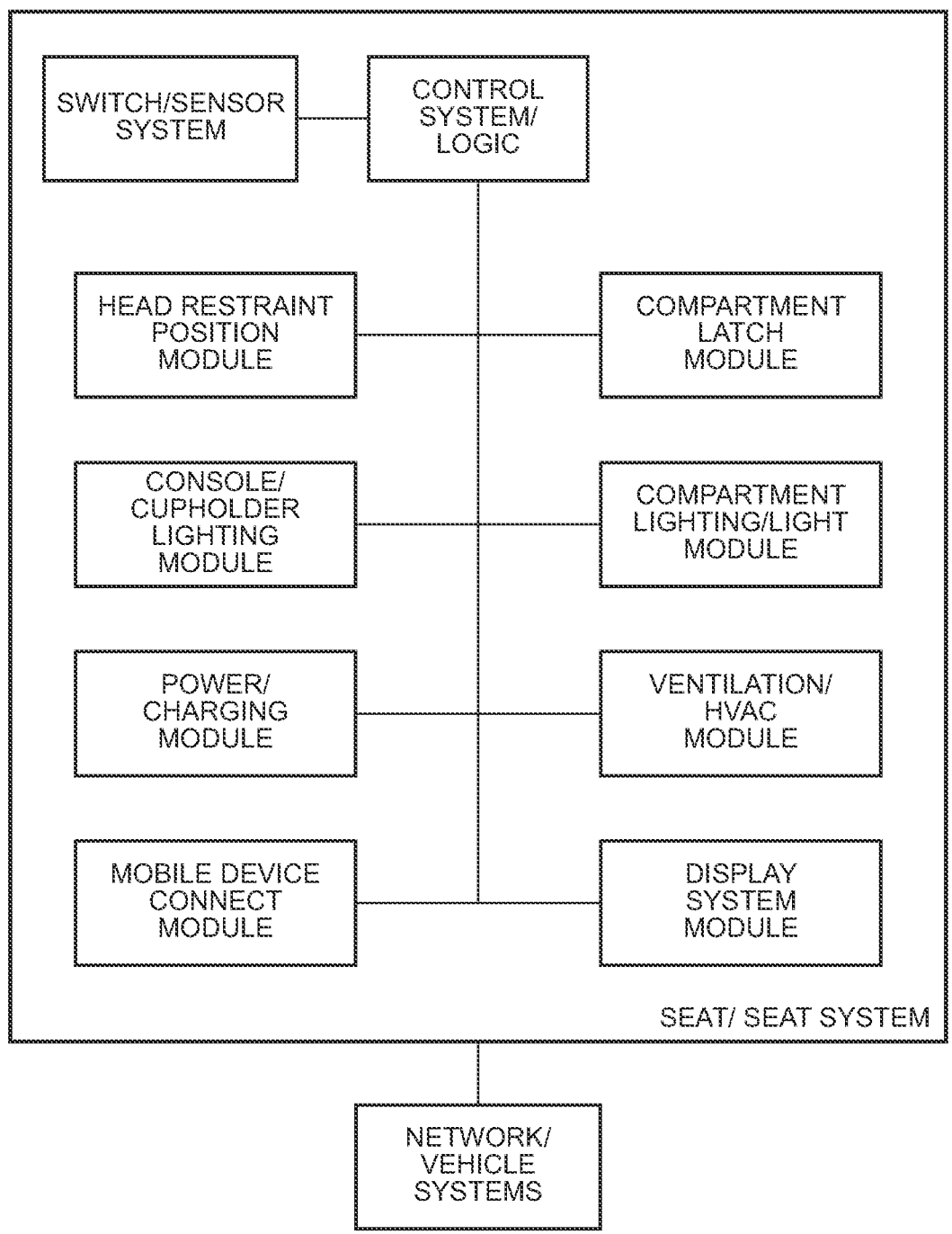
FIG. 5 is a schematic block diagram of a seat system for a vehicle interior according to an exemplary embodiment.

As indicated schematically according to an exemplary embodiment shown in FIGS. 2A-2B, 3A-3D and 4A-4C, seat assembly ST may be configured to provide a component shown as seat/console ST/CL for an interior of a vehicle on base BS with back assembly BK movable relative to base BS between a seat position and a console position and with cushion assembly CS movable relative to the base between a seat position and a console position; seat ST may be provided when back assembly BK is in the seat position and cushion assembly CS is in the seat position (see FIGS. 2A, 3A and 4A); a console CL may be provided when back assembly BK is in the console position to provide console section BCM and cushion assembly CS is in the console position to provide console section CCM (see FIGS. 2B, 3C and 4C); cushion assembly CS may be in the console position to provide console section CCM when back assembly BK is in the seat position (see FIGS. 3B and 4B).

As indicated schematically according to an exemplary embodiment shown in FIGS. 3A-3D and 4A-4C, the seat assembly/system with console CL with console section BCM and console section CCM may be configured to provide a variety of features and arrangements including modules shown a functional modules and compartments such as bin BN within base BS (e.g. provided under console section BCM of back assembly BK); compartments may be provided for the console that are accessible from covers/doors shown as cover CV and/or door DR and/or sliding doors/drawers/trays SDR; console CL for the seat system may be configured to provide features such as platforms, trays, rest/armrest, cup holders, device holders, device power/connectivity, device connection to vehicle systems, control panels such as panel CP, and other sections, bins, closures, compartments, sliding doors, drawers, platforms, etc. on and/or within console section BCM and console section CCM. See FIGS. 7, 7A-7H, 32, 33, 34, 35, 36, 37, 38, 39, 40, 41, 42, 43, 44, 45 and 46A-46B.

As indicated schematically according to an exemplary embodiment shown in FIGS. 4A-4C, 5 6 and 7, the component shown as seat/console ST/CL with back assembly BK and cushion assembly CS and base BS may be configured as a seat system to comprise a control system configured to be actuated by a switch/sensor arrangement and/or to comprise a set of mechanisms and/or to comprise a set of modules shown as functional modules.

Figure 6:
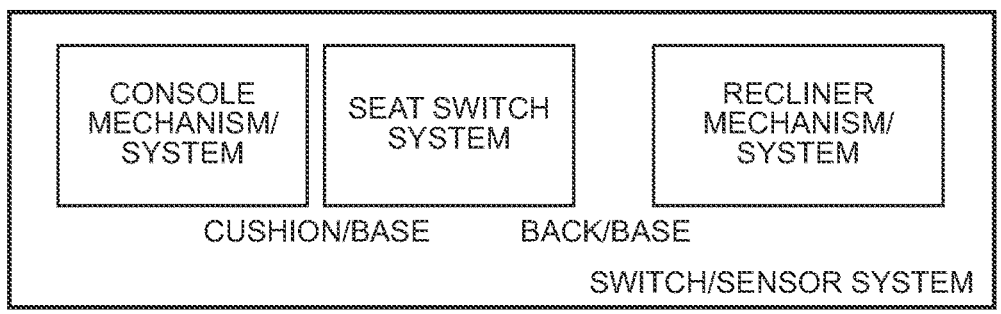
FIG. 6 is a schematic block diagram of a switch/sensor system for a seat system for a vehicle interior according to an exemplary embodiment.
Figure 6A:
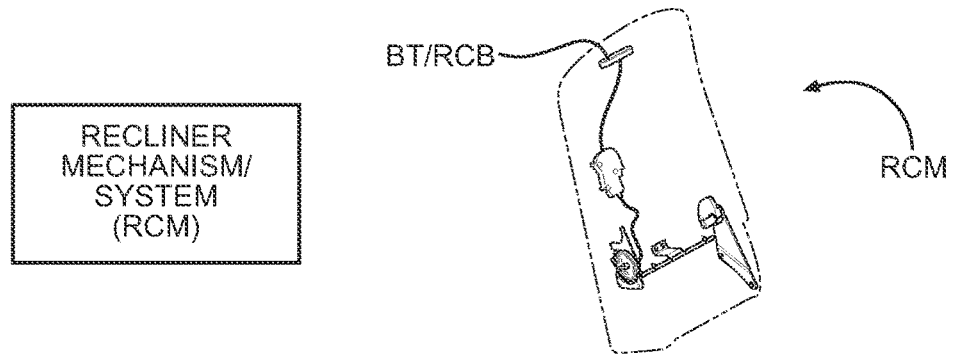
FIGS. 6A through 6C are composite schematic block diagrams of a seat system for a vehicle interior according to an exemplary embodiment.

As indicated schematically according to an exemplary embodiment shown in FIGS. 6 and 6A, the seat system may comprise a mechanism/system shown as a recliner mechanism RCM shown as operated by an operator control BT/RCB and configured to facilitate movement of the back assembly BK between the seat position and the console position to provide console section BCM. See also FIGS. 4A-4C, 5, 7, 17A-17B, 18A-18B and 19A-19B.

Figure 6B:
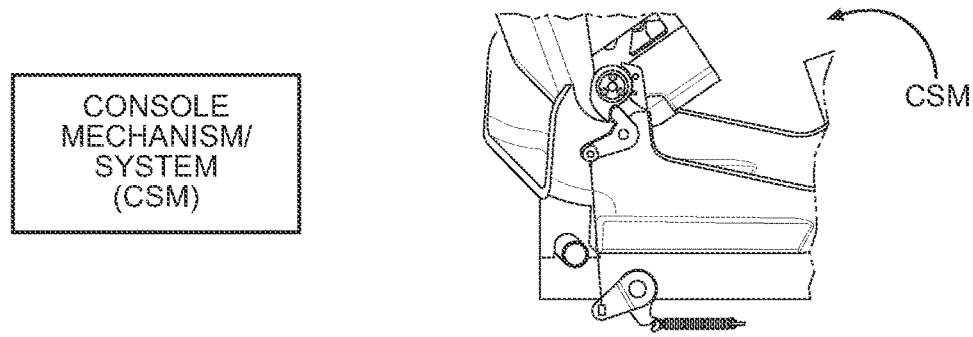

As indicated schematically according to an exemplary embodiment shown in FIGS. 6 and 6B, the seat system may comprise a mechanism/system shown as a console mechanism CSM shown as configured to facilitate movement of cushion assembly CS between the seat position and the console position to provide console section CCM. See also FIGS. 4A-4C, 5, 7, 11A-11B, 12A-12B and 13A-13B.

Figure 6C:
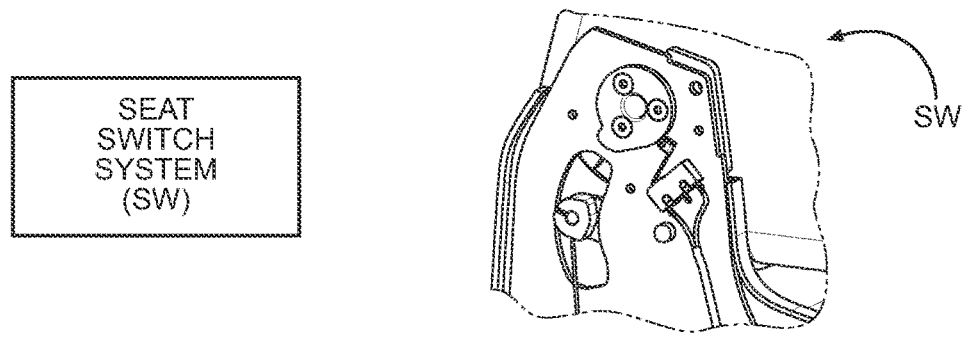
Figure 7:
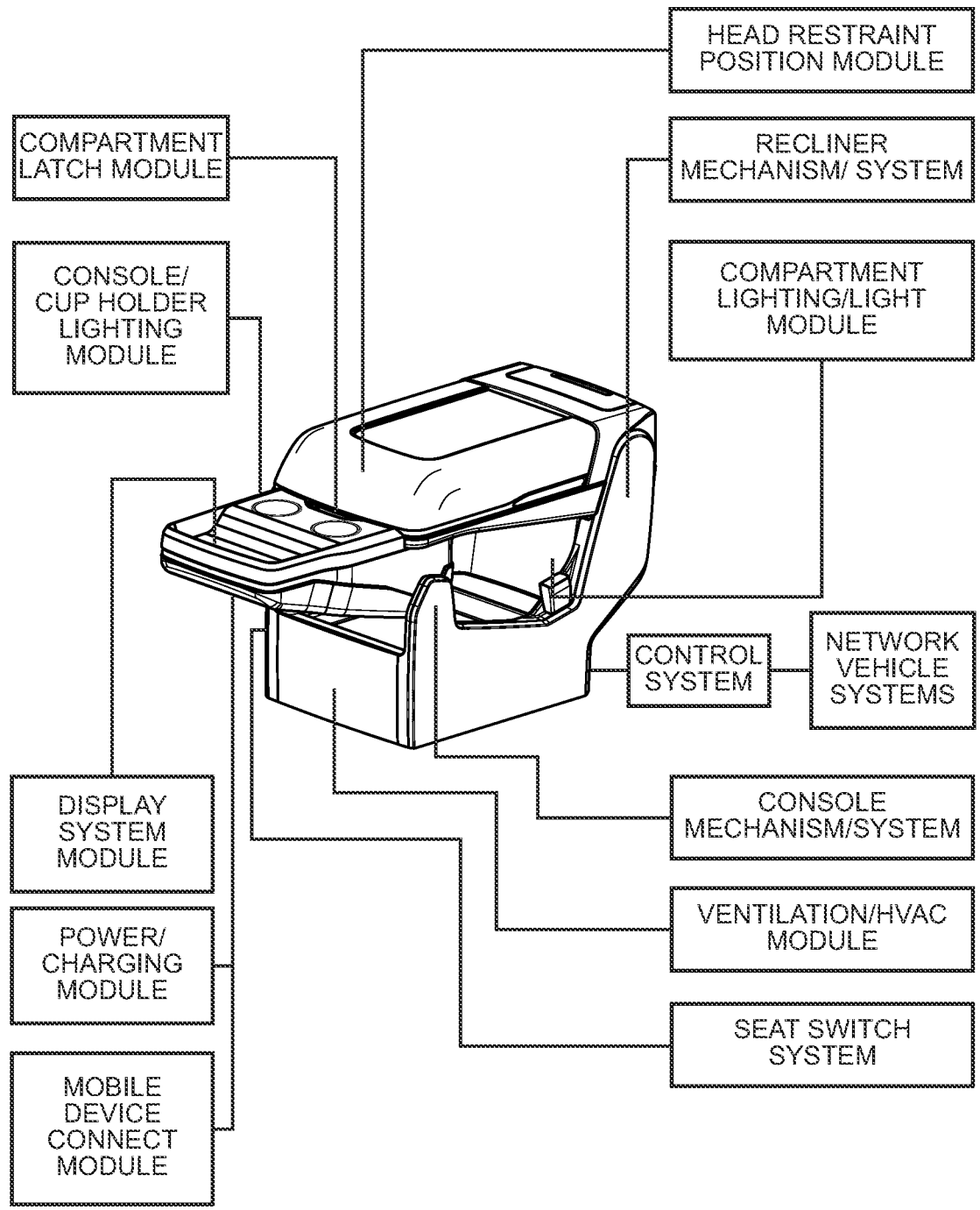
FIG. 7 is a composite schematic block diagram of a seat system for a vehicle interior according to an exemplary embodiment.
Figure 7A:
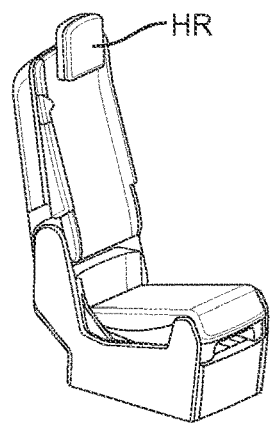
FIGS. 7A through 7H are composite schematic block diagrams of a seat system for a vehicle interior according to an exemplary embodiment.
Figure 7B:
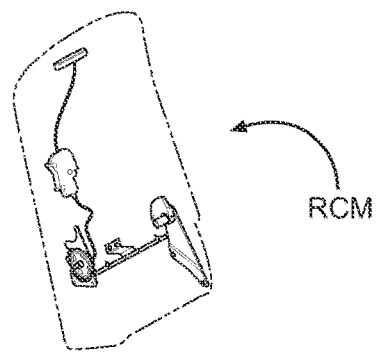
Figure 7C:
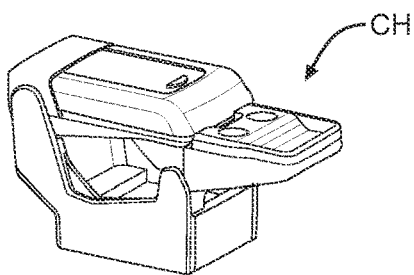
Figure 7D:
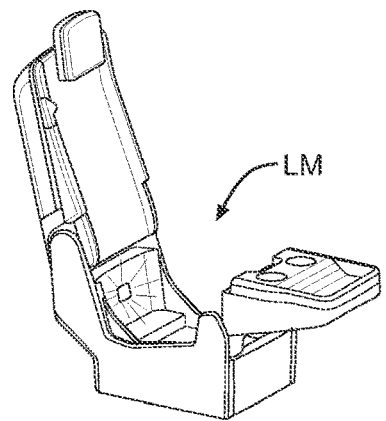
Figure 7E:
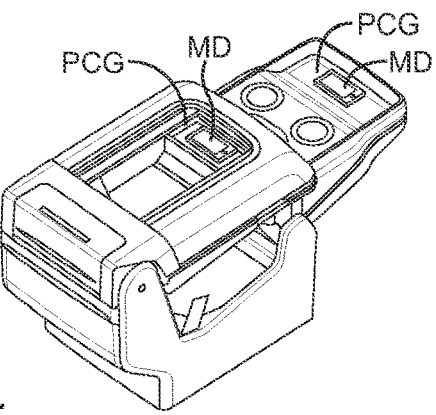
Figure 7F:
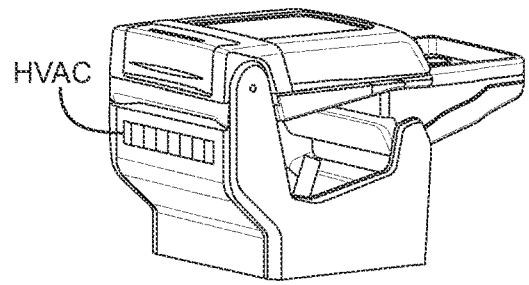
Figure 7G:
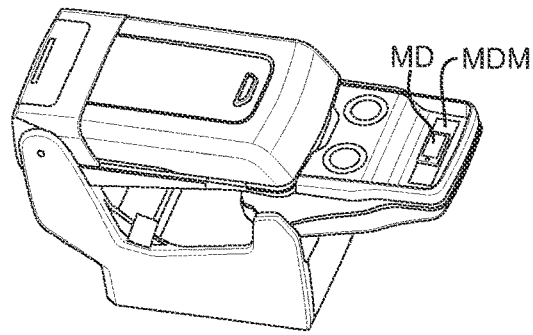
Figure 7H:
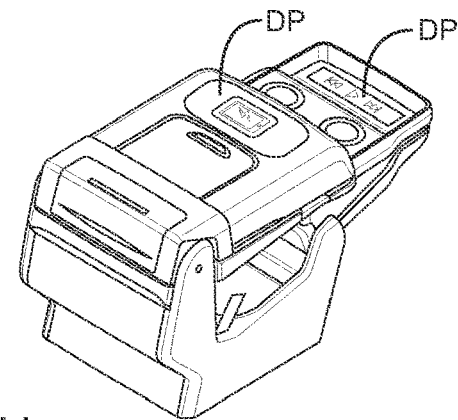
Figure 8A:
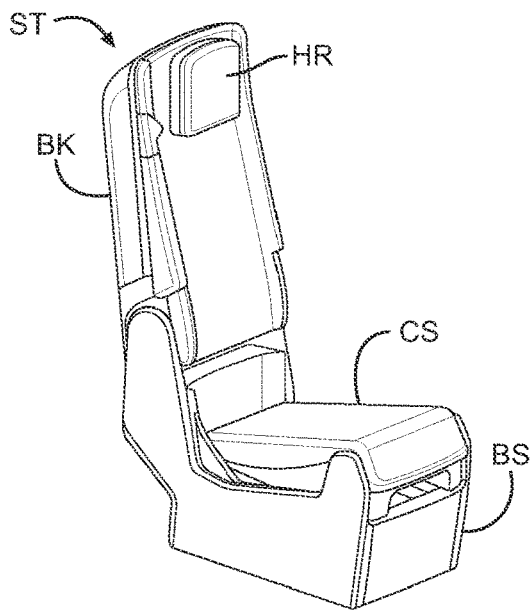
FIGS. 8A through 8D are schematic perspective views of a seat system for a vehicle interior according to an exemplary embodiment.
Figure 8B:
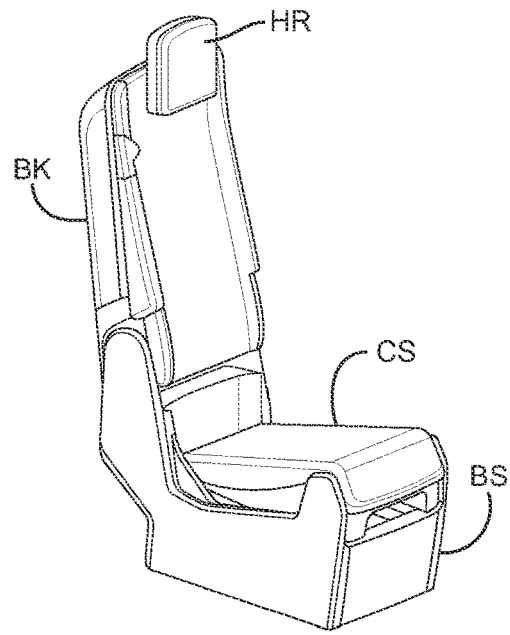
Figure 8C:
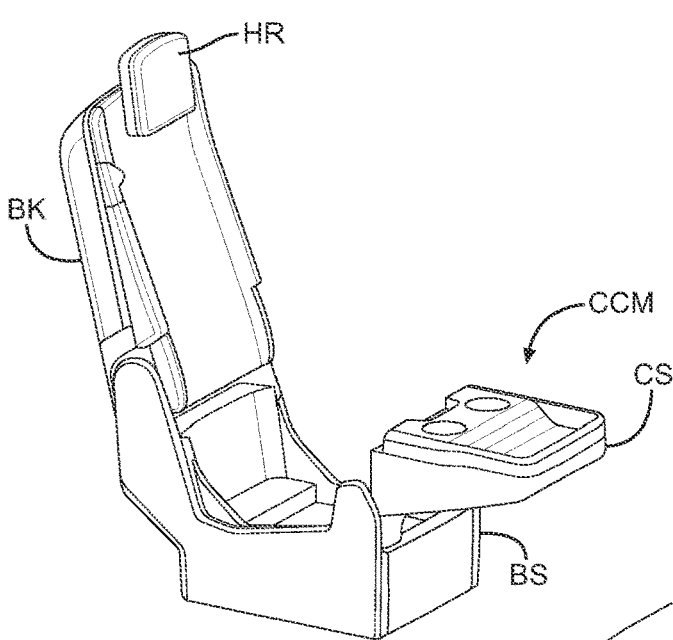
Figure 8D:
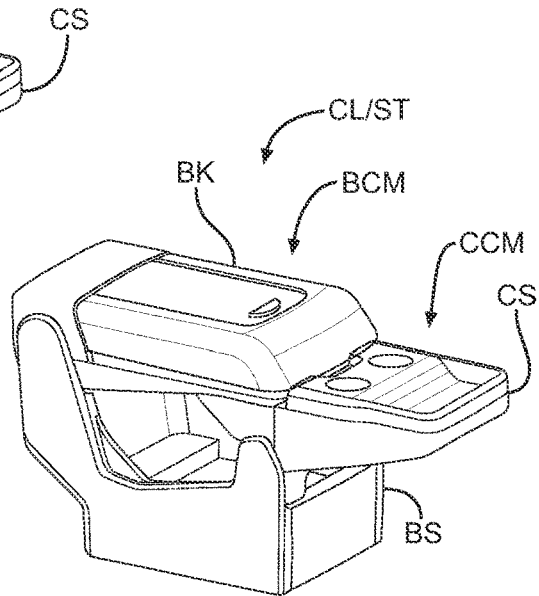
Figure 9A:
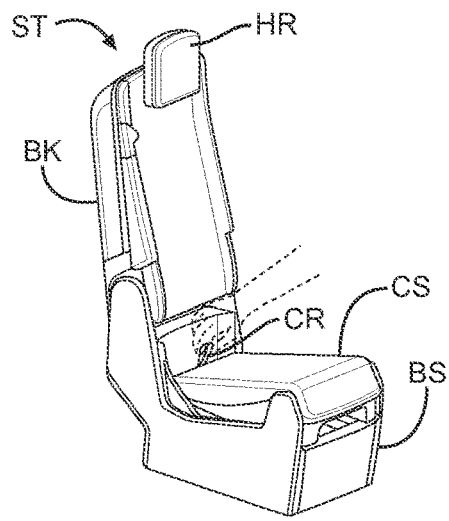
FIGS. 9A through 9F are schematic perspective views of a seat system for a vehicle interior according to an exemplary embodiment.
Figure 9B:
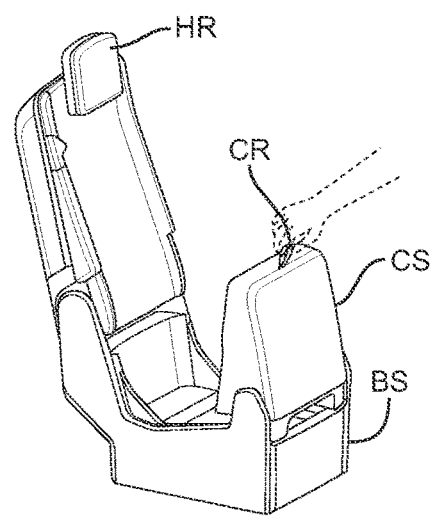
Figure 9C:
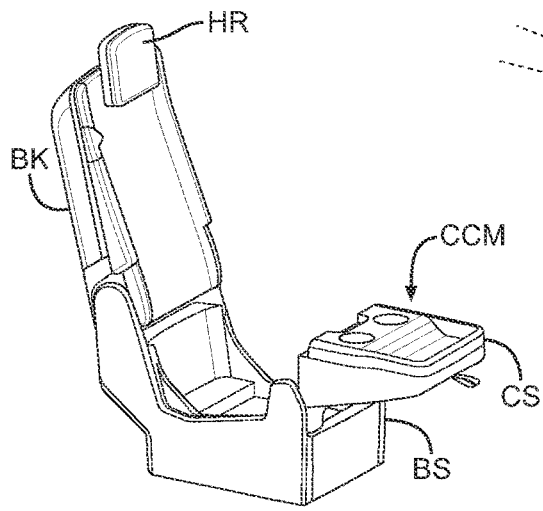
Figure 9D:
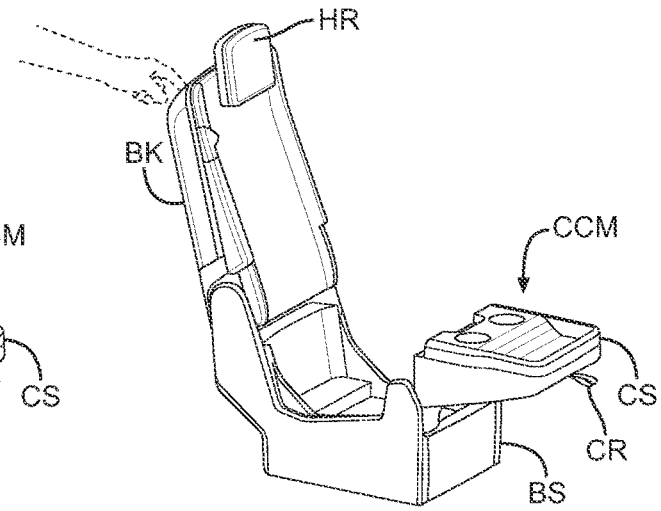
Figure 9E:
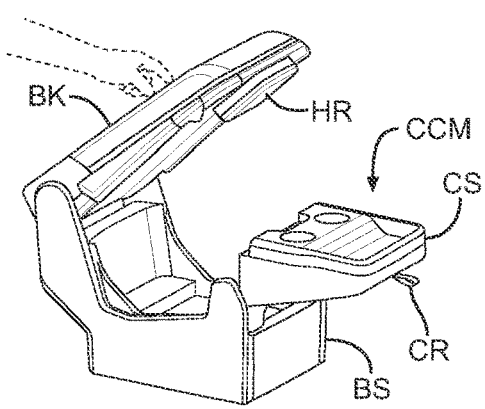
Figure 9F:
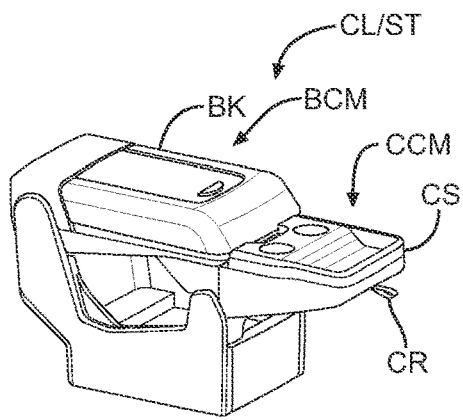
Figure 10A:
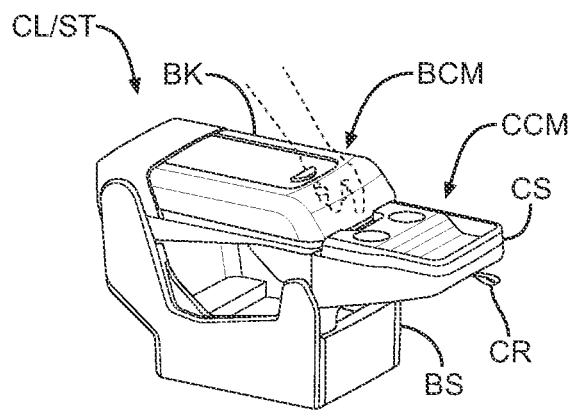
FIGS. 10A through 10F are schematic perspective views of a seat system for a vehicle interior according to an exemplary embodiment.
Figure 10B:
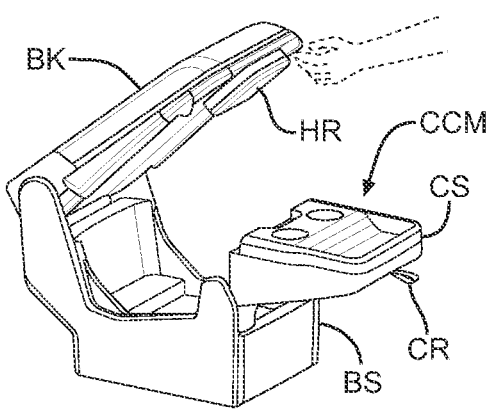
Figure 10C:
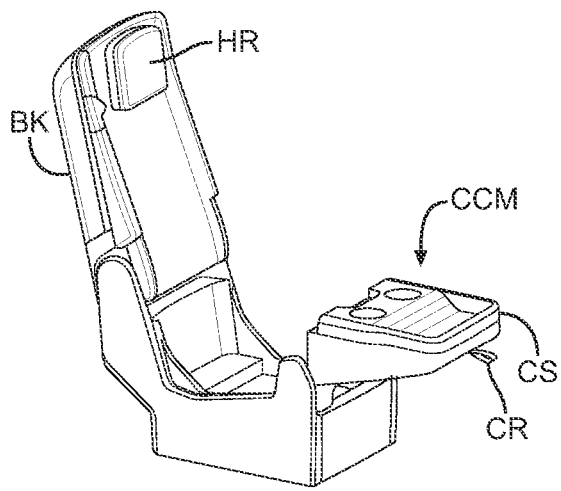
Figure 10D:
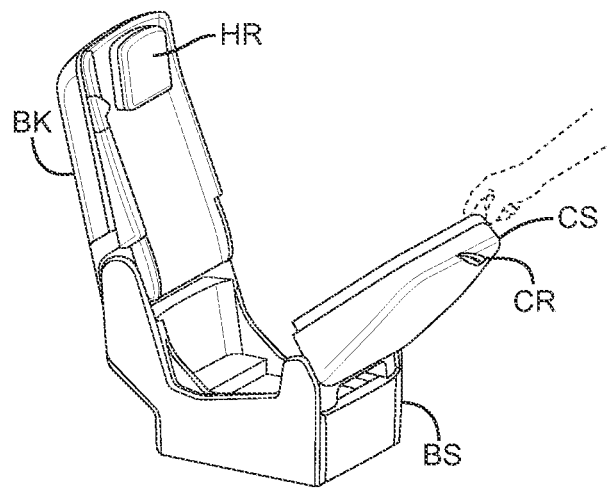
Figure 10E:
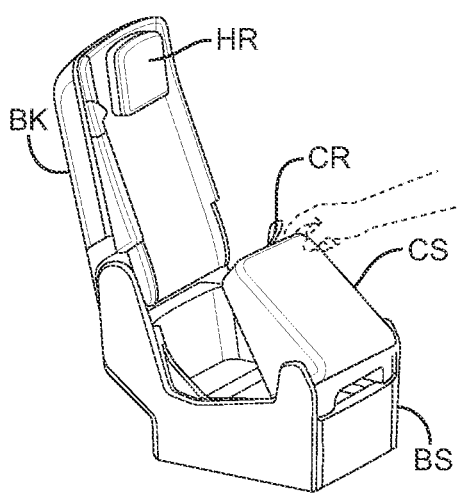
Figure 10F:
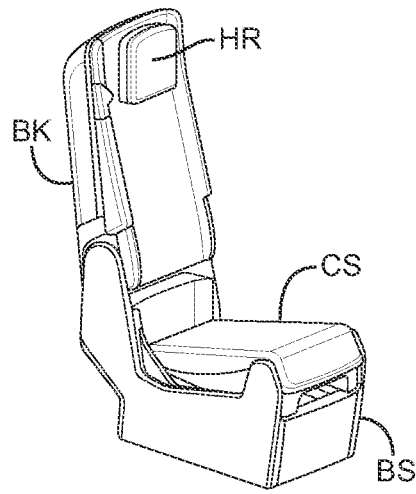
Figure 11A:
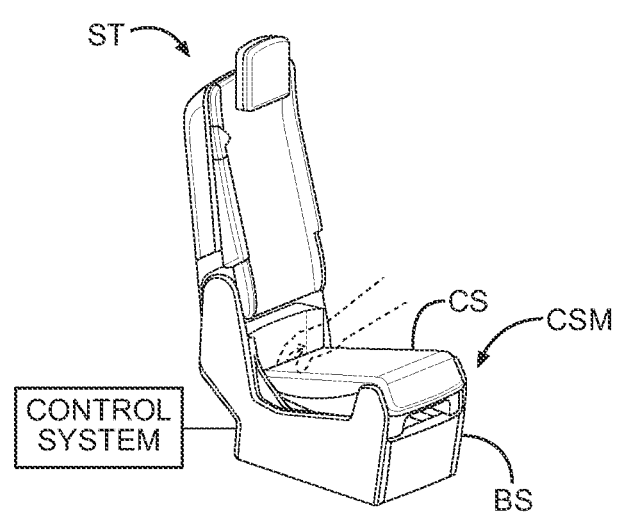
FIG. 11A is schematic perspective view of a seat system for a vehicle interior according to an exemplary embodiment.
Figure 11B:
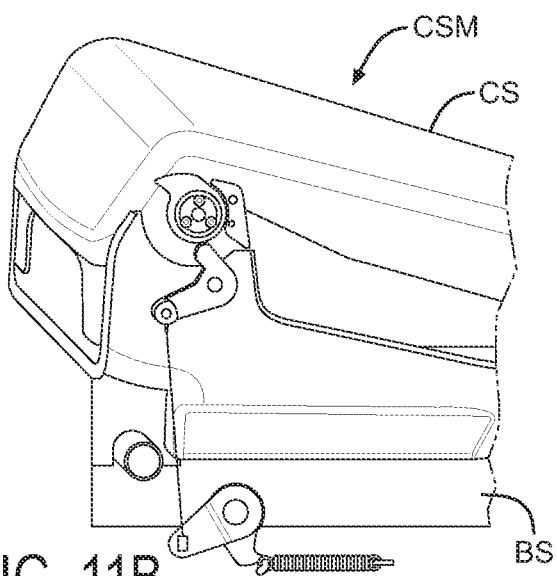
FIG. 11B is schematic partial cutaway perspective view of a seat system for a vehicle interior according to an exemplary embodiment.
Figure 12A:
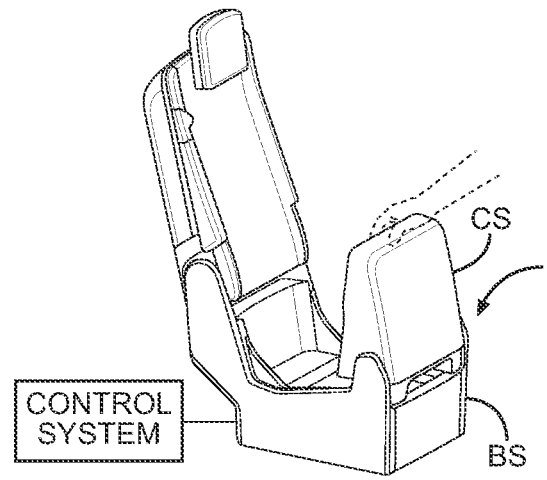
FIG. 12A is schematic perspective view of a seat system for a vehicle interior according to an exemplary embodiment.
Figure 12B:
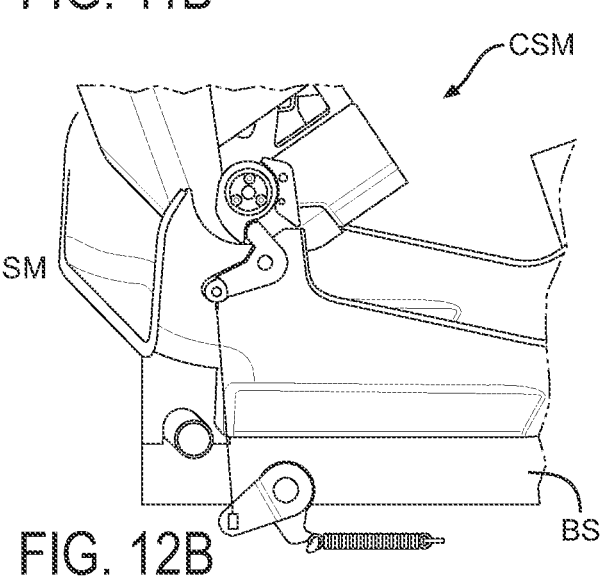
FIG. 12B is schematic partial cutaway perspective view of a seat system for a vehicle interior according to an exemplary embodiment.
Figure 13A:
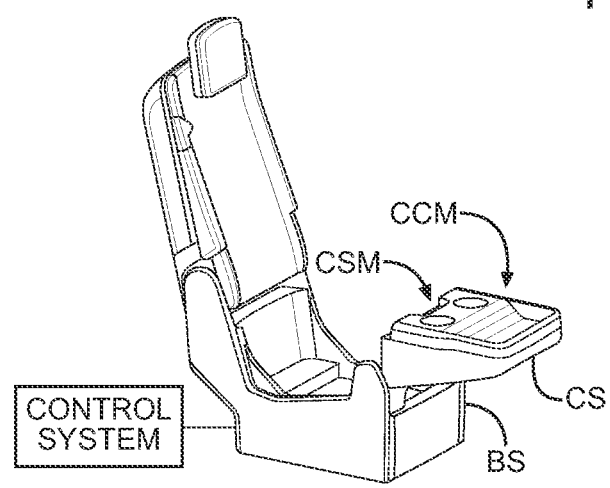
FIG. 13A is schematic perspective view of a seat system for a vehicle interior according to an exemplary embodiment.
Figure 13B:
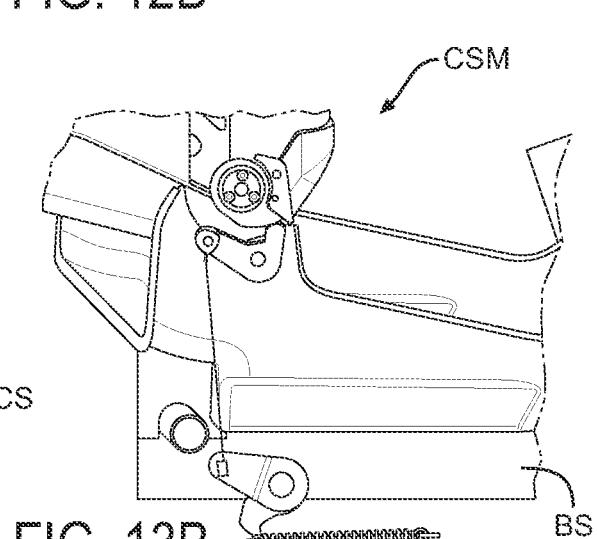
FIG. 13B is schematic partial cutaway perspective view of a seat system for a vehicle interior according to an exemplary embodiment.
Figure 14A:
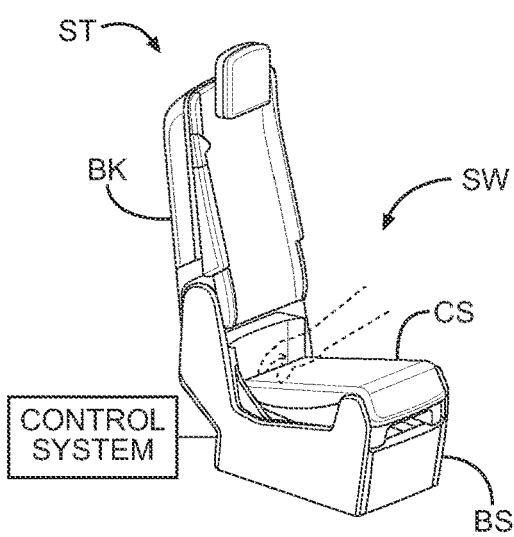
FIG. 14A is schematic perspective view of a seat system for a vehicle interior according to an exemplary embodiment.
Figure 14B:
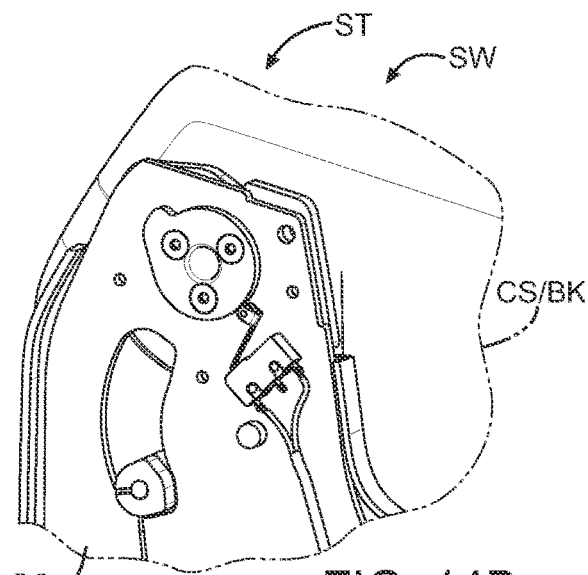
FIG. 14B is schematic partial cutaway perspective view of a seat system for a vehicle interior according to an exemplary embodiment.
Figure 15A:
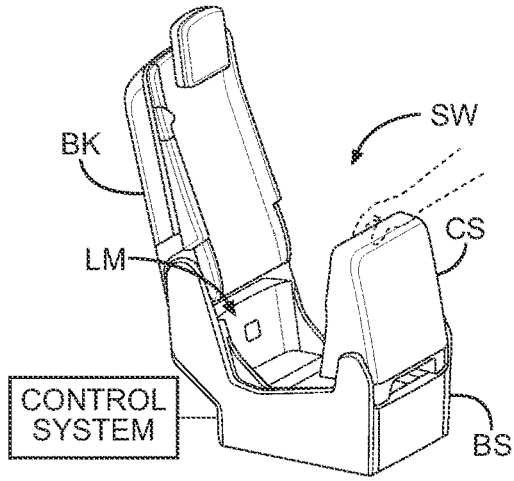
FIG. 15A is schematic perspective view of a seat system for a vehicle interior according to an exemplary embodiment.
Figure 15B:
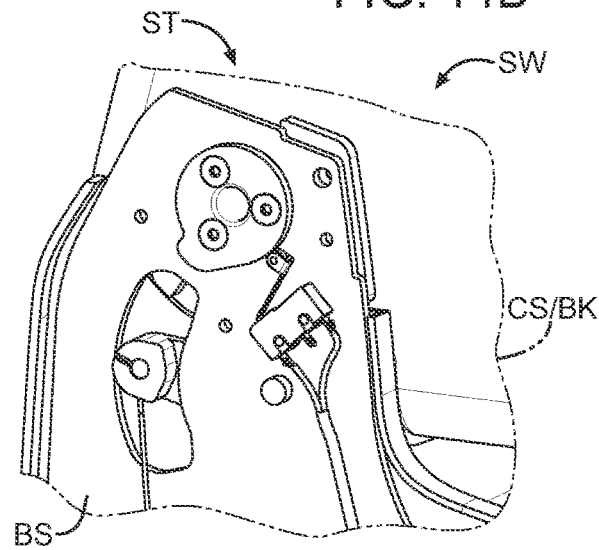
FIG. 15B is schematic partial cutaway perspective view of a seat system for a vehicle interior according to an exemplary embodiment.
Figure 16A:
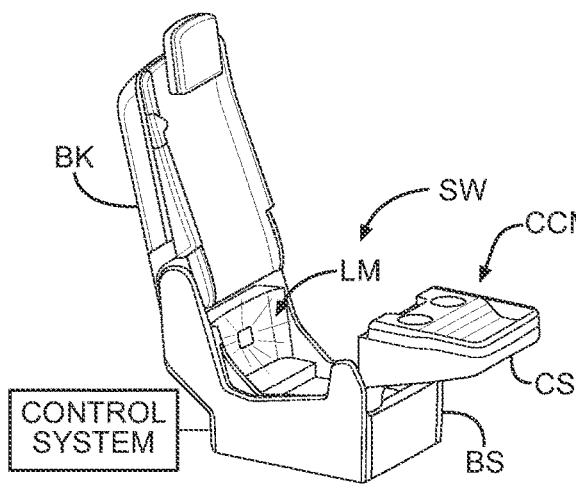
FIG. 16A is schematic perspective view of a seat system for a vehicle interior according to an exemplary embodiment.
Figure 16B:
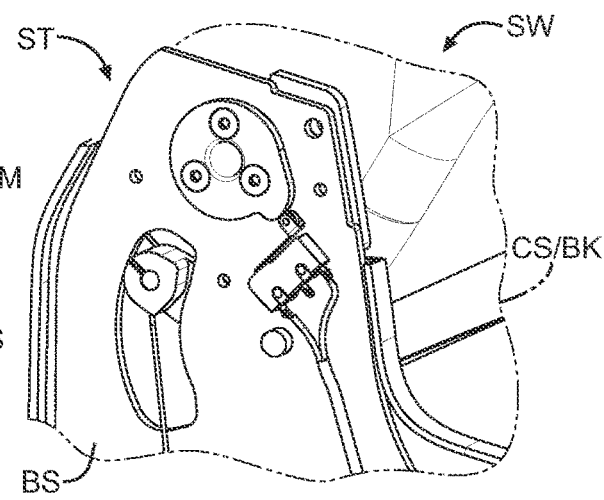
FIG. 16B is schematic partial cutaway perspective view of a seat system for a vehicle interior according to an exemplary embodiment.
Figure 17A:
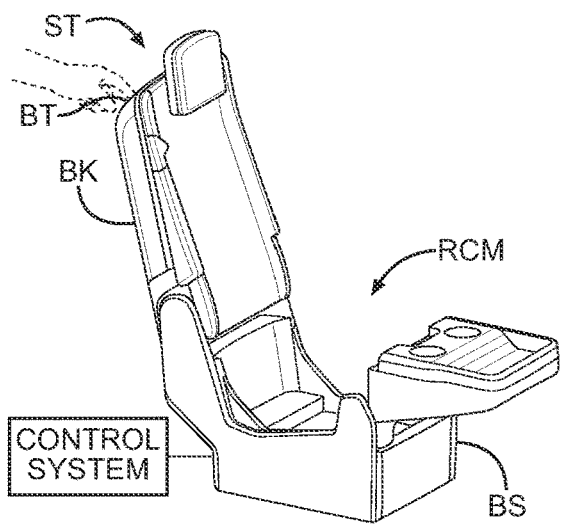
FIG. 17A is schematic perspective view of a seat system for a vehicle interior according to an exemplary embodiment.
Figure 17B:
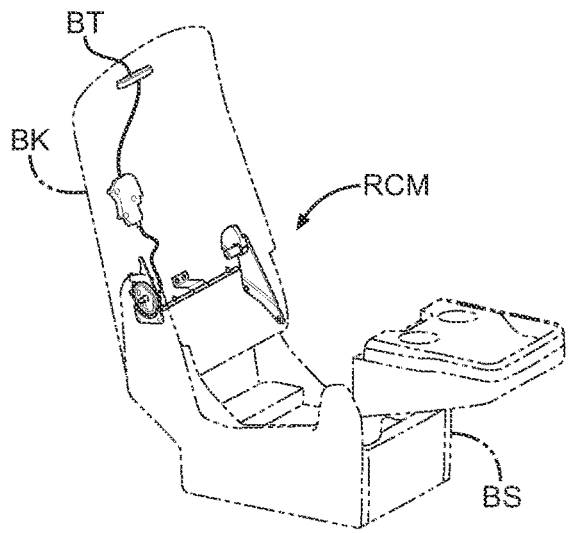
FIG. 17B is schematic partial perspective view of a seat system for a vehicle interior according to an exemplary embodiment.
Figure 18A:
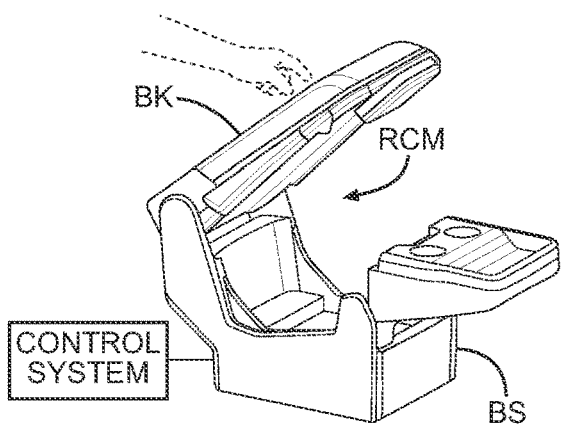
FIG. 18A is schematic perspective view of a seat system for a vehicle interior according to an exemplary embodiment.
Figure 18B:
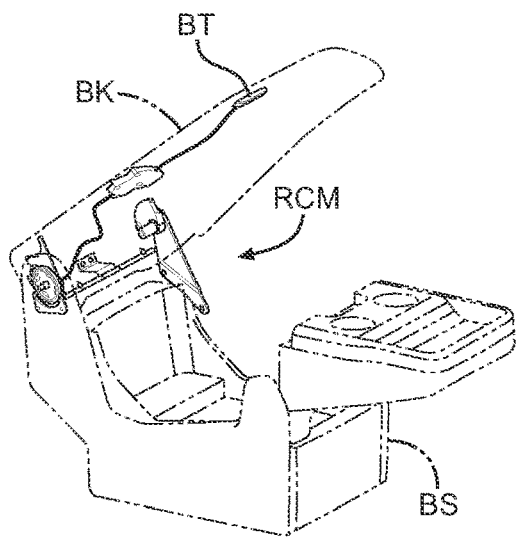
FIG. 18B is schematic partial perspective view of a seat system for a vehicle interior according to an exemplary embodiment.
Figure 19A:
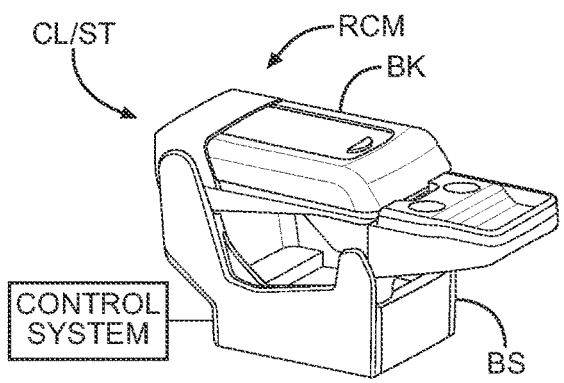
FIG. 19A is schematic perspective view of a seat system for a vehicle interior according to an exemplary embodiment.
Figure 19B:
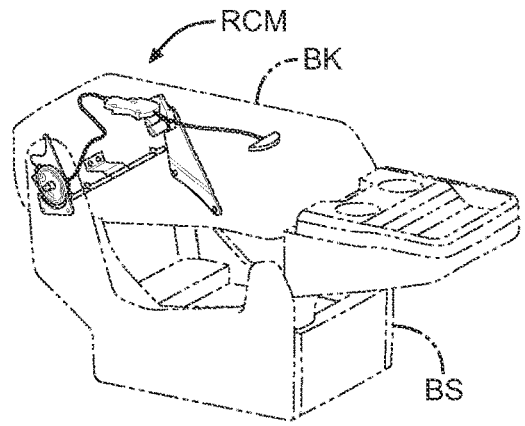
FIG. 19B is schematic partial perspective view of a seat system for a vehicle interior according to an exemplary embodiment.
Figure 20A:
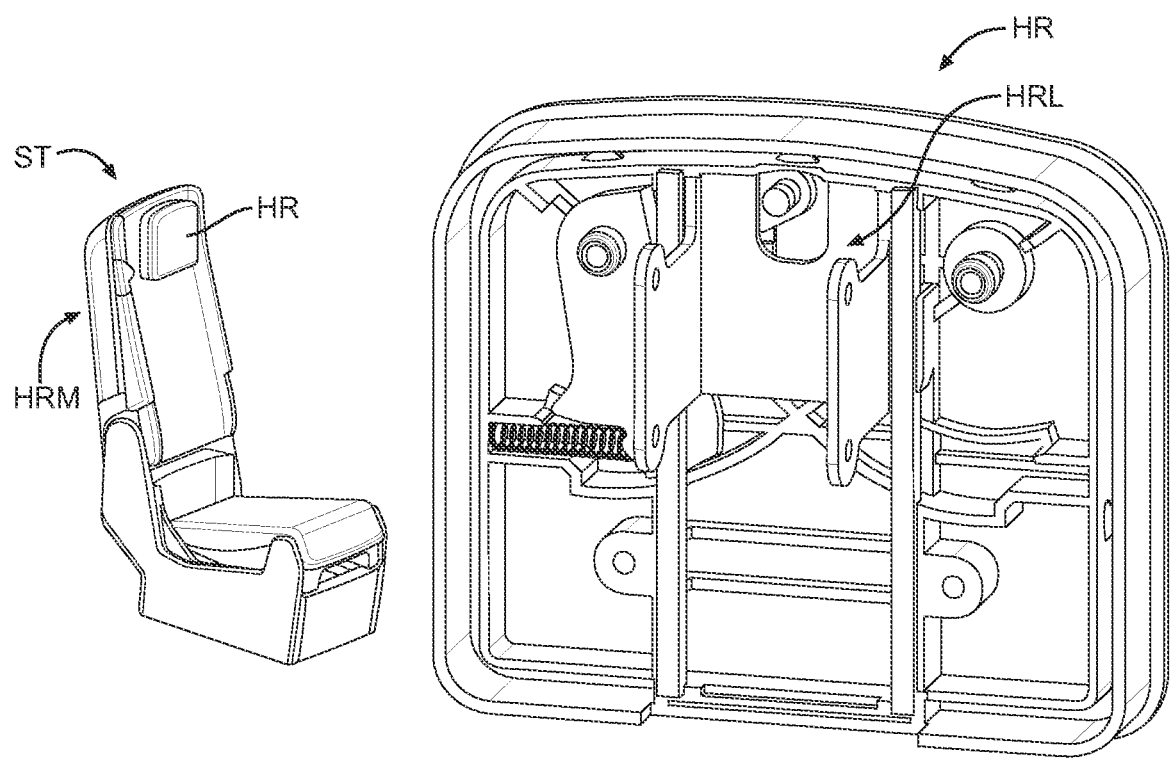
FIGS. 20A through 20B are schematic perspective views of a seat system for a vehicle interior according to an exemplary embodiment.
Figure 20B:
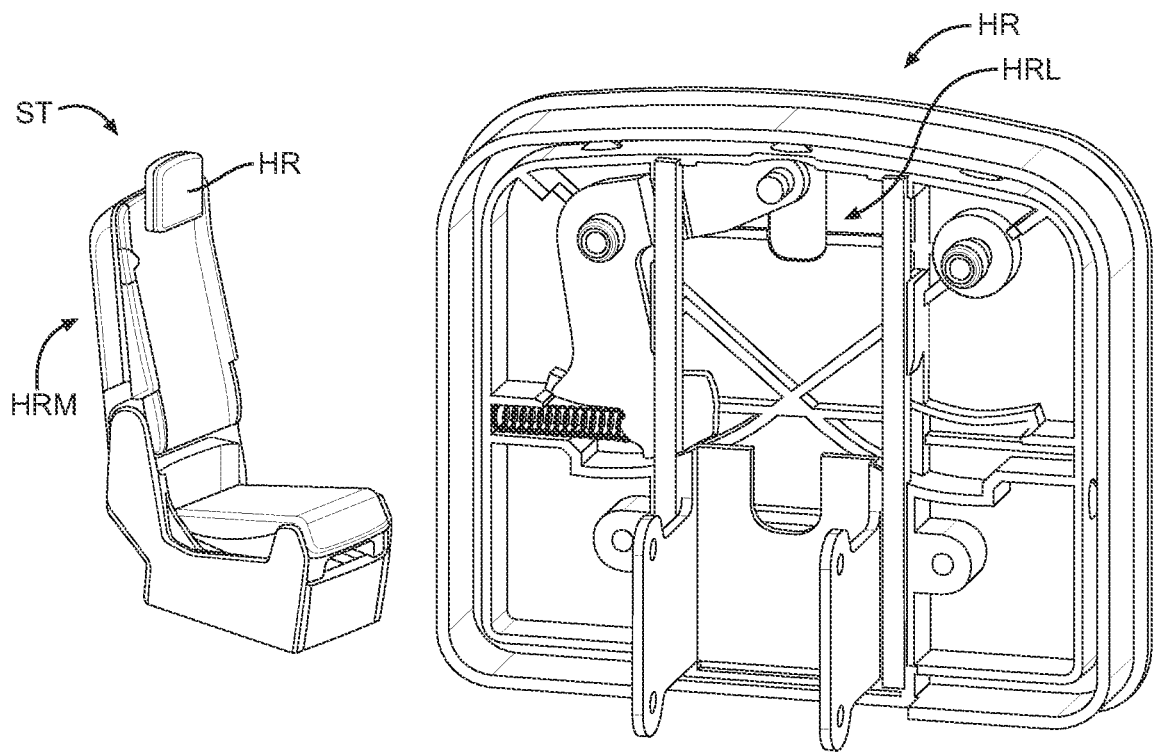
Figure 21A:
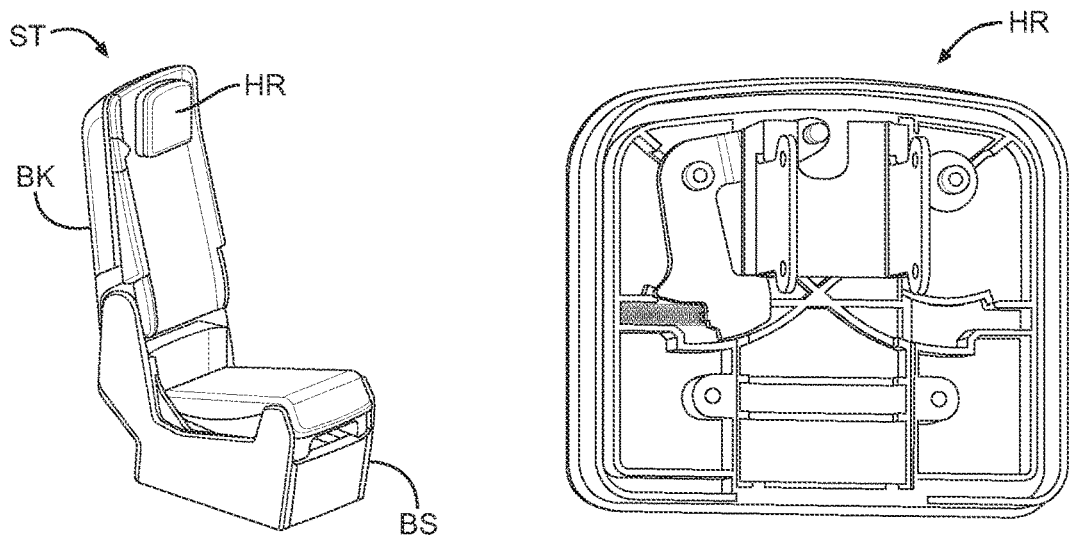
FIGS. 21A through 21F are schematic perspective views of a seat system for a vehicle interior according to an exemplary embodiment.
Figure 21B:
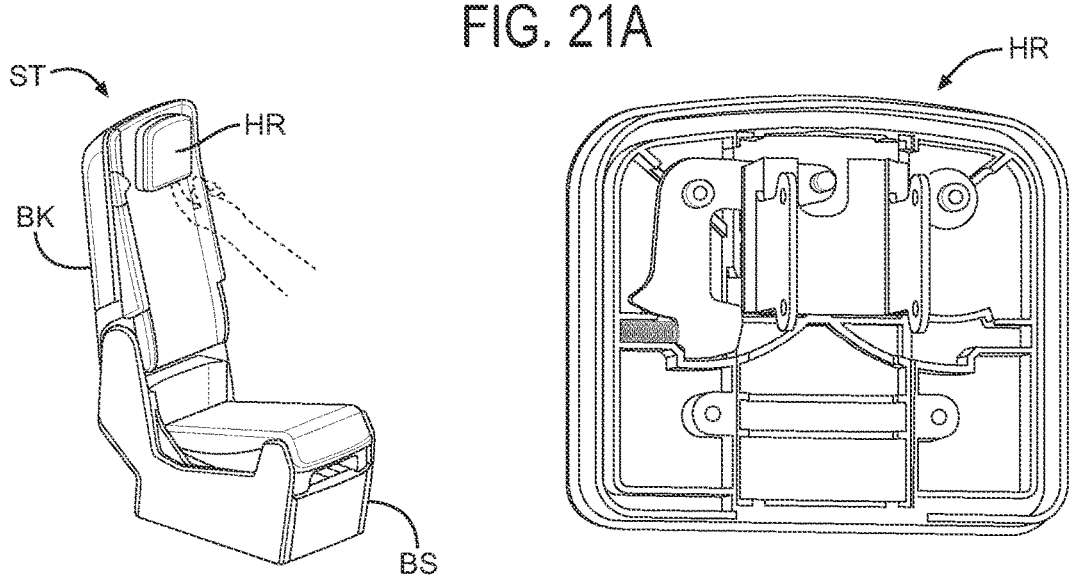
Figure 21C:
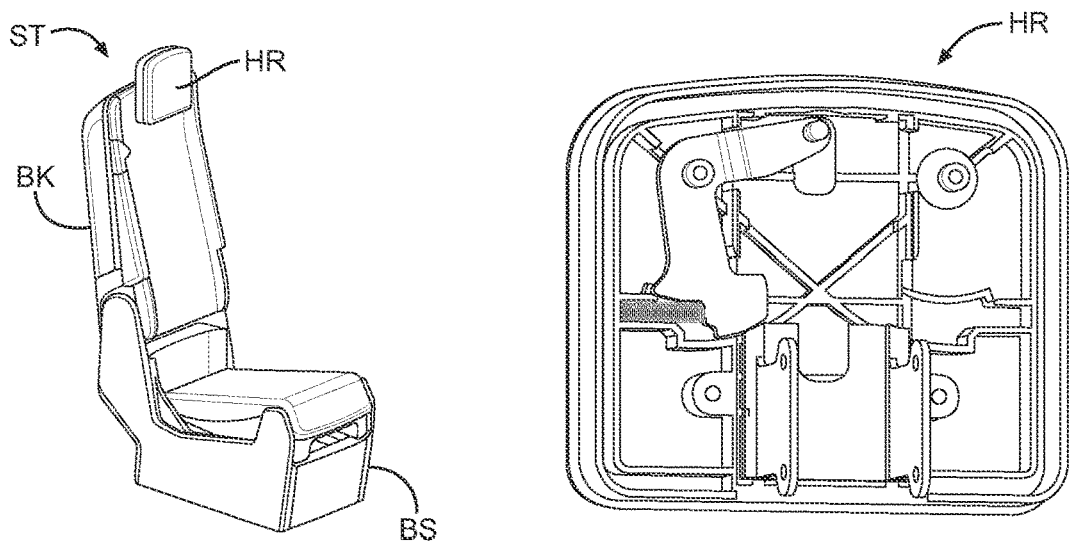
Figure 21D:
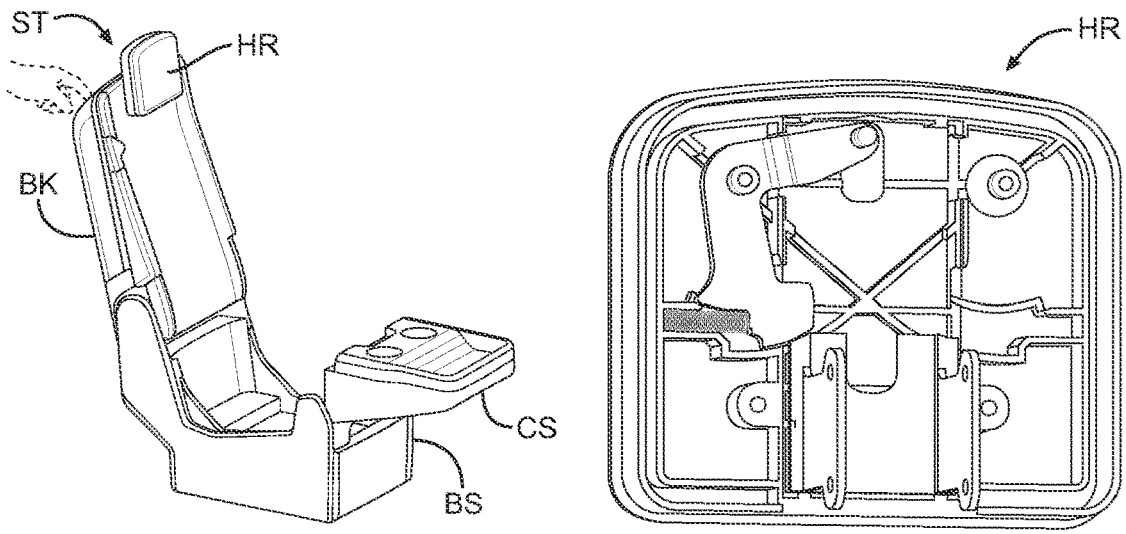
Figure 21E:
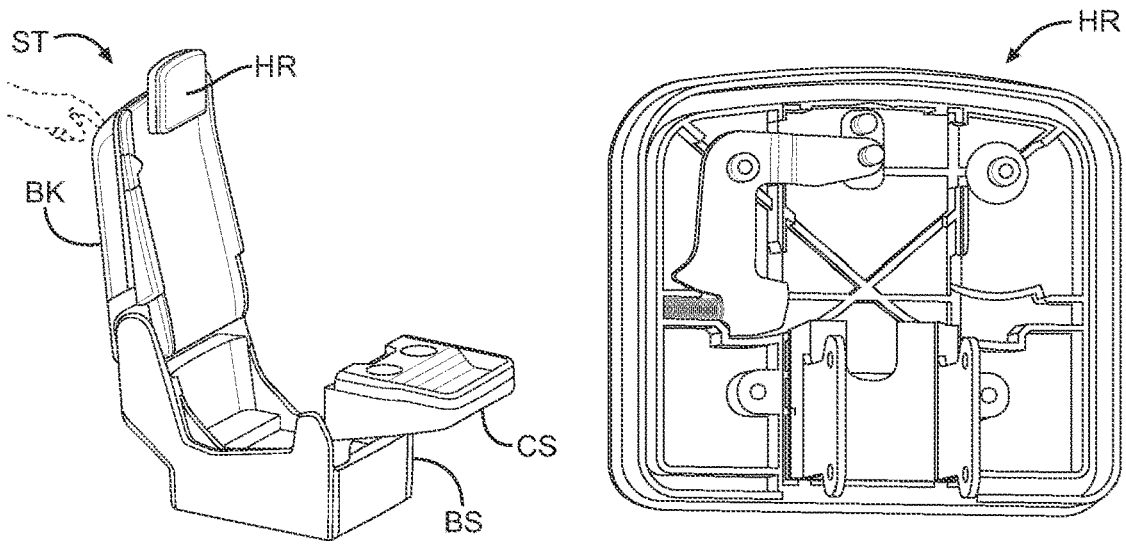
Figure 21F:
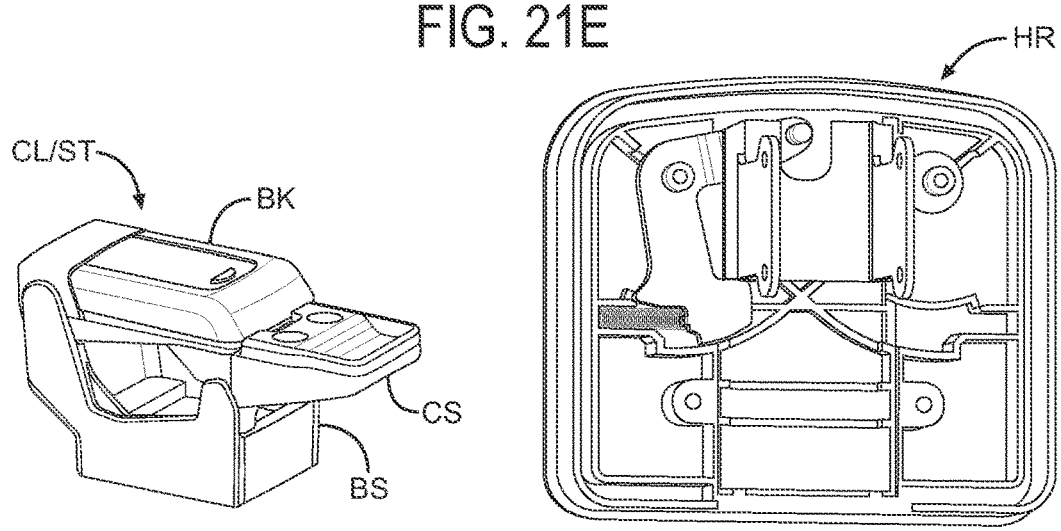
Figure 22:
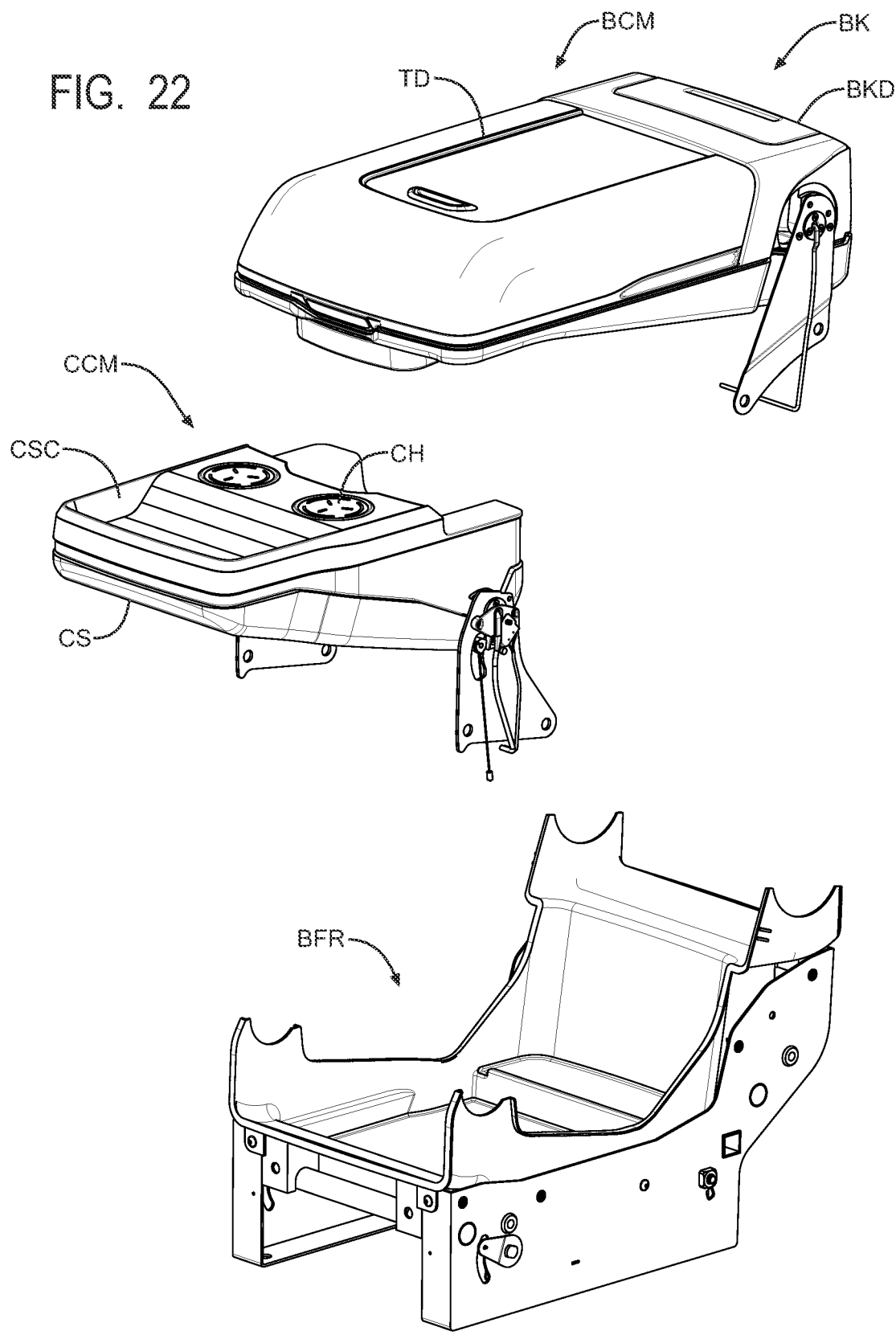
FIG. 22 is a schematic exploded perspective view of a seat system for a vehicle interior according to an exemplary embodiment.
Figure 24A:
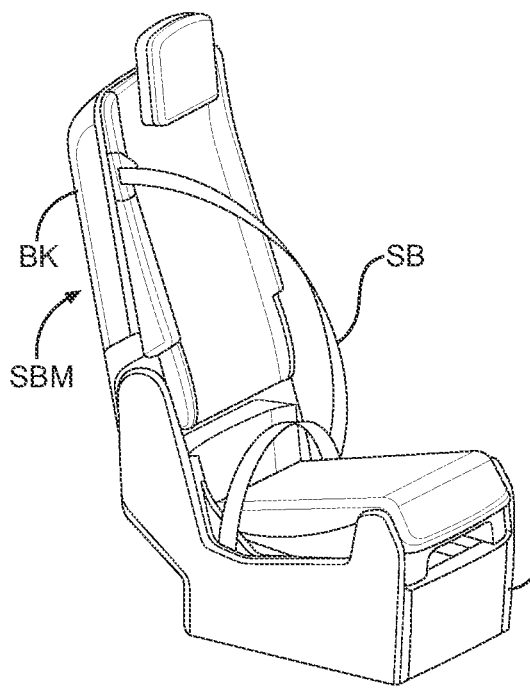
FIG. 24A is a schematic perspective view of a seat system for a vehicle interior according to an exemplary embodiment.
Figure 25A:
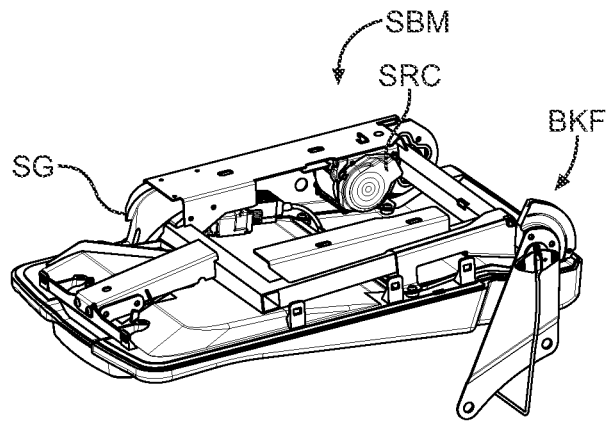
FIG. 25A is a schematic perspective view of a subassembly of a seat system for a vehicle interior according to an exemplary embodiment.
Figure 24B:
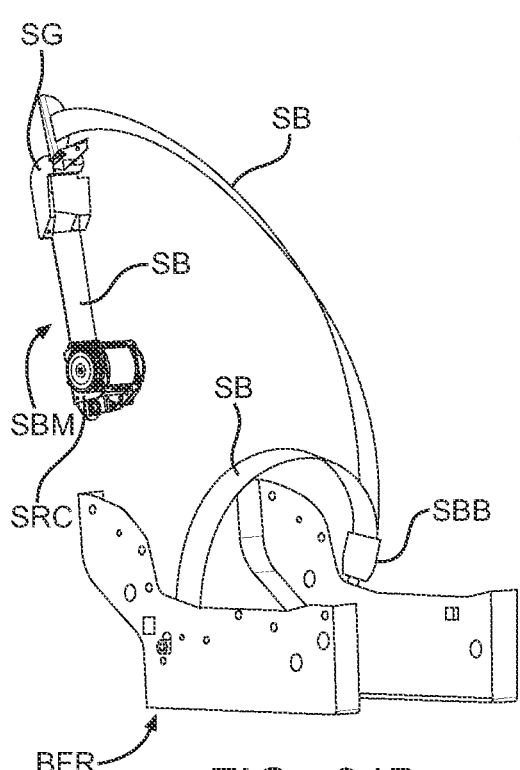
FIG. 24B is a schematic partial perspective view of a seat system for a vehicle interior according to an exemplary embodiment.
Figure 25B:
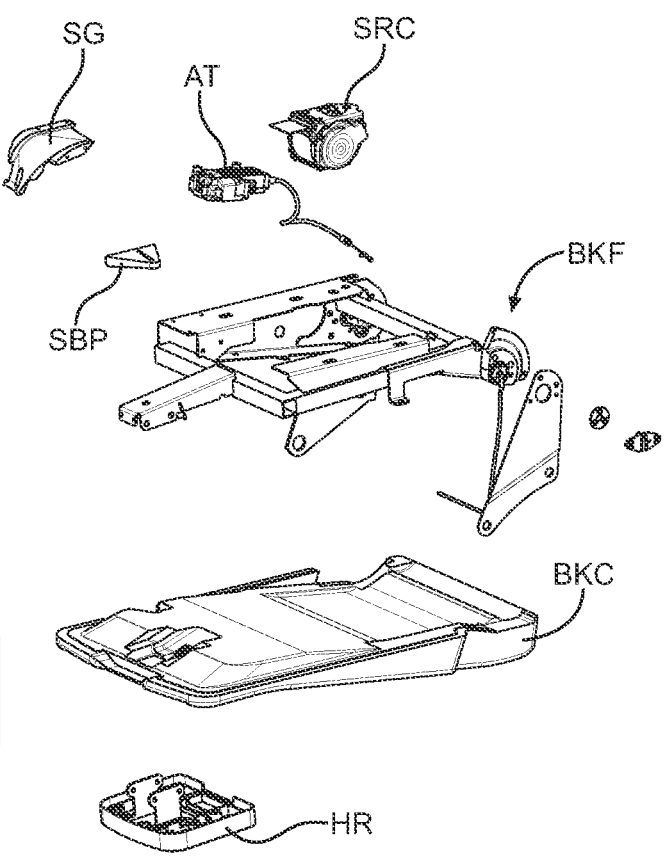
FIG. 25B is a schematic exploded perspective view of a subassembly of a seat system for a vehicle interior according to an exemplary embodiment.
Figure 28A:
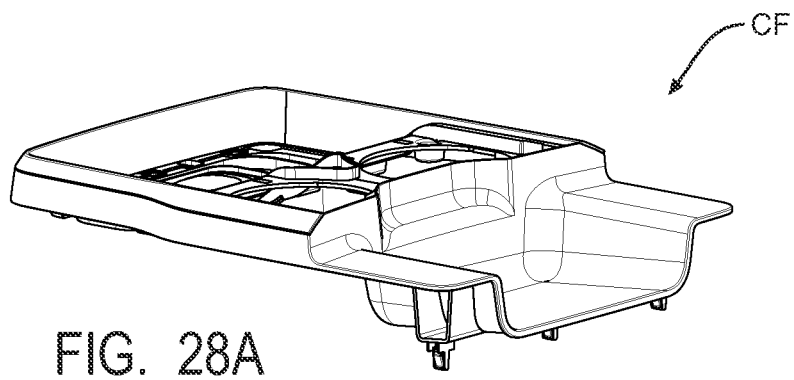
FIG. 28A is a schematic perspective view of a subassembly of a seat system for a vehicle interior according to an exemplary embodiment.
Figure 28B:
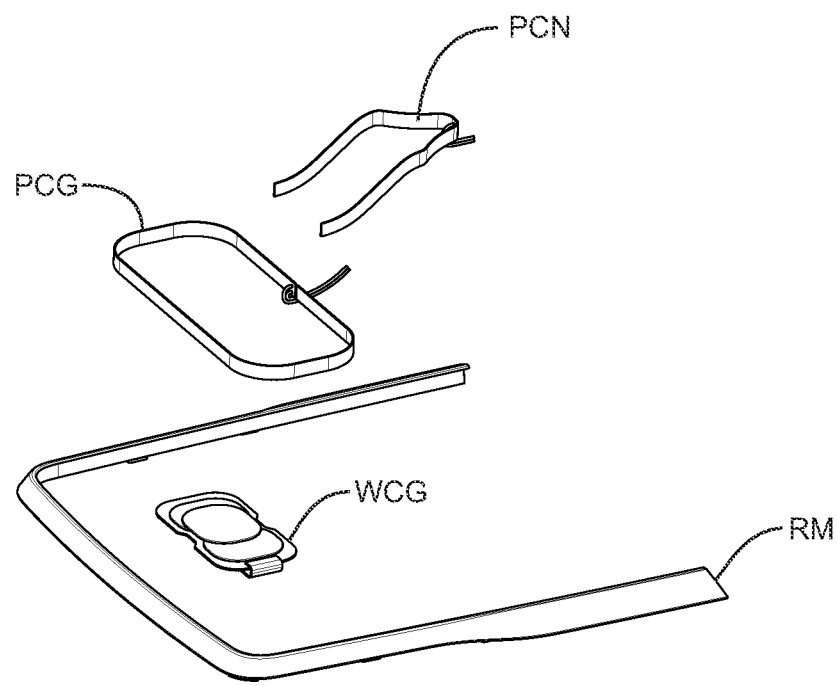
FIG. 28B is a schematic exploded perspective view of a subassembly of a seat system for a vehicle interior according to an exemplary embodiment.
Figure 29A:
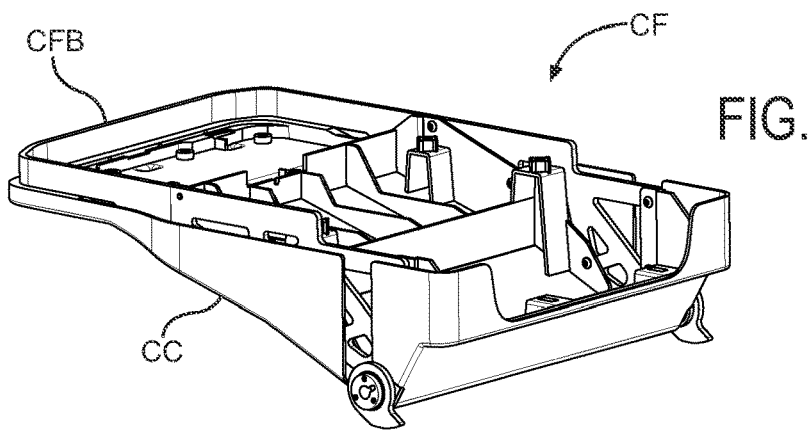
FIG. 29A is a schematic perspective view of a subassembly of a seat system for a vehicle interior according to an exemplary embodiment.
Figure 29B:
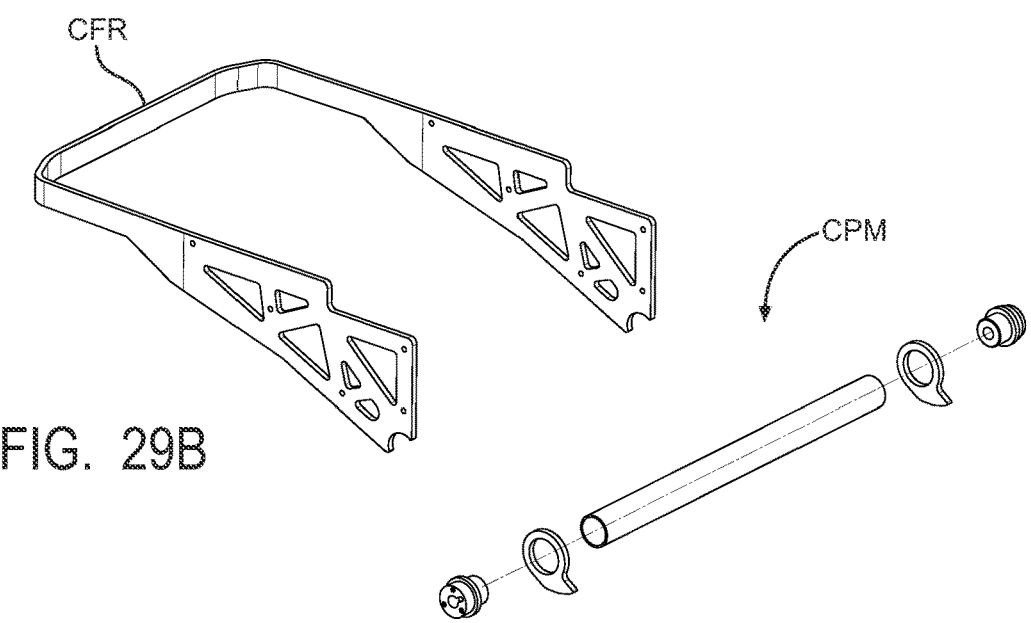
FIG. 29B is a schematic exploded perspective view of a subassembly of a seat system for a vehicle interior according to an exemplary embodiment.
Figure 29C:
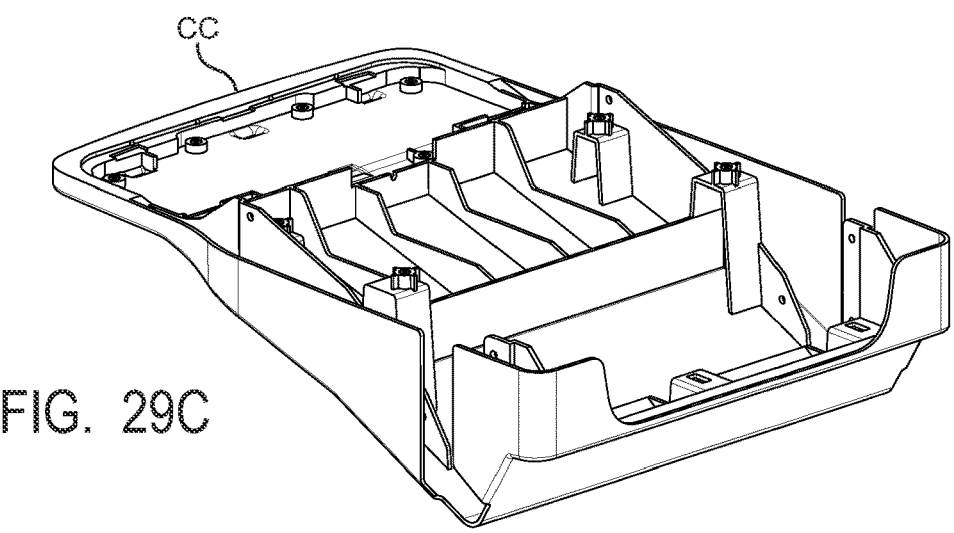
FIG. 29C is a schematic perspective view of a subassembly of a seat system for a vehicle interior according to an exemplary embodiment.
Figure 30A:
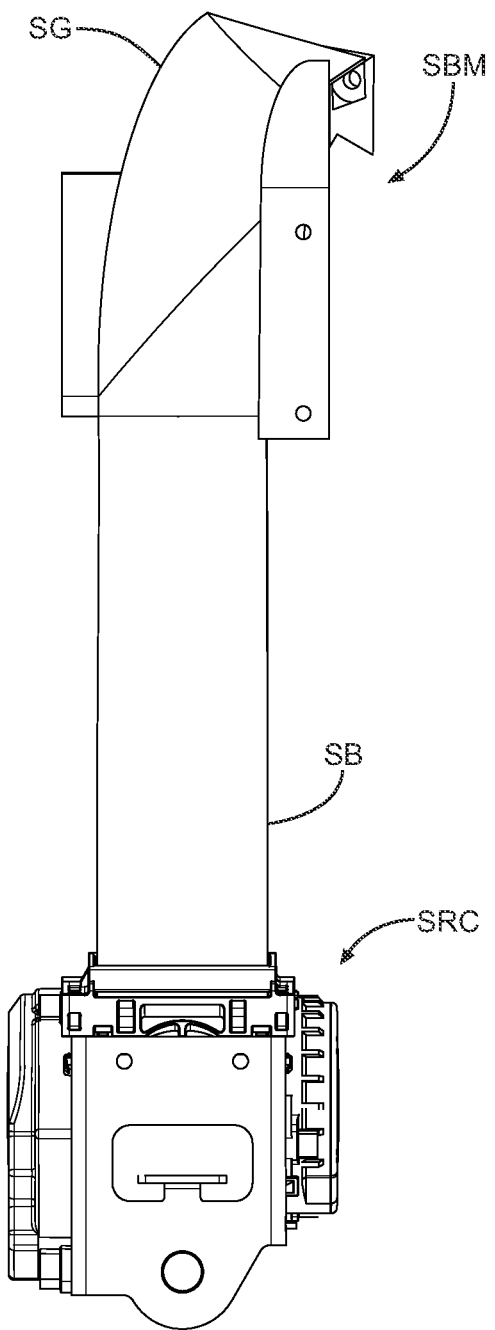
FIG. 30A is a schematic partial rear view of a subassembly of a seat system for a vehicle interior according to an exemplary embodiment.
Figure 30B:
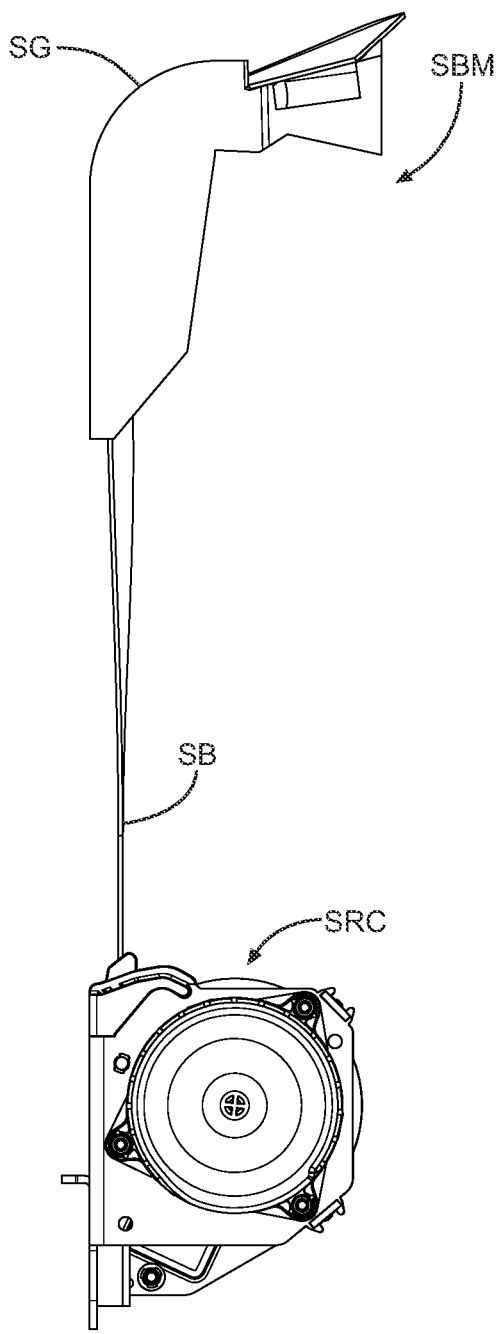
FIG. 30B is a schematic partial rear view of a subassembly of a seat system for a vehicle interior according to an exemplary embodiment.
Figure 31:
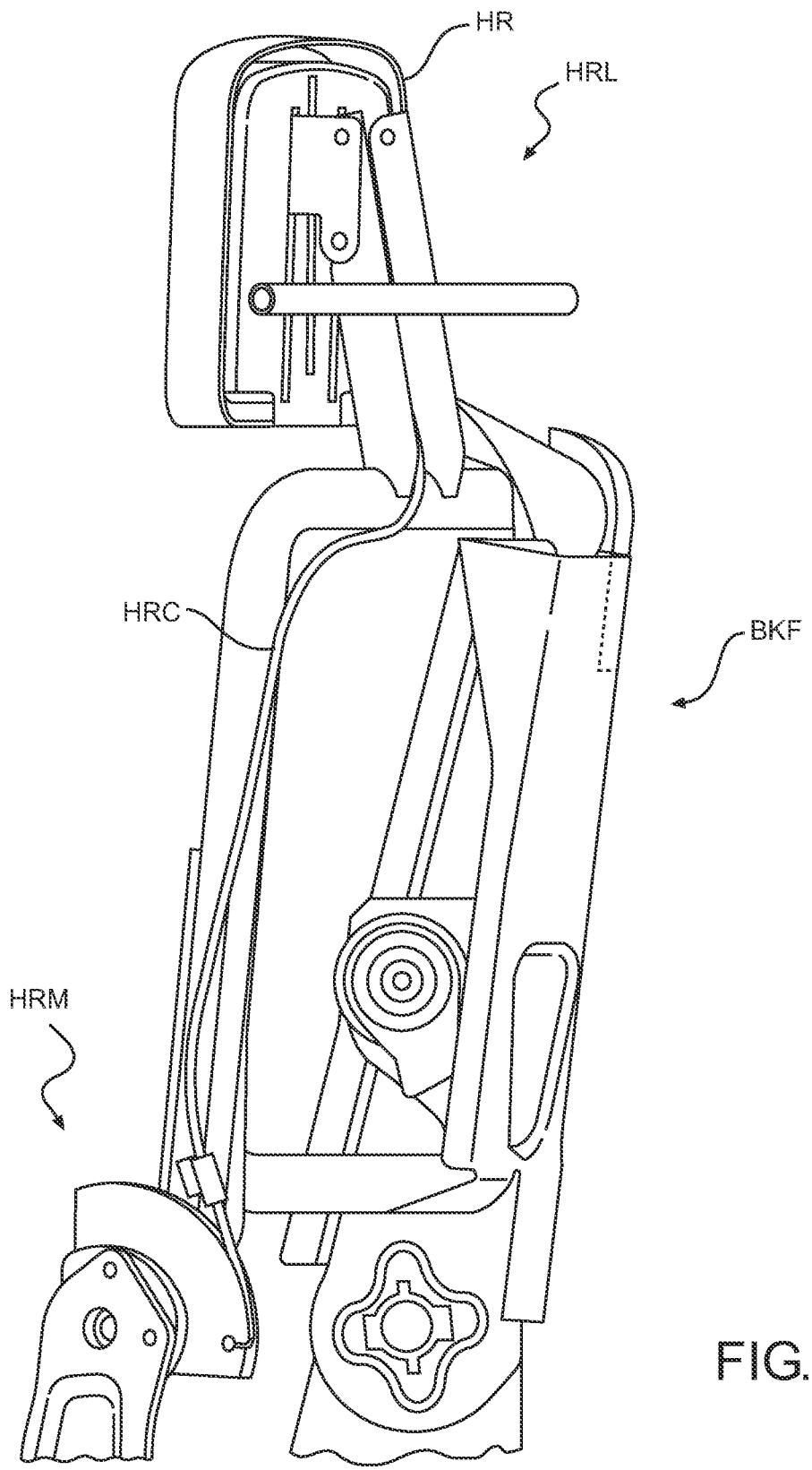
FIG. 31 is a schematic partial perspective view of a subassembly of a seat system for a vehicle interior according to an exemplary embodiment.
Figure 32:
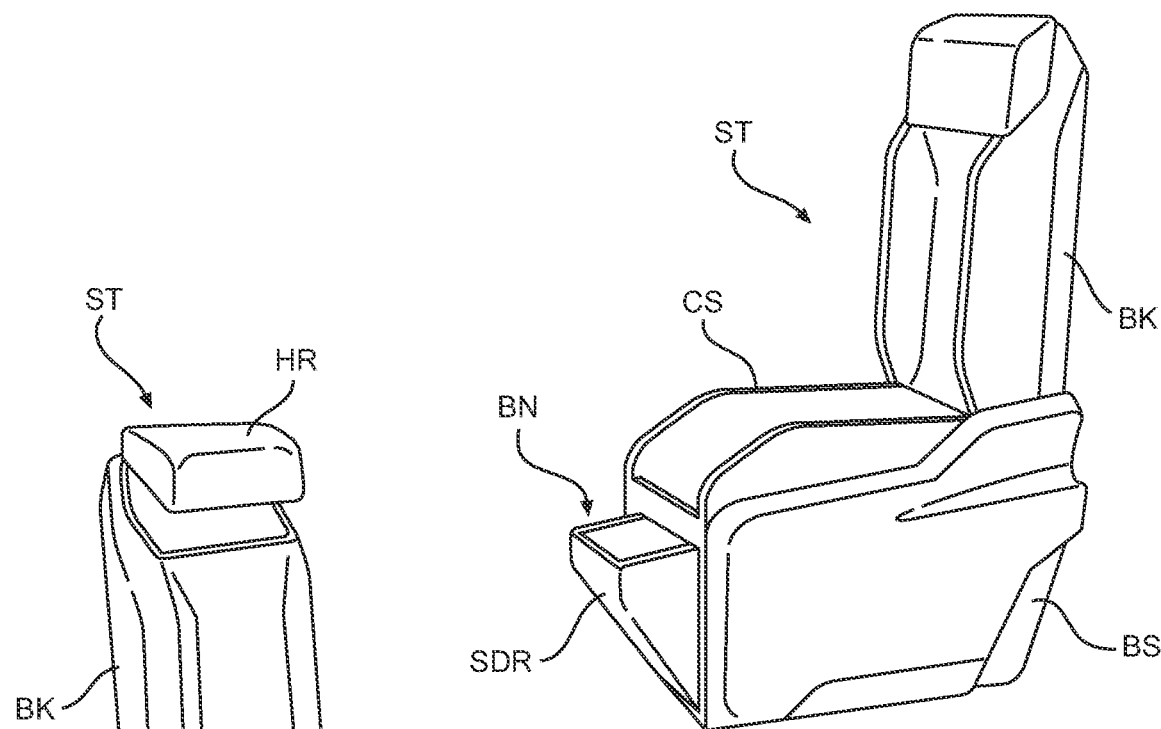
FIG. 32 is a schematic perspective view of a seat system for a vehicle interior according to an exemplary embodiment.
Figure 33:
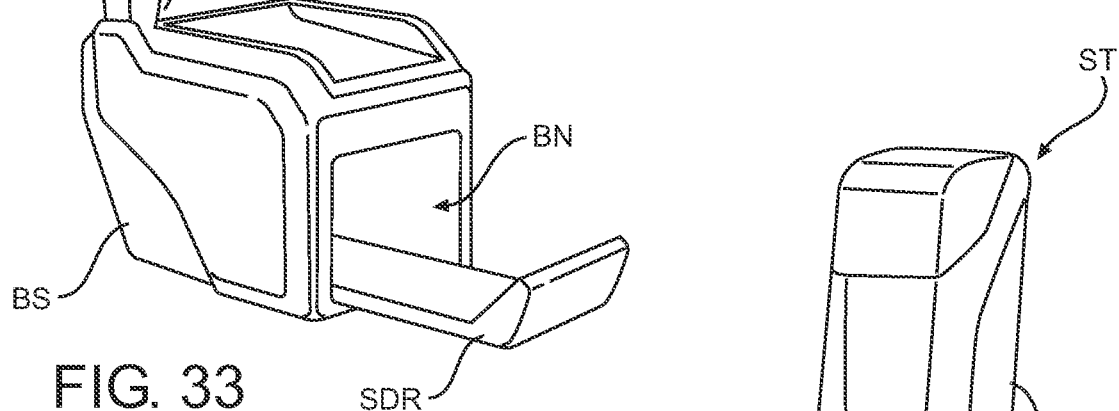
FIG. 33 is a schematic perspective view of a seat system for a vehicle interior according to an exemplary embodiment.
Figure 34:
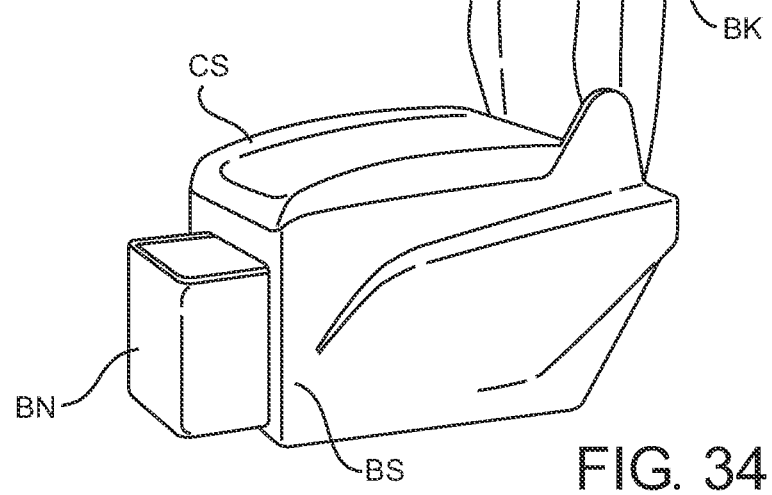
FIG. 34 is a schematic perspective view of a seat system for a vehicle interior according to an exemplary embodiment.
Figure 35:
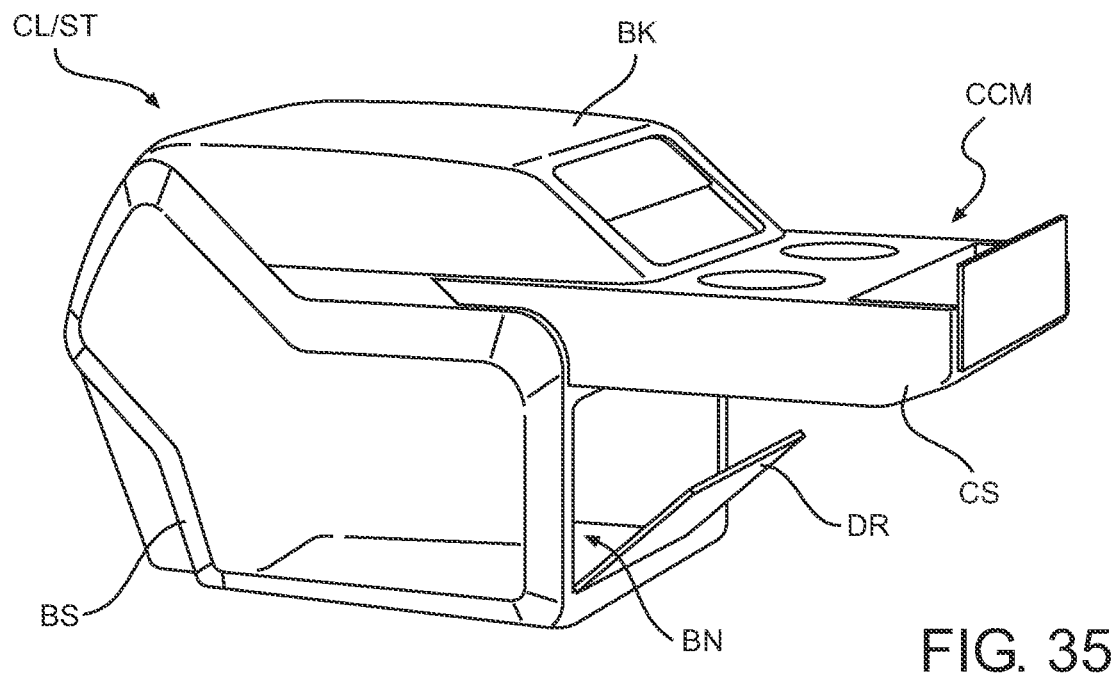
FIG. 35 is a schematic perspective view of a seat system for a vehicle interior according to an exemplary embodiment.
Figure 36:
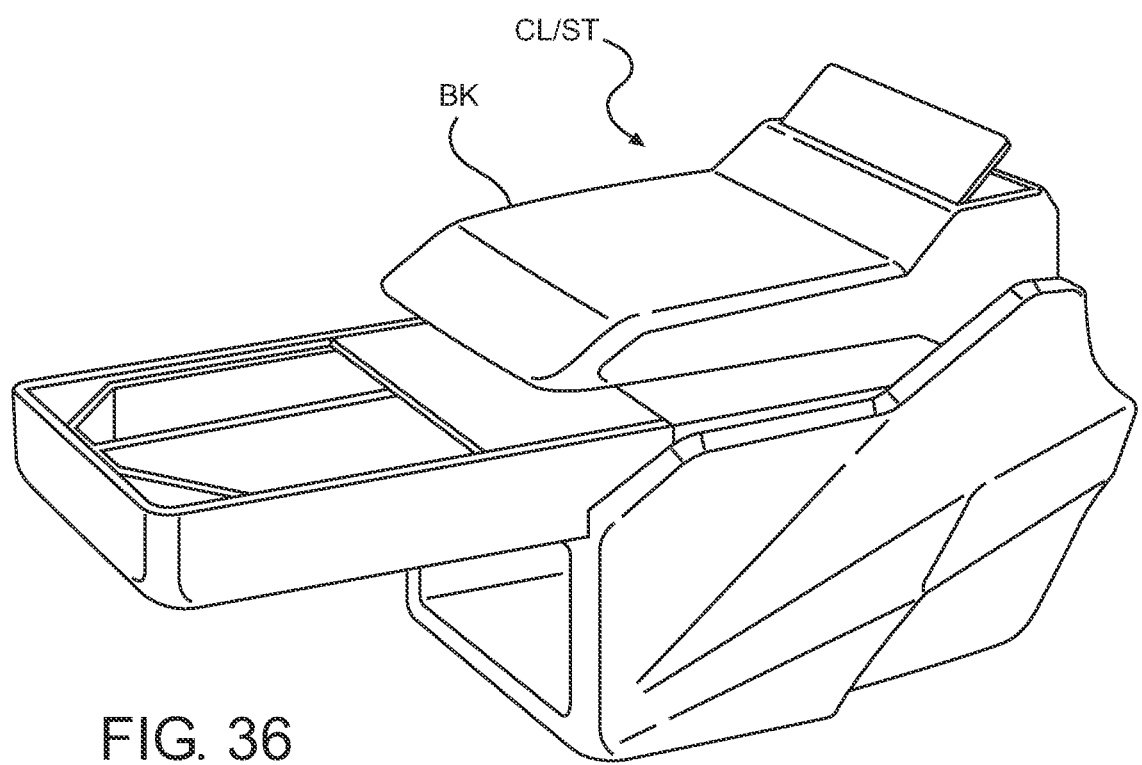
FIG. 36 is a schematic perspective view of a seat system for a vehicle interior according to an exemplary embodiment.
Figure 37:
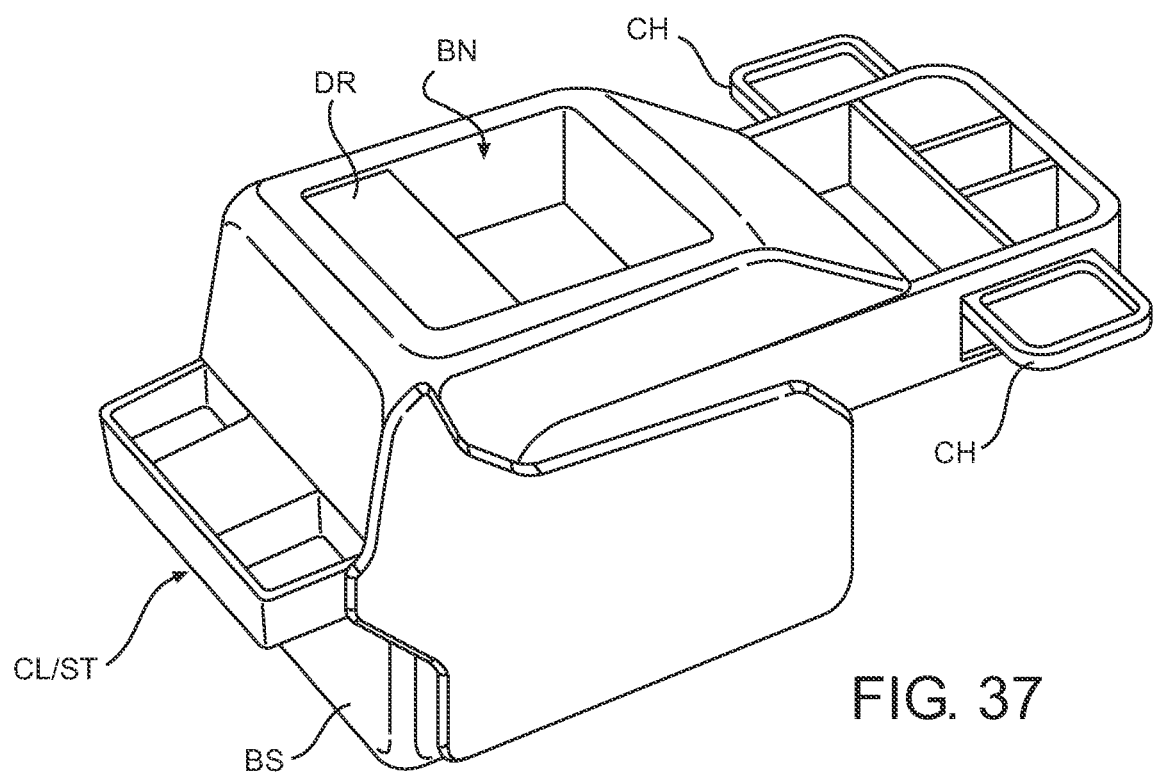
FIG. 37 is a schematic perspective view of a seat system for a vehicle interior according to an exemplary embodiment.
Figure 38:
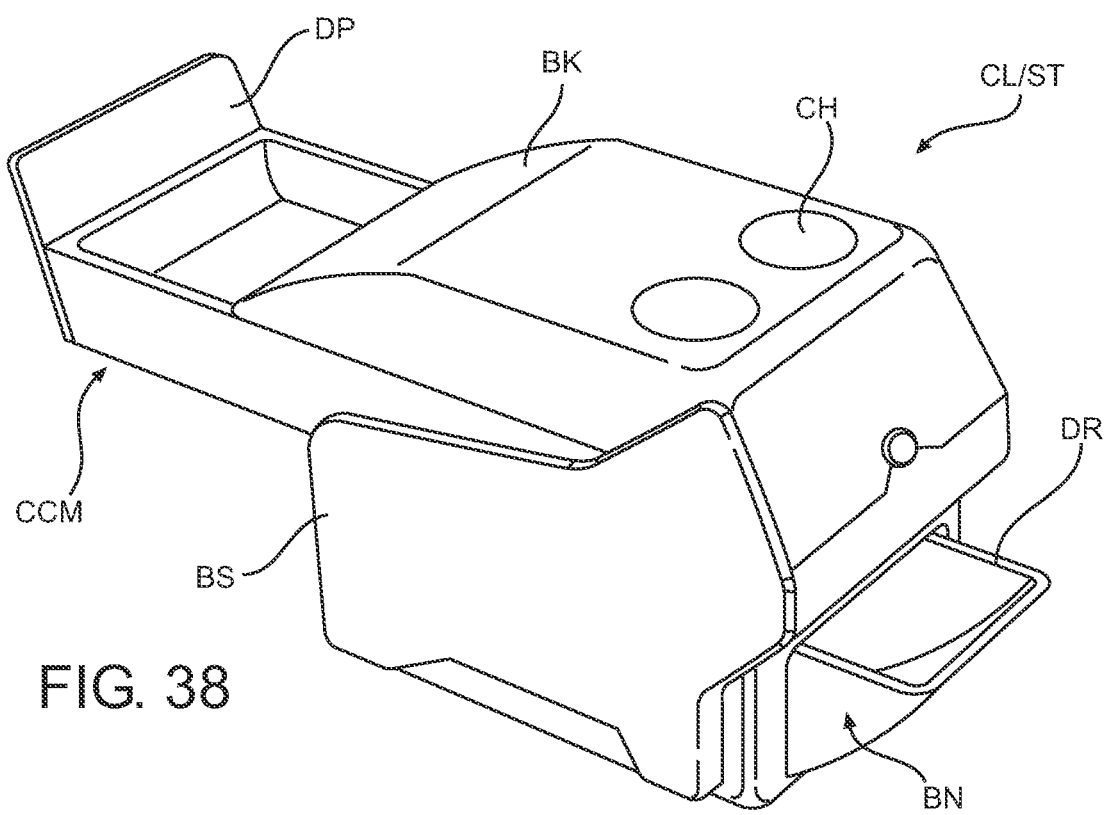
FIG. 38 is a schematic perspective view of a seat system for a vehicle interior according to an exemplary embodiment.
Figure 39:
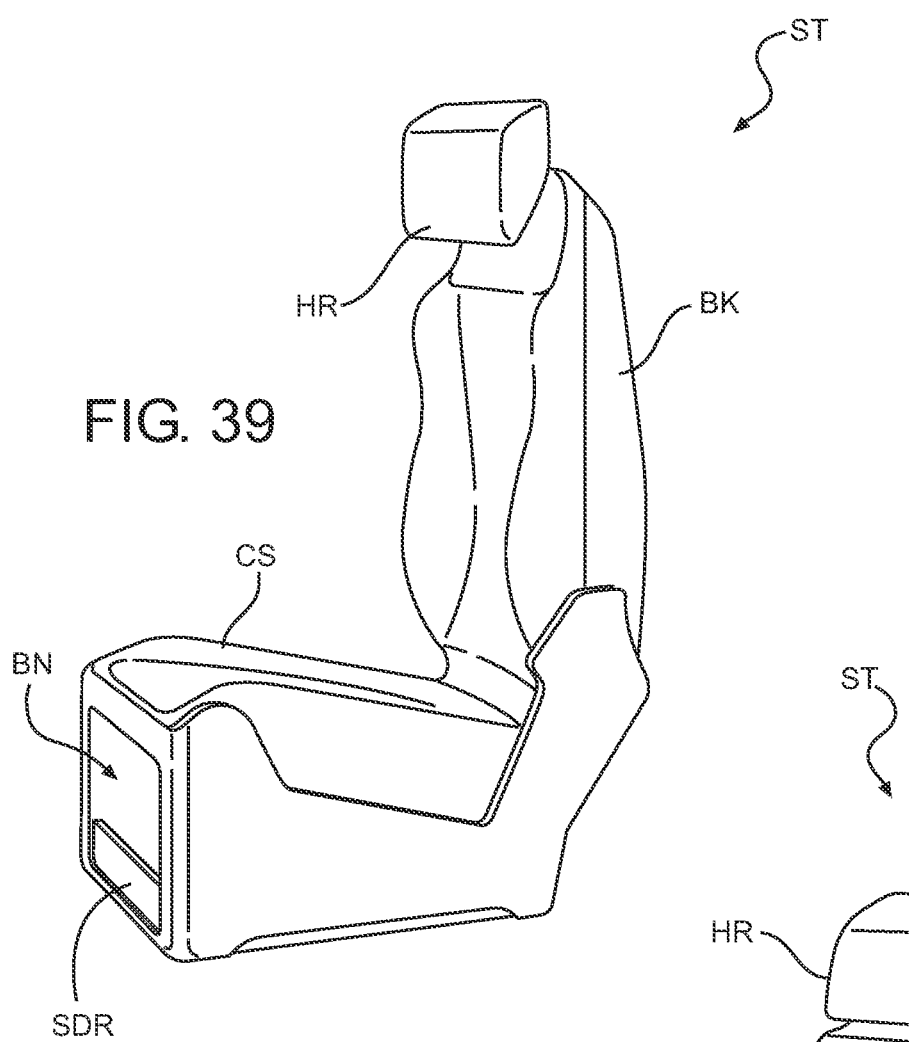
FIG. 39 is a schematic perspective view of a seat system for a vehicle interior according to an exemplary embodiment.
Figure 40:
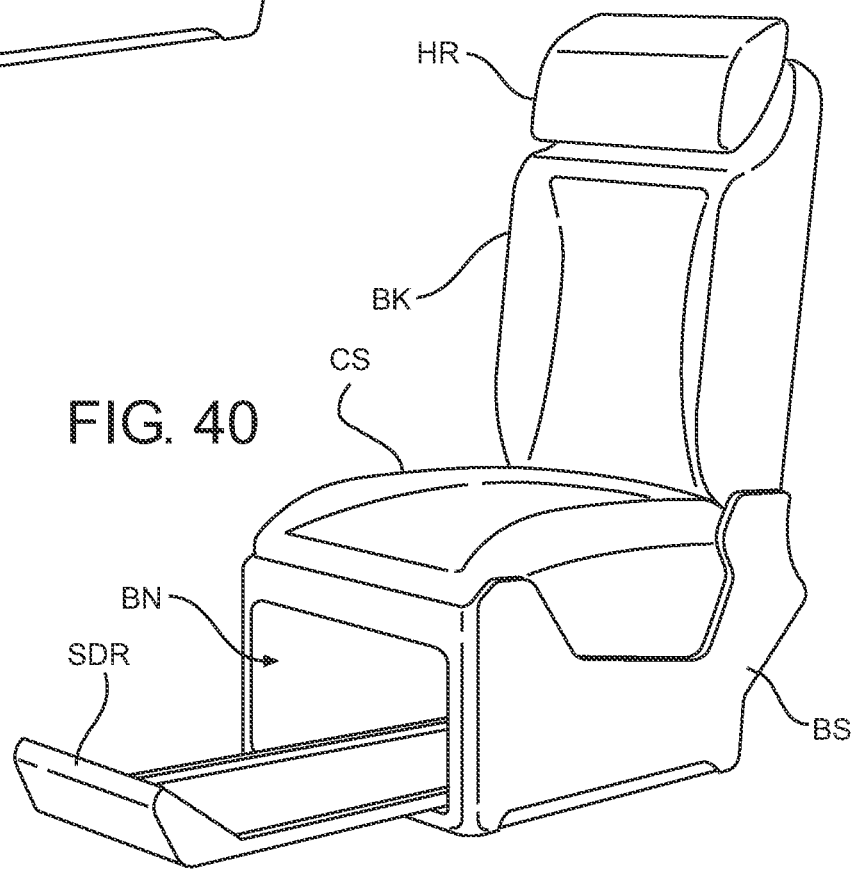
FIG. 40 is a schematic perspective view of a seat system for a vehicle interior according to an exemplary embodiment.
Figure 41:
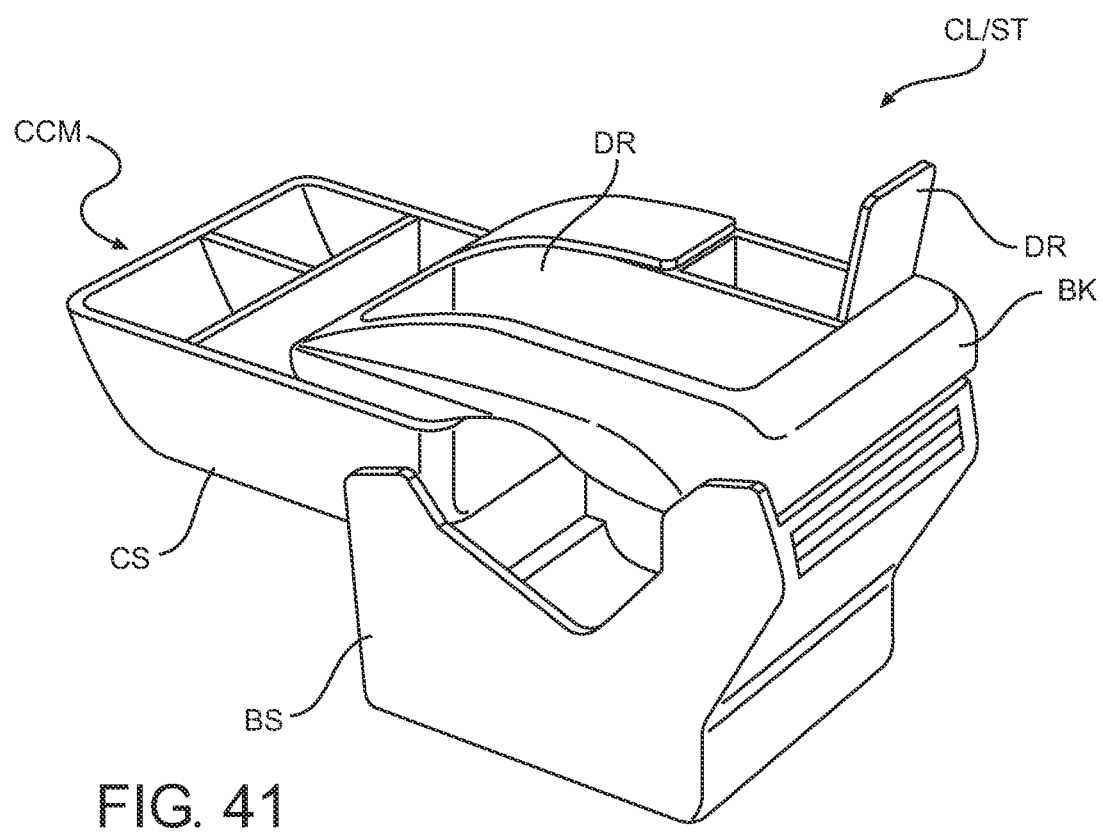
FIG. 41 is a schematic perspective view of a seat system for a vehicle interior according to an exemplary embodiment.
Figure 42:
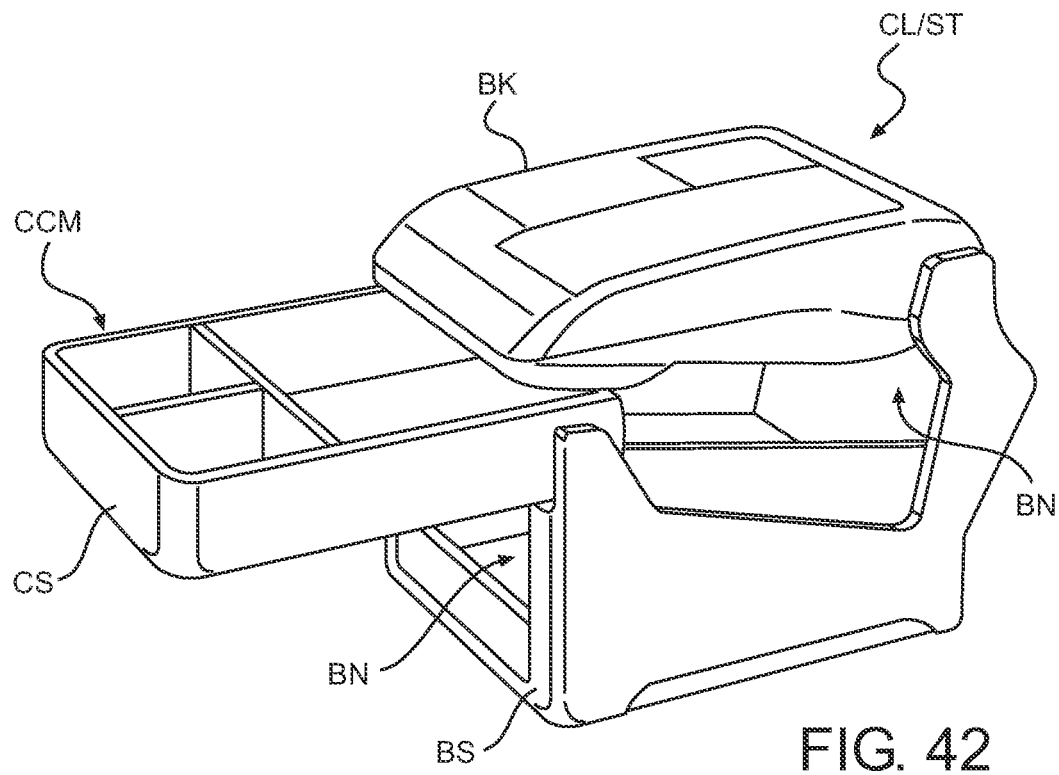
FIG. 42 is a schematic perspective view of a seat system for a vehicle interior according to an exemplary embodiment.
Figure 43:
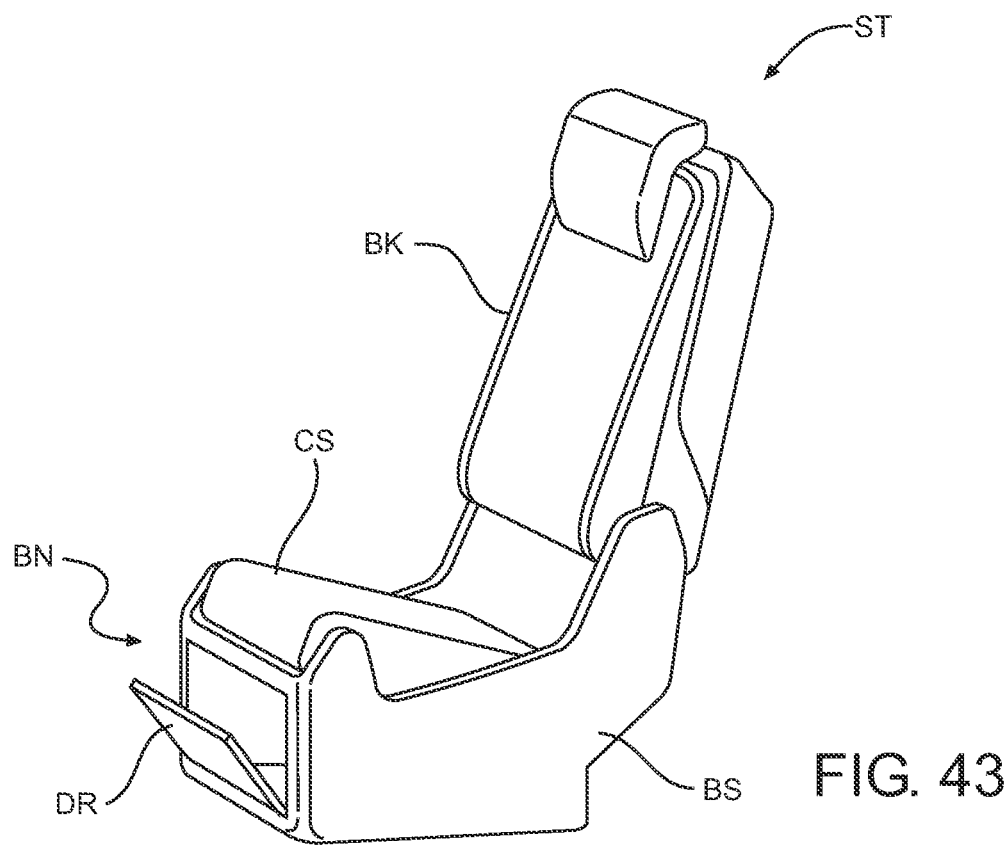
FIG. 43 is a schematic perspective view of a seat system for a vehicle interior according to an exemplary embodiment.
Figure 44:
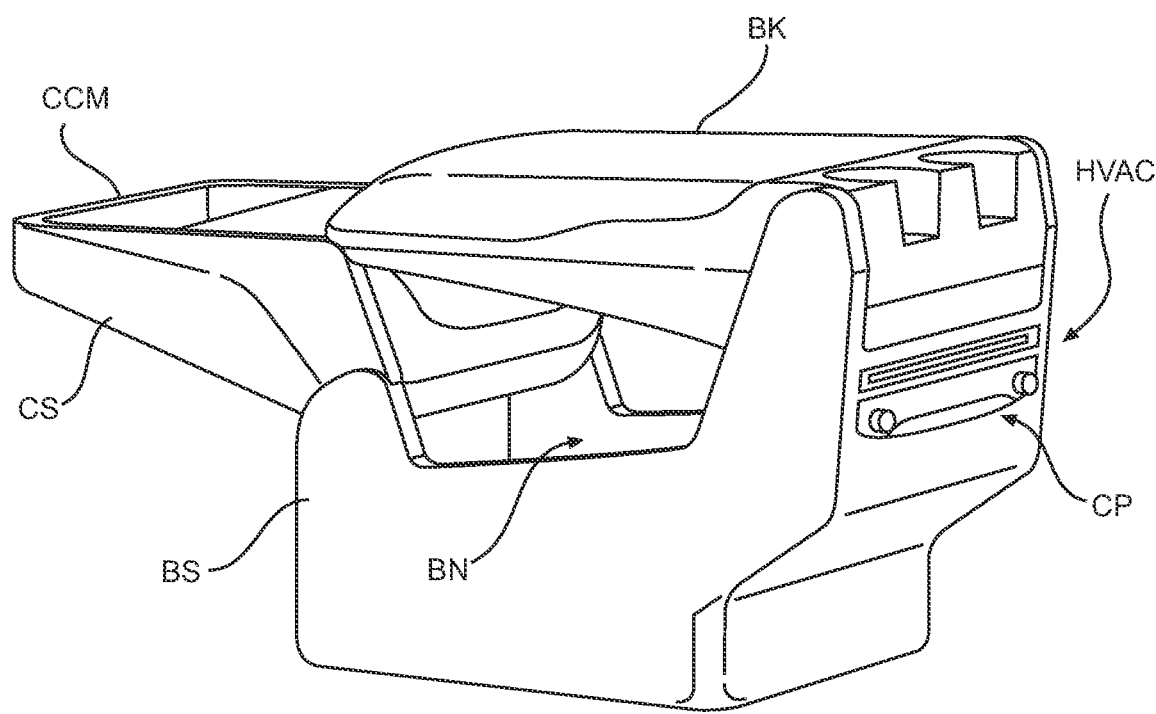
FIG. 44 is a schematic perspective view of a seat system for a vehicle interior according to an exemplary embodiment.
Figure 45:
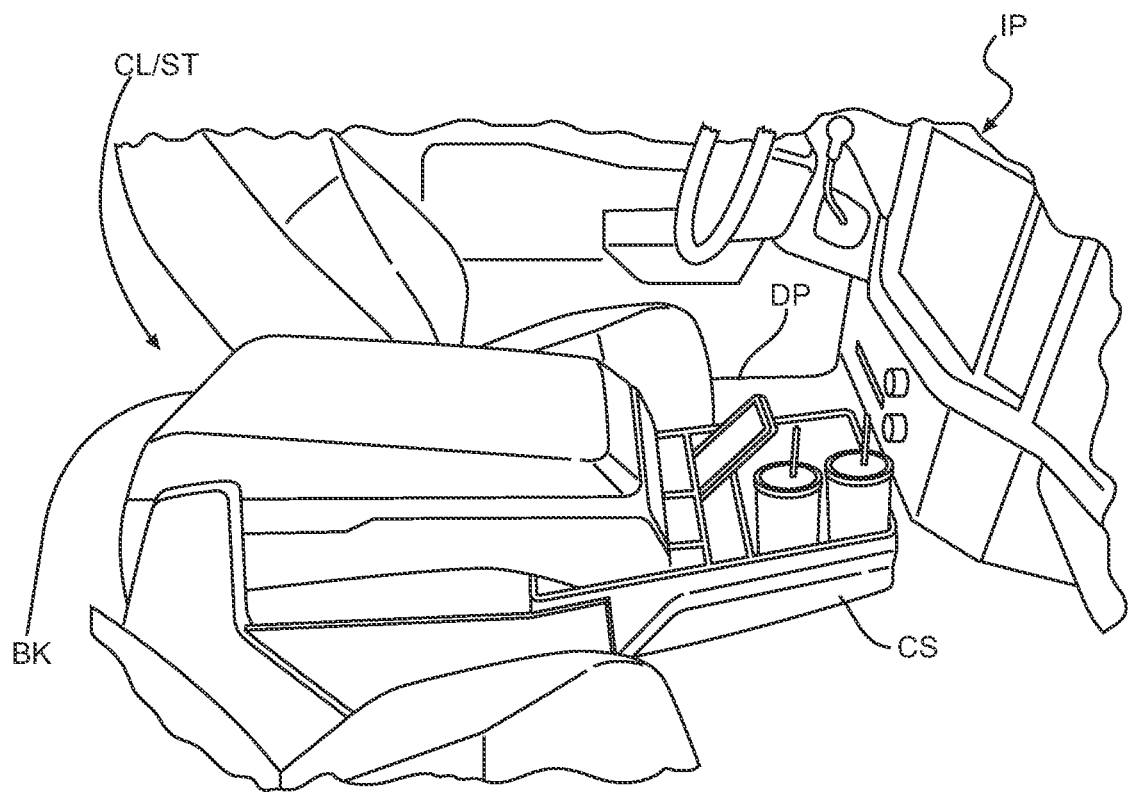
FIG. 45 is a schematic perspective view of a seat system for a vehicle interior according to an exemplary embodiment.

As indicated schematically according to an exemplary embodiment shown in FIGS. 6 and 6C, the seat system may comprise a control element such as a switch/sensor system SW shown as configured to function as an operator control actuated by movement of the cushion assembly CS between the seat position and the console position to provide console section CCM and/or by movement of back assembly BK between the seat position and the console position to provide console section BCM. See also FIGS. 4A-4C, 5, 7, 14A-14B, 15A-15B and 16A-16B. As indicated schematically according to an exemplary embodiment shown in FIGS. 6 and 6C, switch/sensor system SW of the seat system may be configured to actuate the control system and/or to actuate modules shown as functional modules for console CL of the seat system. See also FIGS. 4A-4C, 5, 7 and 7A-7H.

As indicated schematically according to an exemplary embodiment shown in FIGS. 5, 7 and 7A-7H, the seat system may comprise a control system with switch/sensor system SW and/or functional modules for console CL of the seat system such as a head restraint position module, a latch module for a bin providing a compartment in the base, a display system module providing a display panel, a power/charging module for a device such as a mobile device, a mobile device connect module. a lighting module for a compartment in the base, a lighting module for a cup holder in the console, a ventilation HVAC module and/or interconnectivity to vehicle systems or networks (such as the internet, local networks, etc.). As indicated schematically according to an exemplary embodiment shown in FIGS. 4A-4C, 5, 6, 6A-6C and 7, the seat system may be configured with the control element configured to be operated by movement of the back assembly into the console position and/or the cushion assembly into the console position to provide console CL; the control element may be configured to actuate the modules shown as functional modules to be operable when console CL is provided (e.g. with deployment of console section BCM and/or console section CCM).

As indicated schematically according to an exemplary embodiment shown in FIGS. 4A-4C, 5, 6, 6A-6C and 7, the seat system may comprise a control element configured for the back assembly and/or the cushion assembly and a functional module configured to be operable when the console is provided; the control element may comprise a switch, a limit switch, a sensor, a position sensor, a rotation sensor, a proximity detector, etc.; the control element may be configured to be actuated by movement of the back assembly and/or the cushion assembly. According to an exemplary embodiment, the control element may be configured to shut off power to the functional module and/or to shut off power to the functional module when the back assembly is in the seat position and/or to shut off power to the functional module when the cushion assembly is in the seat position and/or to provide power to the functional module when the back assembly is in the seat position and/or to provide power to the functional module when the cushion assembly is in the seat position. According to an exemplary embodiment, a functional module may operable when power is provided (e.g. from a power source for the vehicle); a functional module may be inoperable when power is shut off (e.g. to conserve power/energy in periods of non-use, etc.). As indicated schematically according to an exemplary embodiment shown in FIGS. 4A-4C, 5, 6, 6A-6C and 7, the seat system may be configured with a control element configured to be operated to actuate a functional module by movement of the back assembly into the console position and/or the cushion assembly into the console position to provide the console.

As indicated schematically according to an exemplary embodiment shown in FIGS. 4A-4C, 5, 6, 6A-6C and 7, the seat system may be configured with set of a functional modules; the functional modules may comprise operator controls such as a control panel CP, etc. See FIG. 44.

As indicated schematically in FIGS. 5, 6, 7, 7A, 20A-20B, 21A-21F, 25B and 31, a functional module may comprise a head restraint position module/mechanism HRM configured to be actuated by movement of back assembly BK to move head restraint HR to a retracted position for deployment into the console position; mechanism HRM may comprise an actuator AT and a cable HRC configured to actuate a latch mechanism HRL that may be released to facilitate movement of the head restraint into the retracted position.

As indicated schematically in FIGS. 5, 6, 7 and 7B, a functional module may comprise a latch module for back assembly BK to provide a cover for a bin BN providing a compartment in base BS when console CL is provided; as indicated schematically, the latch module may be provided with the recliner mechanism RCM to retain the back assembly BK in the console position until released at an operator control such as BT/RCB (or release by operation of a detector, such as by facial recognition, finger/touch recognition, etc.). See also FIGS. 4C, 17A-17B, 18A-18B and 19A-19B.

As indicated schematically in FIGS. 5, 6, 7, 7C and 27A-27B, a functional module may comprise a lighting module for a cup holder in the console comprising cup holders CH in an arrangement comprising a base CHB and cover CLF with holders shown as illuminated holders CHN.

As indicated schematically in FIGS. 5, 6, 7, 7D, 15A and 16A, a functional module may comprise a lighting module LM for a compartment in the base; as indicated schematically, the lighting module may be configured to provide light into the compartment when activated by a control element such as switch SW or at a control panel CP. See also FIGS. 6C, 15B and 44.

As indicated schematically in FIGS. 5, 6, 7, 7E, 27A-27B and 28A-28B, a functional module may comprise a power/charging module PCG for a device such as a mobile device MD; the power/charging module may provide connectors shown as PCN; the power/charging module may comprise a wireless charger pad CHG and/or a charging element WCG; the power/charging module may comprises a charger connection to the device (e.g. for charging cable).

As indicated schematically in FIGS. 5, 6, 7, 7F and 44, a functional module may comprise a ventilation HVAC module configured to connect with the vehicle HVAC system and to provide an operator control such as a control panel CP.

As indicated schematically in FIGS. 5, 6, 7, 7G and 28A-28B, a functional module may comprise a mobile device connect module MDM for a mobile device MD that may be configured to connect a mobile device to vehicle systems and/or networks.

As indicated schematically in FIGS. 5, 6, 7, 7H, 38 and 45, a functional module may comprise a display system module providing a display panel DP (shown as configured to provide an image and/or data display) that may be configured to be connected to a mobile device and/or vehicle systems and/or networks.

As indicated schematically in FIGS. 5, 6, 7 and 7G-7H, the control system and/or a functional module of the seat system may be configured to provide for interconnectivity to vehicle systems or networks (such as the internet, local networks, etc.) for data interchange, communications, etc.

As indicated schematically in FIGS. 3A-3D, 4A-4C and 22, the seat assembly/system may comprise a base BS comprising a frame BFR and a back assembly BK and a cushion assembly CS; back assembly BK and cushion assembly CS may be assembled onto frame BFR of base BS; back assembly BK and cushion assembly CS may each independently move relative to base BS to provide a seat position and a console position.

As indicated schematically in FIGS. 3A-3D, 22, 23A-23B, 24A-24B and 25A-25B, back assembly BK configured to provide a seat and console section BCM may comprise a frame BKF and an insert section BCS and a door arrangement with door shown as tambour door TN movable on rails RL and a cover BKC and section with door BKD on frame/cover section BKR; back assembly BK may comprise a head restraint HR with head restraint mechanism HRM and a seat belt arrangement with seat belt mechanism SBM. See also FIGS. 20A-20B, 21A-21F, 30A-30B and 31. As indicated schematically in FIGS. 23A-23B, 24A-24B and 25A-25B, back assembly BK may comprise a recliner mechanism RCM with operator control BT/RCB. See also FIGS. 4C, 6, 6A, 17A-17B, 18A-18B and 19A-19B. As indicated schematically in FIGS. 4C, 7 and 7A-7H, back assembly BK may comprise components of the functional modules for console CL. As indicated schematically in FIGS. 4C, 17A-17B, 18A-18B and 19A-19B, recliner mechanism RCM of back assembly BK may be configured to be operated by operator control BT/RCB and configured to facilitate movement of back assembly BK between the seat position and the console position to provide console section BCM; back assembly BK may also comprise a sensor/switch system SW actuated by movement/position. See also FIGS. 14B, 15B and 16B.

As indicated schematically in FIGS. 3A-3D, 22, 26A-26B, 27A-27B, 28A-28B and 29A-29C, cushion assembly CS may be configured to provide a seat and console section CCM may comprise a frame CF comprising a base CFB with an insert panel CPF for a cup holder arrangement CH and a pad CP with a cover CC; base CFB may comprise an insert frame CFR; cover frame CF may comprise a control operator shown as switch SW and pivot/guide mechanism PGM and console mechanism CSM; cushion assembly may comprise a compartment section CSC and a rim/trim section RM. See also FIGS. 6, 6B-6C, 11A-11B, 12A-12B, 13A-13B, 14A-14B, 15A-15B and 16A-16B. As indicated schematically in FIGS. 4C, 7 and 7A-7H, cushion assembly CS may comprise components of the functional modules for console CL. As indicated schematically in FIGS. 4C, 11A-11B, 12A-12B and 13A-13B, mechanism CSM of console assembly CS may be configured to facilitate movement of cushion assembly CS between the seat position and the console position to provide console section CCM; cushion assembly CS may also comprise a sensor/switch system SW actuated by movement/position. See also FIGS. 14A-14B, 15A-15B and 16A-16B. As indicated schematically in FIGS. 9A-9F, cushion assembly CS may comprise a strap CR to facilitate manual movement to the console position.

As indicated schematically according to an exemplary embodiment shown in FIGS. 3A-3D, 24A-24B, 25A-25B and 30A-30B, back assembly BK of the seat assembly/system may comprise a mechanism/system for seat belt management shown comprising as a seat belt mechanism SBM for guiding movement of a seat belt SB from a seat belt retractor SRC to a seat belt buckle SBB at base BS of the seat assembly; as indicated schematically in FIGS. 24A-25B and 30A-30B, seat belt SB may be guided by a seat belt guide SG and a positioner SBP comprising a conical shape to adjust movement of the seat belt through the back assembly BK.

According to an exemplary embodiment as shown schematically in FIGS. 2A-2B and 3A-3D, a seat assembly/system may provide a seat ST and a console CL for a vehicle interior; seat system/assembly ST may comprise a base BS and a back assembly BK movable between a seat position and a console position to provide a console section BCM and a cushion assembly CS movable between a seat position and a console position to provide a console section CCM. As indicated schematically in FIGS. 4A-4C, 5, 7 and 7A-7H, the seat system/assembly may comprise a control element such as a switch/sensor SW or a mechanism; the seat system/assembly may comprise a control system and/or at least one functional module operable when the console is provided. See also FIGS. 6, 6A-7C, 11A-11B, 12A-12B, 13A-13B, 14A-14B, 15A-15B, 16A-16B, 17A-17B, 18A-18B and 19A-19B. As indicated schematically in FIGS. 3A-3D, 8A-8D, 9A-9F and 10A-10F, the seat may be provided when the back assembly is in the seat position and the cushion assembly is in the seat position; the console may be provided when the back assembly is in the console position and/or the cushion assembly is in the console position. As indicated schematically in FIGS. 2A-2B, 3A-3D, 4A-4C, 7, 7A-7H, 32, 33, 34, 35, 36, 37, 38, 39, 40, 41, 42, 43, 44, 45 and 46A-46B, the seat system/assembly may be provided in a wide variety of arrangements configured to provide a wide variety of components, features, functions, utilities, etc.

Exemplary Embodiments—A

According to an exemplary embodiment as shown schematically in FIGS. 2A-2B and 3A-3D, a seat assembly/system may provide a seat ST and a console CL for a vehicle interior; the seat system/assembly ST may comprise a base BS and a back assembly BK movable between a seat position and a console position to provide a console section BCM and a cushion assembly CS movable between a seat position and a console position to provide a console section CCM. As indicated schematically in FIGS. 4A-4C, 5, 7 and 7A-7H, the seat system/assembly may comprise a control element such as a switch/sensor SW or a mechanism; the seat system/assembly may comprise a control system and/or at least one functional module operable when the console is provided. See also FIGS. 6, 6A-7C, 11A-11B, 12A-12B, 13A-13B, 14A-14B, 15A-15B, 16A-16B, 17A-17B, 18A-18B and 19A-19B. As indicated schematically in FIGS. 3A-3D, 8A-8D, 9A-9F and 10A-10F, the seat may be provided when the back assembly is in the seat position and the cushion assembly is in the seat position; the console may be provided when the back assembly is in the console position and/or the cushion assembly is in the console position.

According to an exemplary embodiment as shown schematically in the FIGURES, a seat assembly configured to provide a seat and a console for an interior of a vehicle may comprise (a) a base; (b) a back assembly movable relative to the base between a seat position and a console position; (c) a cushion assembly movable relative to the base between a seat position and a console position; and (d) a functional module configured to be operable when the console is provided. The seat may be provided when the back assembly is in the seat position and the cushion assembly is in the seat position. The console may be provided when the back assembly is in the console position and/or the cushion assembly is in the console position. The functional module may be configured to provide utilities for the console. The console may be configured to provide at least one storage compartment; the at least one storage compartment may be provided (a) in the base; (b) in the back assembly; or (c) in the cushion assembly. The seat assembly may comprise a control element. The control element may comprise a sensor and/or switch. The switch may comprise a limit switch. The control element may comprise an operator control. The operator control may comprise a switch. The control element may be actuated by movement of the back assembly relative to the base. The control element may comprise a control mechanism for the back assembly. The control element may comprise a control mechanism for the cushion assembly. The control element may comprise a control mechanism comprising a switch. The console may comprise a compartment provided in the base. The console may comprise the functional module. The functional module may comprise at least one functional module. The functional module may comprise at least one functional module connected to a control system. The functional module may comprise at least one functional module for the back assembly. The functional module may comprise at least one functional module for the cushion assembly. The seat position of the back assembly may comprise a generally upright position; the console position of the back assembly may comprise a generally horizontal position. The seat position of the cushion assembly may comprise a generally horizontal position; the console position of the cushion assembly may comprise a generally horizontal position. The console position of the cushion assembly may comprise a generally inverted position relative to the seat position of the cushion assembly. The seat assembly may comprise a control system; the control system may be configured (a) to be operated by a control element; (b) to actuate the functional module; (c) to operate the functional module; (d) to connect to a network and/or to vehicle systems. The seat assembly may comprise a switch mechanism; the switch mechanism may comprise (a) the control element and/or (b) a seat switch. The seat assembly may comprise a cushion assembly mechanism; the cushion assembly mechanism may comprise a control element. The seat assembly may comprise a seat assembly mechanism; the seat assembly mechanism may comprise a recliner mechanism and/or a control element. The seat assembly may comprise a seat assembly mechanism; the seat assembly mechanism may comprise a latch for the seat assembly; the latch may be configured to retain the seat assembly in the seat position. The latch may be configured to retain the seat assembly in the console position. The latch may be configured to secure a bin in the base when the seat assembly is retained in the console position. The latch may be actuated by an operator control. The latch may comprise a mechanical latch and/or an electronic latch. The functional module may comprise illumination for a bin in the base; illumination for the bin in the base (a) may comprise lighting in the bin; (b) may comprise LED lighting; (c) may comprise a lighting module; and/or (d) may be actuated by a control element. The seat assembly in the console position may be configured to provide a compartment; the compartment may comprise a bin and a cover. The cover may comprise at least one of (a) a door; (b) a tambour door; (c) a pivoting door; (d) a display panel. The seat assembly may comprise a display panel. The seat assembly in the console position may be configured to provide the functional module. The functional module may comprise at least one of a head restraint position module; a latch module for a bin providing a compartment in the base; a display system module; a power/charging module; a mobile device connect module; a lighting module for a compartment in the base; a lighting module for a cup holder in the console; a ventilation HVAC module. The cushion assembly in the console position may be configured to provide the functional module; the functional module of the cushion assembly may comprise at least one functional module. The functional module may comprise a power charging module. The functional module may comprise a power station; the power station may be configured for (a) charging a device and/or (b) wireless charging of a device. The functional module may be configured for interconnection of a device. The device may comprise at least one of (a) a mobile device; (b) a smart phone device; (c) a personal device for a vehicle occupant. The functional module may comprise a mobile device connect module. The functional module may comprise at least one of (a) illumination; (b) an illuminated cup holder; (c) an illumination module. The cushion assembly in the console position may be configured to provide a platform. The platform may comprise at least one of (a) the functional module; (b) a tray; (c) a compartment; (d) a cup holder; (e) a cup holder movable to an extended position; (f) a cup holder comprising an illuminated cup holder; (g) a cup holder comprising a power-connected cup holder. The platform may comprise a device compartment and/or a device holder. The platform may comprise a display panel. The functional module may comprise a display module. The display module may comprise at least one of (a) a mini-display; (b) a display panel for the console; (c) a display panel for the back assembly in the console position. The display module may comprise a display panel for the back assembly. The display module may comprise a display panel for the cushion assembly in the console position. The functional module may comprise an operator control module. The operator control module may comprise a control panel; the control panel may be provided (a) on the base; (b) on the console; (c) in a bin; (d) on the seat assembly; or (e) on the cushion assembly. The operator control module may comprise a control panel comprising a control element. The operator control module may comprise a control panel comprising an operator control. The control element may be configured (a) to turn off power to the console and/or (b) to turn on power to the console. The back assembly may comprise a head restraint; the head restraint may be configured for movement from a deployed position to a retracted position. The functional module may be configured to move the head restraint to the retracted position. The head restraint (a) may be configured to be moved by an actuator; (b) may be coupled to the actuator by a cable; and (c) may be operated by movement of the back assembly. The head restraint may comprise a latch mechanism; the latch mechanism may be configured to retain the head restraint in the deployed position; the latch mechanism may be released to allow movement of the head restraint toward the retracted position. The seat assembly may comprise a belt mechanism; the back assembly may comprise the belt mechanism; the belt mechanism may be configured to position a belt for connection through the back assembly to the base; the belt may comprise a seat belt. The belt mechanism may comprise a guide and a positioner to position the belt for passage through the back assembly; the positioner may comprise a wedge and/or a conical shape; the guide may comprise a conical shape. The base may comprise a bin accessible by movement of the back assembly from the console position toward the seat position. The base may comprise (a) a bin accessible at a door in the base; (b) a bin accessible at a door at a front of the base; and/or (c) a bin accessible at a door at a rear of the base. The base may comprise a bin accessible at a sliding door or a hinged door. The base may comprise a bin; the bin may comprise a compartment configured to translate from within the base to outside of the base. The base may comprise a bin comprising a lighting module actuated by a control element. The seat assembly may comprise a seat system; the seat system may comprise at least one of a cushion assembly mechanism and a recliner mechanism for the back assembly. The cushion assembly mechanism may be configured to provide a signal to a control system. The cushion assembly mechanism may be configured to provide a signal to a functional module. The recliner mechanism may comprise an operator control; the operator control may comprise (a) a control element; and/or (b) a latch for the recliner mechanism to prevent movement of the back assembly from the console position toward the seat position. The recliner mechanism may comprise a latch to retain the back assembly in the seat position and to retain the back assembly in the console position; the latch may be operated by a button. The recliner mechanism may comprise a control module; the control module may be configured to provide a signal to a control system; the control module may be configured to provide a signal to a functional module. The seat system may comprise a seat switch mechanism. The seat switch mechanism may comprise a limit switch. The seat switch mechanism may comprise a sensor configured (a) to detect the position of the back assembly relative to the base; (b) to detect the rotation of the back assembly relative to the base. The seat system may comprise the functional module, a control element, and a control system. The seat system may comprise a control system configured to operate the functional module. The functional module may comprise at least one of a head restraint position module; a latch module for a bin providing a compartment in the base; a display system module; a power/charging module; a mobile device connect module; a lighting module for a compartment in the base; a lighting module for a cup holder in the console; a ventilation HVAC module. The power/charging module may be in the cushion assembly. The power/charging module may be in the back assembly. The mobile device connect module may be in the cushion assembly. The mobile device connect module may be in the back assembly. The control element may be configured (a) to shut off power to the functional module when the back assembly is in the seat position; and/or (b) to shut off power to the functional module when the cushion assembly is in the seat position. The control element may be configured (a) to provide power to the functional module when the back assembly is in the seat position; and/or (b) to provide power to the functional module when the cushion assembly is in the seat position. The functional module may be (a) operable when power is provided and (b) inoperable when power is shut off.

According to an exemplary embodiment as shown schematically in the FIGURES, a seat for a vehicle may (a) a base; (b) a back assembly coupled to the base; and (c) a cushion assembly coupled to the base. The back assembly may be configured to move between a back position and a dumped position. The cushion assembly may be configured to move between a cushion position and an inverted position. The cushion assembly may be configured to be cantilevered from the base when in the inverted position. When in the dumped position, the back assembly may be configured to block movement of the cushion assembly from the inverted position to the cushion position. The cushion assembly may be configured to support the back assembly when the cushion assembly is in the inverted position and the back assembly is in the dumped position. The cushion assembly may comprise a depression; the back assembly may be configured to nest in the depression when the cushion assembly is in the inverted position and the back assembly is in the dumped position. The cushion assembly may be configured to provide a stop for the back assembly. The base may comprise a sidewall; the sidewall may comprise at least one of (a) a support for the cushion assembly in the cushion position; (b) a stop of movement for the cushion assembly in the inverted position. The back assembly may be configured to move from the back position to the dumped position when the cushion assembly is in (a) the cushion position and (b) the inverted position. The back assembly may comprise a head restraint; the head restraint may be configured to move between a raised position and a lowered position; the back assembly may comprise a latch mechanism configured to move the head restraint from the raised position to the lowered position as the back assembly moves from the back position to the dumped position; the latch mechanism may comprise a drum, a cable and a latch; the drum may be configured to pull on the cable to release the latch. The back assembly may comprise a head restraint; the cushion assembly may comprise a depression; the head restraint may be configured to nest in the depression when the cushion assembly is in the inverted position and the back assembly is in the dumped position. The back assembly may be configured to move between the back position and a reclined position; the cushion assembly may be configured to rotate away from the back assembly when the back assembly is in the back position and the reclined position; the back assembly may comprise a recliner mechanism configured to secure the back assembly in the back position and the reclined position; the recliner mechanism may be configured to move the back assembly (a) between the back position and the reclined position and (b) between the back position and the dumped position. The back assembly may comprise a console module; when the back assembly is in the dumped position, the console module may be configured to provide at least one of (a) a cup holder; (b) an armrest; (c) a storage compartment; (d) a work surface. The back assembly may comprise a console module; the console module may comprise a storage compartment; the console module may comprise a cover for the storage compartment; the cover may comprise at least one of (a) a door; (b) a tambour door; (c) a set of doors. The back assembly may comprise an item holder configured to face a floor of the vehicle when the back assembly is in the back position; the item holder may be configured to provide access for stowage and access of an item when the back assembly is in the dumped position. When in the inverted position, the cushion assembly may be configured to provide at least one of (a) a cup holder and/or (b) a device holder and/or (c) a compartment and/or (d) a work surface. The cushion assembly may comprise (a) a cupholder configured to move between a stowed position and a use position when the cushion assembly is in the inverted position and/or (b) a display configured to move between a hidden position and an exposed position when the cushion assembly is in the inverted position. The cushion assembly may comprise a storage compartment accessible when the cushion assembly is in the inverted position; the cushion assembly may comprise a cover for the storage compartment; the cover may comprise at least one of (a) a door; (b) a tambour door; (c) a set of doors. The base may comprise a bin; when in the cushion position, the cushion assembly may be configured to cover the bin; when in the inverted position, the cushion assembly may be configured to provide access to the bin. The base may comprise a cover for the bin; the cover may comprise at least one of (a) a door; (b) a tambour door; (c) a lid. The seat may comprise a light source configured to illuminate the bin; the light source may be configured to illuminate the bin in response to movement of the cover from a closed position to an open position. The base may comprise a tray configured to slide between a stowed position and a use position. The base may comprise a drawer configured to move between a stowed position and a use position; the drawer may be configured to slide or rotate between the stowed position and the use position. The base may comprise (a) a storage compartment accessible from a rear side of the base; and/or (b) an air vent configured to direct airflow away from a rear side of the base. The seat may comprise a belt buckle; the back assembly may comprise a belt retractor.

According to an exemplary embodiment as shown schematically in the FIGURES, a seat system configured to provide a seat and a console for an interior of a vehicle may comprise (a) a base; (b) a back assembly movable relative to the base between a seat position and a console position; (c) a cushion assembly movable relative to the base between a seat position and a console position; (d) a control element configured for the back assembly and/or the cushion assembly; and (e) a functional module configured to be operable when the console is provided. The seat may be provided when the back assembly is in the seat position and the cushion assembly is in the seat position. The console may be provided when the back assembly is in the console position and/or the cushion assembly is in the console position. The control element may comprise at least one of a switch; a limit switch; a sensor; a position sensor; a rotation sensor; a proximity detector. The control element may be configured to be actuated by movement of the back assembly and/or the cushion assembly.

Exemplary Embodiments—B

According to an exemplary embodiment as shown schematically in FIGS. 2A-2B and 3A-3D, a seat assembly/system may provide a seat ST and a console CL for a vehicle interior; the seat system/assembly ST may comprise a base BS and a back assembly BK movable between a seat position and a console position to provide a console section BCM and a cushion assembly CS movable between a seat position and a console position to provide a console section CCM. As indicated schematically in FIGS. 4A-4C, 5, 7 and 7A-7H, the seat system/assembly may comprise a control element such as a switch/sensor SW or a mechanism; the seat system/assembly may comprise a control system and/or at least one functional module operable when the console is provided. See also FIGS. 6, 6A-7C, 11A-11B, 12A-12B, 13A-13B, 14A-14B, 15A-15B, 16A-16B, 17A-17B, 18A-18B and 19A-19B. As indicated schematically in FIGS. 3A-3D, 8A-8D, 9A-9F and 10A-10F, the seat may be provided when the back assembly is in the seat position and the cushion assembly is in the seat position; the console may be provided when the back assembly is in the console position and/or the cushion assembly is in the console position. As indicated schematically in FIGS. 2A-2B, 3A-3D, 4A-4C, 7, 7A-7H, 32, 33, 34, 35, 36, 37, 38, 39, 40, 41, 42, 43, 44, 45 and 46A-46B, the seat system/assembly may be provided in a wide variety of arrangements configured to provide a wide variety of components, features, functions, utilities, etc.

According to an exemplary embodiment as shown schematically in the FIGURES, a seat assembly configured to provide a seat and a console for an interior of a vehicle may comprise (a) a base; (b) a back assembly movable relative to the base between a seat position and a console position; (c) a cushion assembly movable relative to the base between a seat position and a console position; (d) a control element configured to be actuated by movement of the back assembly; and (e) a functional module configured to be operable when the console is provided. The seat may be provided when the back assembly is in the seat position and the cushion assembly is in the seat position. The console may be provided when the back assembly is in the console position and/or the cushion assembly is in the console position. The back assembly may comprise a seat back assembly; the seat back assembly may comprise a pad. The cushion assembly may comprise a seat cushion assembly; the seat cushion assembly may comprise a pad. The functional module may be configured to provide utilities for the console. The console may be configured to provide at least one storage compartment. The at least one storage compartment may be provided in the base. The at least one storage compartment may be provided in the back assembly. The at least one storage compartment may be provided in the cushion assembly. The control element may comprise a sensor. The sensor may comprise a switch. The control element may comprise an operator control. The operator control may comprise a switch. The switch may comprise a limit switch. The control element may be actuated by movement of the back assembly from the seat position to the console position. The control element may be actuated by movement of the back assembly relative to the base. The control element may comprise a control mechanism for the back assembly. The control element may comprise a control mechanism for the cushion assembly. The control element may comprise a control mechanism comprising a switch. The console may comprise a compartment provided in the base. The console may comprise the functional module. The functional module may comprise at least one functional module. The functional module may comprise at least one functional module connected to a control system. The functional module may comprise at least one functional module connected to a control system and operated by the control element. The functional module may comprise at least one functional module for the back assembly. The functional module may comprise at least one functional module for the cushion assembly. The seat position of the back assembly may comprise a generally upright position. The console position of the back assembly may comprise a generally horizontal position. The seat position of the cushion assembly may comprise a generally horizontal position. The console position of the cushion assembly may comprise a generally horizontal position. The console position of the cushion assembly may comprise a generally inverted position relative to the seat position of the cushion assembly. The seat assembly may comprise a control system. The control system may be configured to be operated by the control element. The control system may be configured to actuate the functional module. The control system may be configured to operate the functional module. The control system may be configured to connect to a network and/or to vehicle systems. The seat assembly may comprise a switch mechanism. The switch mechanism may comprise the control element. The switch mechanism may comprise a seat switch. The seat assembly may comprise a cushion assembly mechanism. The cushion assembly mechanism may comprise the control element. The cushion assembly mechanism may be configured to provide the console position of the cushion assembly. The seat assembly may comprise a seat assembly mechanism. The seat assembly mechanism may comprise a recliner mechanism. The seat assembly mechanism may comprise the control element. The seat assembly mechanism may comprise a latch for the seat assembly. The latch may be configured to retain the seat assembly in the seat position. The latch may be configured to retain the seat assembly in the console position. The latch may be configured to secure a bin in the base when the seat assembly is retained in the console position. The latch may be configured to allow access to the bin in the base when the seat assembly is moved toward the seat position. The latch may be actuated by a control system. The latch may be actuated by an operator control. The latch may be actuated by an operator input. The latch may comprise a mechanical latch. The latch may comprise an electronic latch. The functional module may comprise illumination for a bin in the base. Illumination for the bin in the base may comprise lighting in the bin. Illumination for the bin in the base may comprise LED lighting. Illumination for the bin in the base may be actuated by the control element. Illumination for the bin in the base may comprise a lighting module. The seat assembly in the console position may be configured to provide a compartment. The compartment may comprise a bin and a cover. The cover may comprise a door. The cover may comprise a tambour door. The cover may comprise a pivoting door. The cover may comprise a display panel. The seat assembly may comprise a display panel. The seat assembly may comprise a display panel for the console position. The seat assembly in the console position may be configured to provide the functional module. The functional module of the seat assembly may comprise at least one of a head restraint position module; a latch module for a bin providing a compartment in the base; a display system module; a power/charging module; a mobile device connect module; a lighting module for a compartment in the base; a lighting module for a cup holder in the console; a ventilation HVAC module. The cushion assembly in the console position may be configured to provide the functional module. The functional module of the cushion assembly may comprise at least one functional module. The functional module may comprise a power charging module. The functional module may comprise a power station. The power station may be configured for charging a device. The power station may be configured for wireless charging of a device. The functional module may be configured for interconnection of a device. The device may comprise a mobile device. The device may comprise a smart phone device. The device may comprise a personal device for a vehicle occupant. The functional module may comprise a mobile device connect module. The functional module may comprise illumination. The functional module may comprise an illuminated cup holder. The functional module may comprise an illumination module. The cushion assembly in the console position may be configured to provide a platform. The platform may comprise the functional module. The platform may comprise a tray. The platform may comprise a compartment. The platform may comprise a cup holder. The cup holder may comprise a movable cup holder. The cup holder may comprise a cup holder movable to an extended position. The cup holder may comprise an illuminated cup holder. The cup holder may comprise a power-connected cup holder. The platform may comprise a device compartment. The platform may comprise a device holder. The platform may comprise a display panel. The functional module may comprise a display module. The display module may comprise a mini-display. The display module may comprise a display panel for the console. The display module may comprise a display panel for the back assembly in the console position. The display module may comprise a display panel for the back assembly. The display module may comprise a display panel for the cushion assembly in the console position. The functional module may comprise an operator control module. The operator control module may comprise a control panel. The control panel may be provided on the base. The control panel may be provided on the console. The control panel may be provided in a bin. The control panel may be provided on the seat assembly. The control panel may be provided on the cushion assembly. The control panel may comprise the control element. The control element may comprise an operator control. The functional module may comprise a ventilation module. The functional module may comprise a ventilation/HVAC module. The functional module may comprise a ventilation/HVAC module in the base. The functional module may comprise a ventilation/HVAC module in the base coupled to a vehicle system. The vehicle system may comprise a ventilation/HVAC system for the vehicle. The ventilation/HVAC system may comprise a climate control system. The control element may be configured to actuate power to the console. The control element may be configured to turn off power to the console. The control element may be configured to turn off power to the console. The back assembly may comprise a head restraint. The head restraint may be configured for movement from a deployed position. The deployed position may comprise a generally extended position. The head restraint may be configured for movement to a retracted position. The head restraint may be configured for movement from a deployed position to a retracted position. The functional module may be configured to move the head restraint to a retracted position. The functional module may be configured to move the head restraint from a deployed position to a retracted position. The head restraint may be configured to be moved by an actuator. The head restraint may be coupled to the actuator by a cable. The actuator may be operated by movement of the back assembly. The head restraint may comprise a latch mechanism. The latch mechanism may be configured to retain the head restraint in a deployed position. The latch mechanism may be released to allow movement of the head restraint toward a retracted position. The latch mechanism may be released to allow movement of the head restraint toward the retracted position when the back assembly is moved toward the console position. The head restraint may be configured to be manually moved from the retracted position to the deployed position. The seat assembly may comprise a belt mechanism. The back assembly may comprise the belt mechanism. The belt mechanism may be configured to position a belt for connection through the back assembly to the base. The belt mechanism may comprise a guide to position the belt for passage through the back assembly. The belt mechanism may comprise a guide and a positioner to position the belt for passage through the back assembly. The positioner may comprise a wedge. The positioner may comprise a conical shape. The guide may comprise a conical shape. The belt mechanism may comprise a guide to position the belt for passage from a retractor within the back assembly to an outlet in the back assembly. The belt mechanism may comprise a guide to position the belt for passage from a retractor within the back assembly to an outlet in the back assembly when the back assembly is moved to the console position. The belt mechanism may comprise a guide to position the belt for passage from a retractor within the back assembly to an outlet in the back assembly when the back assembly is moved between the seat position and the console position. The belt may comprise a seat belt. The belt mechanism may comprise a seat belt mechanism. The base may comprise a bin accessible by movement of the back assembly from the console position toward the seat position. The base may comprise a bin. The base may comprise a bin accessible at a door in the base. The base may comprise a bin accessible at a door at a front of the base. The base may comprise a bin accessible at a door at a rear of the base. The door may comprise a sliding door. The door may comprise a hinged door. The bin may comprise a compartment configured to translate from within the base to outside of the base. The bin may comprise a tray configured to translate from within the base to outside of the base to facilitate access to the bin. The door may comprise a door flap. The bin may comprise a lighting module. The bin may comprise a lighting module actuated by the control element. The seat assembly may comprise a seat system; the seat system may comprise at least one of a cushion assembly mechanism and a recliner mechanism for the back assembly. The cushion assembly mechanism may be configured to provide a signal to a control system. The cushion assembly mechanism may be configured to provide a signal to a functional module. The recliner mechanism may comprise an operator control. The operator control may comprise the control element. The operator control may comprise a button. The operator control may comprise a release for the recliner mechanism. The operator control may comprise a release for the recliner mechanism to allow movement of the back assembly from the seat position. The operator control may comprise a release for the recliner mechanism to allow movement of the back assembly from the console position. The operator control may comprise a release for the recliner mechanism to allow movement of the back assembly from the seat position toward the console position. The operator control may comprise a release for the recliner mechanism to allow movement of the back assembly from the console position toward the seat position. The operator control may comprise a latch for the recliner mechanism to prevent movement of the back assembly from the seat position toward the console position. The operator control may comprise a latch for the recliner mechanism to prevent movement of the back assembly from the console position toward the seat position. The recliner mechanism may comprise a latch to retain the back assembly in the seat position. The recliner mechanism may comprise a latch to retain the back assembly in the console position. The latch may be operated by a button. The recliner mechanism may comprise a control module. The control module may be configured to provide a signal to a control system. The control module may be configured to provide a signal to a functional module. The seat system may comprise a seat switch mechanism. The seat switch mechanism may comprise a limit switch. The seat switch mechanism may comprise a sensor configured to detect the position of the back assembly relative to the base. The seat switch mechanism may comprise a sensor configured to detect the rotation of the back assembly relative to the base. The seat switch mechanism may comprise a guide for movement of the back assembly relative to the base. The seat switch mechanism may be configured to provide a signal to a control system. The seat switch mechanism may be configured to provide a signal to a functional module. The seat system may comprise the functional module. The seat system may comprise the control element. The control element may comprise a switch. The control element may comprise a switch actuated by movement of the back assembly. The seat system may comprise a control system. The seat system may comprise a control system actuated by the control element. The seat system may comprise a control system configured to operate the functional module. The functional module may comprise at least one of a head restraint position module; a latch module for a bin providing a compartment in the base; a display system module; a power/charging module; a mobile device connect module; a lighting module for a compartment in the base; a lighting module for a cup holder in the console; a ventilation HVAC module. The power/charging module may be in the cushion assembly. The power/charging module may be in the back assembly. The mobile device connect module may be in the cushion assembly. The mobile device connect module may be in the back assembly. The control element may be configured to shut off power to the functional module. The control element may be configured to shut off power to the functional module when the back assembly is in the seat position. The control element may be configured to shut off power to the functional module when the cushion assembly is in the seat position. The control element may be configured to provide power to the functional module when the back assembly is in the seat position. The control element may be configured to provide power to the functional module when the cushion assembly is in the seat position. The functional module may be operable when power is provided. The functional module may be inoperable when power is shut off. The seat may be configured to fit in a row of seats. The seat may be configured to fit within a row of seats.

According to an exemplary embodiment as shown schematically in the FIGURES, a seat for a vehicle may comprise (a) a base; (b) a back assembly coupled to the base; and (c) a cushion assembly coupled to the base. The back assembly may be configured to move between a back position and a dumped position. The cushion assembly may be configured to move between a cushion position and an inverted position. The cushion assembly may be configured to be cantilevered from the base when in the inverted position. When in the dumped position, the back assembly may be configured to block movement of the cushion assembly from the inverted position to the cushion position. The cushion assembly may be configured to support the back assembly when the cushion assembly is in the inverted position and the back assembly is in the dumped position. The cushion assembly may comprise a depression; the back assembly may be configured to nest in the depression when the cushion assembly is in the inverted position and the back assembly is in the dumped position. The cushion assembly may be configured to provide a stop for the back assembly. The base may comprise a sidewall; the sidewall may comprise at least one of (a) a support for the cushion assembly in the cushion position; (b) a stop of movement for the cushion assembly in the inverted position. The back assembly may be configured to move from the back position to the dumped position when the cushion assembly is in (a) the cushion position and (b) the inverted position. The back assembly may comprise a head restraint; the head restraint may be configured to move between a raised position and a lowered position; the back assembly may comprise a latch mechanism configured to move the head restraint from the raised position to the lowered position as the back assembly moves from the back position to the dumped position; the latch mechanism may comprise a drum, a cable and a latch; the drum may be configured to pull on the cable to release the latch. The back assembly may comprise a head restraint; the cushion assembly may comprise a depression; the head restraint may be configured to nest in the depression when the cushion assembly is in the inverted position and the back assembly is in the dumped position. The back assembly may be configured to move between the back position and a reclined position; the cushion assembly may be configured to rotate away from the back assembly when the back assembly is in the back position and the reclined position; the back assembly may comprise a recliner mechanism configured to secure the back assembly in the back position and the reclined position; the recliner mechanism may be configured to move the back assembly (a) between the back position and the reclined position and (b) between the back position and the dumped position. The back assembly may comprise a console module; when the back assembly is in the dumped position, the console module may be configured to provide at least one of (a) a cup holder; (b) an armrest; (c) a storage compartment; (d) a work surface. The back assembly may comprise a console module; the console module may comprise a storage compartment; the console module may comprise a cover for the storage compartment; the cover may comprise at least one of (a) a door; (b) a tambour door; (c) a set of doors. The back assembly may comprise an item holder configured to face a floor of the vehicle when the back assembly is in the back position; the item holder may be configured to provide access for stowage and access of an item when the back assembly is in the dumped position. When in the inverted position, the cushion assembly may be configured to provide at least one of (a) a cup holder and/or (b) a device holder and/or (c) a compartment and/or (d) a work surface. The cushion assembly may comprise (a) a cupholder configured to move between a stowed position and a use position when the cushion assembly is in the inverted position and/or (b) a display configured to move between a hidden position and an exposed position when the cushion assembly is in the inverted position. The cushion assembly may comprise a storage compartment accessible when the cushion assembly is in the inverted position; the cushion assembly may comprise a cover for the storage compartment; the cover may comprise at least one of (a) a door; (b) a tambour door; (c) a set of doors. The base may comprise a bin; when in the cushion position, the cushion assembly may be configured to cover the bin; when in the inverted position, the cushion assembly may be configured to provide access to the bin. The base may comprise a cover for the bin; the cover may comprise at least one of (a) a door; (b) a tambour door; (c) a lid. The seat may comprise a light source configured to illuminate the bin; the light source may be configured to illuminate the bin in response to movement of the cover from a closed position to an open position. The base may comprise a tray configured to slide between a stowed position and a use position. The base may comprise a drawer configured to move between a stowed position and a use position; the drawer may be configured to slide or rotate between the stowed position and the use position. The base may comprise (a) a storage compartment accessible from a rear side of the base; and/or (b) an air vent configured to direct airflow away from a rear side of the base. The seat assembly may comprise a belt buckle; the back assembly may comprise a belt retractor.

Exemplary Embodiments—C

According to an exemplary embodiment as shown schematically in FIGS. 2A-2B and 3A-3D, a seat assembly/system may provide a seat and a console for a vehicle interior; the seat system/assembly ST may comprise a base BS and a back assembly BK movable between a seat position and a console position to provide a console section BCM and a cushion assembly CS movable between a seat position and a console position to provide a console section CCM. As indicated schematically in FIGS. 4A-4C, 5, 7 and 7A-7H, the seat system/assembly may comprise a control element such as a switch/sensor SW or a mechanism; the seat system/assembly may comprise a control system and/or at least one functional module operable when the console is provided. See also FIGS. 6, 6A-7C, 11A-11B, 12A-12B, 13A-13B, 14A-14B, 15A-15B, 16A-16B, 17A-17B, 18A-18B and 19A-19B. As indicated schematically in FIGS. 3A-3D, 8A-8D, 9A-9F and 10A-10F, the seat may be provided when the back assembly is in the seat position and the cushion assembly is in the seat position; the console may be provided when the back assembly is in the console position and/or the cushion assembly is in the console position. As indicated schematically in FIGS. 2A-2B, 3A-3D, 4A-4C, 7, 7A-7H, 32, 33, 34, 35, 36, 37, 38, 39, 40, 41, 42, 43, 44, 45 and 46A-46B, the seat system/assembly may be provided in a wide variety of arrangements configured to provide a wide variety of components, features, functions, utilities, etc.

According to an exemplary embodiment as shown schematically in the FIGURES and TABLES A through G, a seat for a vehicle may comprise a base, a back assembly coupled to the base, and a cushion assembly coupled to the base. The back assembly may be configured to move between a back position as shown schematically in FIG. 3A and a dumped position as shown schematically in FIG. 3C. The cushion assembly may be configured to move between a cushion position as shown schematically in FIG. 3A and an inverted position as shown schematically in FIG. 3B. The cushion assembly may be configured to support the back assembly when the cushion assembly is in the inverted position and the back assembly is in the dumped position as shown schematically in FIG. 3C. The cushion assembly may comprise a depression; the back assembly may be configured to nest in the depression when the cushion assembly is in the inverted position and the back assembly is in the dumped position. The cushion assembly may be configured to provide a stop for the back assembly. The base may comprise a sidewall; the sidewall may comprise at least one of (a) a support for the cushion assembly in the cushion position; (b) a stop of movement for the cushion assembly in the inverted position. The cushion assembly may be configured to be cantilevered from the base when in the inverted position. When in the dumped position, the back assembly may be configured to block movement of the cushion assembly from the inverted position to the cushion position. The back assembly may be configured to move from the back position to the dumped position when the cushion assembly is in (a) the cushion position and (b) the inverted position. The back assembly may comprise a head restraint. The head restraint may be configured to move between a raised position and a lowered position. The back assembly may comprise a latch mechanism configured to move the head restraint from the raised position to the lowered position as the back assembly moves from the back position to the dumped position. The latch mechanism may comprise a drum, a cable and a latch. The drum may be configured to pull on the cable to release the latch. The cushion assembly may comprise a depression; the head restraint may be configured to nest in the depression when the cushion assembly is in the inverted position and the back assembly is in the dumped position. The back assembly may be configured to move between the back position and a reclined position. The cushion assembly may be configured to rotate away from the back assembly when the back assembly is in the back position and the reclined position. The back assembly may comprise a recliner mechanism configured to secure the back assembly in the back position and the reclined position. The recliner mechanism may be configured to move the back assembly (a) between the back position and the reclined position and (b) between the back position and the dumped position. The back assembly may comprise a console module. When the back assembly is in the dumped position, the console module may be configured to provide at least one of (a) a cup holder; (b) an armrest; (c) a storage compartment; (d) a work surface. The console module may comprise a storage compartment. The console module may comprise a cover for the storage compartment. The cover may comprise at least one of (a) a door; (b) a tambour door; (c) a set of doors. The back assembly may comprise an item holder configured to face a floor of the vehicle when the back assembly is in the back position; the item holder may be configured to provide access for stowage and access of an item when the back assembly is in the dumped position. When in the inverted position, the cushion assembly may be configured to provide at least one of (a) a cup holder and/or (b) a device holder and/or (c) a compartment and/or (d) a work surface. The cushion assembly may comprise a cupholder configured to move between a stowed position and a use position when the cushion assembly is in the inverted position. The cushion assembly may comprise a display configured to move between a hidden position and an exposed position when the cushion assembly is in the inverted position. The cushion assembly may comprise a storage compartment accessible when the cushion assembly is in the inverted position. The cushion assembly may comprise a cover for the storage compartment. The cover may comprise at least one of (a) a door; (b) a tambour door; (c) a set of doors. The base may comprise a bin. When in the cushion position, the cushion assembly may be configured to cover the bin. When in the inverted position, the cushion assembly may be configured to provide access to the bin. The base may comprise a cover for the bin. The cover may comprise at least one of (a) a door; (b) a tambour door; (c) a lid. The seat may comprise a light source configured to illuminate the bin. The light source may be configured to illuminate the bin in response to movement of the cover from a closed position to an open position. The base may comprise a tray configured to slide between a stowed position and a use position. The base may comprise a drawer configured to move between a stowed position and a use position. The drawer may be configured to slide between the stowed position and the use position. The drawer may be configured to rotate between the stowed position and the use position. The base may comprise a storage compartment accessible from a rear side of the base. The base may comprise an air vent configured to direct airflow away from a rear side of the base. The seat may comprise a belt buckle; the back assembly may comprise a belt retractor.

Operation of Seat System

TABLE A

States of Component

| Back | Head Restraint | Cushion | Bin | Bin Light |
|---|---|---|---|---|
| Reclined Position | Raised or Lowered Position | Cushion Position | Covered by Cushion | Off |
| Reclined Position | Raised or Lowered Position | Inverted Position | Uncovered | On |
| Back Position | Raised or Lowered Position | Cushion Position | Covered by Cushion | Off |
| Back Position | Raised or Lowered Position | Inverted Position | Uncovered | On |
| Dumped Position | Lowered Position | Inverted | Covered by Back | On |

TABLE B

Process to Dump Back with Head Restraint in Lowered Position

|  | Back | Head Restraint | Actuator | Recliner |
|---|---|---|---|---|
| At Rest | Back Position or Reclined Position | Lowered Position |  | Locked |
| External Force Pushes Button | Back Position or Reclined Position | Lowered Position | Unlocks Recliner | Unlocked |
| External Force Pushes Back | Rotates toward Dumped Position | Lowered Position |  | Unlocked |
| At Rest | Dumped Position | Lowered Position |  | Locked |

TABLE C

Process to Dump Back with Head Restraint in Raised Position

|  | Back | Cable | Head Restraint | Actuator | Recliner |
|---|---|---|---|---|---|
| At Rest | Back Position or Reclined Position |  | Raised Position |  | Locked |
| External Force Pushes Button | Back Position or Reclined Position |  | Raised Position | Unlocks Recliner | Unlocked |
| External Force Pushes Back | Rotates toward Dumped Position | Unlocks Head Restraint | Moves toward Lowered Position |  | Unlocked |
| At Rest | Dumped Position |  | Lowered Position |  | Locked |

TABLE D

Process to Raise Back from Dumped Position

|  | Back | Head Restraint | Actuator | Recliner |
|---|---|---|---|---|
| At Rest | Dumped Position | Lowered Position |  | Locked |
| External Force Pushes Button | Dumped Position | Lowered Position | Unlocks Recliner | Unlocked |
| External Force Raised Back | Rotates toward Back Position | Lowered Position |  | Unlocked |
| At Rest | Back Position | Lowered Position |  | Locked |

TABLE E

Process to Raise and Lower Head Restraint

|  | Head Restraint | Mechanism | Latch | Spring |
|---|---|---|---|---|
| At Rest | Lowered Position | Detented | Extended | Biasing Latch |
| External force | Lowered Position |  | Retracted | Compressed |
| At Rest Cable Pulled | Raised Position | Latched Raised | Released Retracted | Biasing Latch Compressed |
|  | Lowered Position | Detented | Extended | Biasing Latch |

TABLE F

Process to Invert Cushion

|  | Cushion | Detent Mechanism | Switch | Bin Light |
|---|---|---|---|---|
| At Rest | Cushion Position | Disengaged | Open | Off |
| External force on cushion | Rotating toward Inverted Position | Dampens movement of cushion | Open | Off |
| At Rest | Inverted Position | Engaged | Closed | On |

TABLE G

Process to Rotate Cushion to Cushion Position

|  | Cushion | Detent Mechanism | Switch | Bin Light |
|---|---|---|---|---|
| At Rest | Inverted Position | Engaged | Closed | On |
| External force on cushion | Rotating toward Cushion Position | Assists in movement of cushion | Open | Off |
| At Rest | Cushion Position | Disengaged | Open | Off |

TABLE H

REFERENCE SYMBOL LIST

| ELEMENT, PART OR COMPONENT | REFERENCE SYMBOL |
|---|---|
| vehicle | V |
| interior | I |
| seat | ST |
| console | CL |
| base | BS |
| Back/back assembly | BK |
| Cushion/cushion assembly | CS |
| Console assembly/system section (cushion assembly) | CCM |
| Console assembly/system section (back assembly) | BCM |
| Head restraint/assembly | HR |
| Bin/compartment | BN |
| Switch/sensor | SW |
| Cushion control/mechanism | CSM |
| Recliner control/mechanism | RCM |
| Button/operator control (recliner control) | RCB/BT |
| Pivot/guide mechanism | PGM |
| Head restraint mechanism | HRM |
| Head restraint cable | HRC |
| Head restraint latch | HRL |
| Actuator | AT |
| Base frame | BF/BSF |
| Back frame | BKF |
| Back frame/cover section | BKR |
| Back cover | BKC |
| Cushion strap | CR |
| Cushion assembly frame | CF |
| Cushion pad | CP |
| Cushion cover | CC |
| Cushion base | CB |
| Cushion frame/base | CFB |
| Cushion insert/frame | CLF |
| Cushion compartment/section | CSC |
| Compartment frame | CPF |
| Cushion pivot mechanism | CPM |
| Cup holder | CH |
| Cup holder section/base | CHB |
| Cup holder insert (power/illumination module) | CHN |
| Charger/charger module/mat | CHG |
| Power charger element | PCG |
| Wireless charger element | WCG |
| Power/charger connector | PCN |
| Trim section | RM |
| Light module | LM |
| Mobile device (phone, smart phone, tablet, etc.) | MD |

TABLE H-continued

REFERENCE SYMBOL LIST

| ELEMENT, PART OR COMPONENT | REFERENCE SYMBOL |
|---|---|
| Mobile device connect module | MDM |
| Control panel/operator control set | CP |
| Display panel | DP |
| Cover | CV |
| Door/tambour door | TD |
| HVAC/ventilation system | HVAC |
| Door/panel/cover | DR |
| Sliding door/tray/drawer | SDR |
| Seat belt | SB |
| Seat belt mechanism | SBM |
| Seat belt retractor mechanism | SRC |
| Seat belt guide | SG |
| Seat belt positioner (wedge/conical form) | SBP |
| Seat belt buckle | SBB |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A seat assembly configured to provide a seat and a console for an interior of a vehicle comprising:
    (a) a base;
    (b) a back assembly movable relative to the base between a seat position and a console position;
    (c) a cushion assembly movable relative to the base between a seat position and a console position;
    (d) a functional module configured to be operable when the console is provided;
    wherein the seat is provided when the back assembly is in the seat position and the cushion assembly is in the seat position;
    wherein the console is provided when the back assembly is in the console position and/or the cushion assembly is in the console position;
    wherein the back assembly comprises a head restraint comprising a latch mechanism;
    wherein the head restraint is configured for movement from a deployed position to a retracted position;
    wherein the latch mechanism is configured to retain the head restraint in the deployed position;
    wherein the latch mechanism is released to allow movement of the head restraint toward the retracted position;
    wherein the latch mechanism is configured to be actuated by movement of the back assembly to facilitate movement of the head restraint to the retracted position;
    wherein the head restraint (a) is configured to be moved by an actuator; (b) is coupled to the actuator by a cable; and (c) is configured to be operated by movement of the back assembly.

2. The seat assembly of claim 1 wherein the functional module comprises a head position restraint module.

3. The seat assembly of claim 1 further comprising a cushion assembly mechanism.

4. The seat assembly of claim 3 wherein the cushion assembly mechanism is configured to provide the console position of the cushion assembly.

5. The seat assembly of claim 1 wherein the cushion assembly comprises a switch system actuated by position.

6. The seat assembly of claim 1 wherein the functional module comprises a lighting module.

7. The seat assembly of claim 1 wherein the cushion assembly is configured to move between a cushion position and an inverted position; wherein the cushion assembly is configured to be cantilevered from the base when in the inverted position.

8. The seat assembly of claim 1 wherein the latch mechanism is operated by a button.

9. The seat assembly of claim 1 wherein the recliner mechanism comprises an operator control; wherein the operator control comprises (a) a control element; and/or (b) a latch for a recliner mechanism to prevent movement of the back assembly from the console position toward the seat position.

10. The seat assembly of claim 9 wherein the recliner mechanism comprises the control module; wherein the control module is configured to provide a signal to a control system; wherein the control module is configured to provide a signal to a functional module.

11. The seat assembly of claim 1 wherein the seat comprises a seat switch mechanism and/or a limit switch.

12. The seat assembly of claim 1 wherein the functional module comprises a lighting module for a compartment in the base; wherein the lighting module is configured to provide light into the compartment.

13. The seat assembly of claim 1 wherein the functional module comprises a set of functional modules comprising at least one of (a) a head restraint position module; (b) a compartment lighting module; (c) a compartment latch module; (d) a console cup holder lighting module; (e) a display system module; (f) a mobile device connect module; (g) an HVAC system module; (h) a power module comprising a power station configured for charging a device; (i) an operator control; (j) a control panel.

14. The seat assembly of claim 1 further comprising a belt mechanism comprising a guide and a positioner.

15. The seat assembly of claim 1 wherein the belt mechanism is configured to position the belt for connection through the back assembly to the base.

16. The seat assembly of claim 1 wherein the guide is configured to position the belt for passage from a retractor within the back assembly to an outlet in the back assembly.

17. A seat assembly configured to provide a seat and a console for an interior of a vehicle comprising:
(a) a base;
(b) a back assembly movable relative to the base between a seat position and a console position;
(c) a cushion assembly movable relative to the base between a seat position and a console position;
(d) a functional module configured to be operable when the console is provided;
wherein the seat is provided when the back assembly is in the seat position and the cushion assembly is in the seat position;
wherein the console is provided when the back assembly is in the console position and/or the cushion assembly is in the console position;
wherein the back assembly comprises a head restraint comprising a latch mechanism;
wherein the head restraint is configured for movement from a deployed position to a retracted position;
wherein the latch mechanism is configured to retain the head restraint in the deployed position;
wherein the latch mechanism is released to allow movement of the head restraint toward the retracted position;
wherein the latch mechanism is configured to be actuated by movement of the back assembly to facilitate movement of the head restraint to the retracted position;
wherein the seat comprises a seat switch mechanism;
wherein the seat switch mechanism comprises a sensor configured (a) to detect the position of the back assembly relative to the base; (b) to detect the rotation of the back assembly relative to the base.

18. A seat assembly configured to provide a seat and a console for an interior of a vehicle comprising:
(a) a base;
(b) a back assembly movable relative to the base between a seat position and a console position;
(c) a cushion assembly movable relative to the base between a seat position and a console position;
(d) a functional module configured to be operable when the console is provided;
(e) a control element configured (a) to shut off power to the functional module when the back assembly is in the seat position; and/or (b) to shut off power to the functional module when the cushion assembly is in the seat position;
wherein the seat is provided when the back assembly is in the seat position and the cushion assembly is in the seat position;
wherein the console is provided when the back assembly is in the console position and/or the cushion assembly is in the console position;
wherein the back assembly comprises a head restraint comprising a latch mechanism;
wherein the head restraint is configured for movement from a deployed position to a retracted position;
wherein the latch mechanism is configured to retain the head restraint in the deployed position;
wherein the latch mechanism is released to allow movement of the head restraint toward the retracted position;
wherein the latch mechanism is configured to be actuated by movement of the back assembly to facilitate movement of the head restraint to the retracted position.

19. A seat assembly configured to provide a seat and a console for an interior of a vehicle comprising:
(a) a base;
(b) a back assembly movable relative to the base between a seat position and a console position;
(c) a cushion assembly movable relative to the base between a seat position and a console position;
(d) a functional module configured to be operable when the console is provided;
(e) a seat switch mechanism;
wherein the seat switch mechanism comprises a sensor configured to detect the position of the back assembly relative to the base;
wherein the seat is provided when the back assembly is in the seat position and the cushion assembly is in the seat position;
wherein the console is provided when the back assembly is in the console position and/or the cushion assembly is in the console position;
wherein the back assembly comprises a head restraint comprising a latch mechanism;
wherein the head restraint is configured for movement from a deployed position to a retracted position;
wherein the latch mechanism is configured to retain the head restraint in the deployed position;
wherein the latch mechanism is released to allow movement of the head restraint toward the retracted position;
wherein the latch mechanism is configured to be actuated by movement of the back assembly to facilitate movement of the head restraint to the retracted position.

20. The assembly of claim 19 wherein the head restraint (a) is configured to be moved by an actuator; (b) is coupled to the actuator by a cable; and (c) is configured to be operated by movement of the back assembly.

* * * * *